US012104411B2

(12) United States Patent
Wang et al.

(10) Patent No.: US 12,104,411 B2
(45) Date of Patent: Oct. 1, 2024

(54) SECURE VEHICLE LOCKING

(71) Applicant: CYCLESCP, INC., Hayward, CA (US)

(72) Inventors: Jianhan Wang, Hayward, CA (US); Brandyn Nishida, San Francisco, CA (US)

(73) Assignee: CYCLESCP, INC., Hayward, CA (US)

( * ) Notice: Subject to any disclaimer, the term of this patent is extended or adjusted under 35 U.S.C. 154(b) by 241 days.

(21) Appl. No.: 17/880,010

(22) Filed: Aug. 3, 2022

(65) Prior Publication Data

US 2023/0038677 A1 Feb. 9, 2023

Related U.S. Application Data

(60) Provisional application No. 63/229,694, filed on Aug. 5, 2021.

(51) Int. Cl.
*E05B 71/00* (2006.01)

(52) U.S. Cl.
CPC .................................. *E05B 71/00* (2013.01)

(58) Field of Classification Search
CPC .. E05B 71/00; B62H 3/00; B62H 3/02; B62H 3/04; B62H 3/06; B62H 3/08; B62H 3/10; B62H 3/12; B62H 5/00; B62H 5/001; B62H 5/003; B62H 5/005; B62H 5/006; B62H 5/06; B62H 5/14; B62H 5/141; B62H 5/142; B62H 5/145; B62H 2003/005
USPC ......................................................... 70/233
See application file for complete search history.

(56) References Cited

U.S. PATENT DOCUMENTS

| | | | |
|---|---|---|---|
| 1,200,882 A | 10/1916 | Schaefer | |
| 2,835,547 A | 5/1958 | Erismann | |
| 3,783,659 A * | 1/1974 | Rossi | B62H 3/10 |
| | | | D12/115 |
| 5,278,538 A | 1/1994 | Ainsworth et al. | |
| 5,323,915 A | 6/1994 | Fortune, Sr. et al. | |
| D585,793 S | 2/2009 | Skalka | |
| 8,950,592 B1 | 2/2015 | Greenblatt et al. | |
| 9,381,964 B2 | 7/2016 | Haidak et al. | |
| 9,758,203 B2 | 9/2017 | Oviatt | |
| 10,843,752 B2 * | 11/2020 | Sawhill | B62H 3/10 |
| 2007/0107322 A1 | 5/2007 | Blume | |
| 2014/0311996 A1 * | 10/2014 | Oviatt | B62H 5/06 |
| | | | 211/5 |
| 2015/0068994 A1 * | 3/2015 | Kerman | A47B 57/562 |
| | | | 248/676 |
| 2015/0096335 A1 * | 4/2015 | Haidak | B62H 3/02 |
| | | | 70/57.1 |
| 2015/0330109 A1 * | 11/2015 | Tepper | G05B 15/02 |
| | | | 700/237 |

* cited by examiner

*Primary Examiner* — Nathan Cumar
(74) *Attorney, Agent, or Firm* — Van Court & Aldridge LLP

(57) ABSTRACT

An apparatus with a bicycle frame and rear wheel locking system working around a bicycle parking slot or rack is provided. The apparatus may include a container assembly, a block, an arm base, and adjustable arms to support locking for a limited range of bicycles by size. It may be mounted relatively permanently onto a strong flat surface and/or a bicycle slot or rack. It may allow one to lock both wheels and the frame of their bicycle by just carrying their smartphone or registered card.

20 Claims, 59 Drawing Sheets

90

90

90

90

49

90

90

90"

90"

90"

90"

90"

90"

90"

90''''

90""

90''''

410

420

430

440

Scan the QR Code or tap your badge on the reader to lock your bike

Search Nearby Spots

Report an issue

460

470

Scan the QR code or tap your badge on the reader to unlock your bike

Review bike location

Report an issue

490

550

SECURE VEHICLE LOCKING

CROSS-REFERENCE TO RELATED APPLICATION(S)

This application claims the benefit of prior filed U.S. Provisional Patent Application No. 63/229,694, filed Aug. 5, 2021, which is hereby incorporated by reference herein in its entirety.

COPYRIGHT NOTICE

At least a portion of the disclosure of this patent document contains material that may be subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

This disclosure relates to vehicle locking and, more particularly, to systems, methods, and computer-readable media for securely locking vehicles.

BACKGROUND OF THE DISCLOSURE

Users can lock their bicycles in isolation or to a structure using a U-lock or chain lock or other portable lock. However, such methods are susceptible to improper positioning of the lock with respect to one or more components of the bicycle and/or misplacement of the lock and/or its key.

SUMMARY OF THE DISCLOSURE

This document describes systems, methods, and computer-readable media for securely locking vehicles.

For example, a system for securely locking a vehicle is provided.

As another example, a method for securely locking a vehicle is provided.

As yet another example, a non-transitory machine readable medium storing a program for execution by at least one processing unit of an electronic device is provided, the program for securing a vehicle, the program including sets of instructions for securely locking the vehicle.

As yet another example, an apparatus for locking a vehicle to a surface is provided. The apparatus may include a base assembly configured to be coupled to the surface, a first arm, a second arm, and a lock bar assembly. The base assembly may include a first base and a second base. The first arm may extend between a first arm first end and a first arm second end, wherein the first arm is rotatably coupled to the first base proximate the first arm first end for rotation about a first rotation axis. The second arm may extend between a second arm first end and a second arm second end, wherein the second arm is rotatably coupled to the second base proximate the second arm first end for rotation about a second rotation axis. The lock bar assembly may extend between a first lock bar assembly end and a second lock bar assembly end. The lock bar assembly may be slidably coupled to the second arm via a second arm bar portion proximate the second arm second end. When the first and second arms are rotated such that a first arm bar portion of the first arm proximate the first arm second end is aligned with the second arm bar portion of the second arm proximate the second arm second end, the lock bar assembly may be slidable along a path from a first lock bar position where the first lock bar assembly end is remote from the first arm to a second lock bar position where the first lock bar assembly end interfaces with the first arm bar portion of the first arm.

As yet another example, a locking apparatus for use with a surface is provided. The apparatus may include a first base operative to be attached to the surface, a second base operative to be attached to the surface, a first arm rotatably coupled to the first base, a second arm rotatably coupled to the second base, and a lock bar extending between a first lock bar end and a second lock bar end, wherein the lock bar extends through a lock bar passageway in the second arm, and wherein, when a lock bar receptacle in the first arm is aligned with the lock bar passageway in the second arm, the lock bar is operative to slide within the lock bar passageway such that an end of the lock bar enters the lock bar receptacle.

As yet another example, an apparatus for locking with respect to a surface a vehicle including a vehicle wheel coupled to a vehicle chassis may be provided. The apparatus may include a base assembly operative to be attached to the surface, a first arm movably coupled to the base assembly, a second arm movably coupled to the base assembly, a lock bar extending through a lock bar passageway in the second arm and between a first lock bar end and a second lock bar end, and a slot structure coupled to the base assembly and defining a slot that is operative to receive a portion of the vehicle, wherein, when a lock bar receptacle in the first arm is aligned with the lock bar passageway in the second arm while the portion of the vehicle is received by the slot, the lock bar is operative to slide within the lock bar passageway along a lock bar path such that an end of the lock bar enters the lock bar receptacle and such that the lock bar path passes through a vehicle area defined by both the vehicle wheel and the vehicle chassis.

This Summary is provided to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which.

DETAILED DESCRIPTION OF THE DISCLOSURE

Figure 1A:
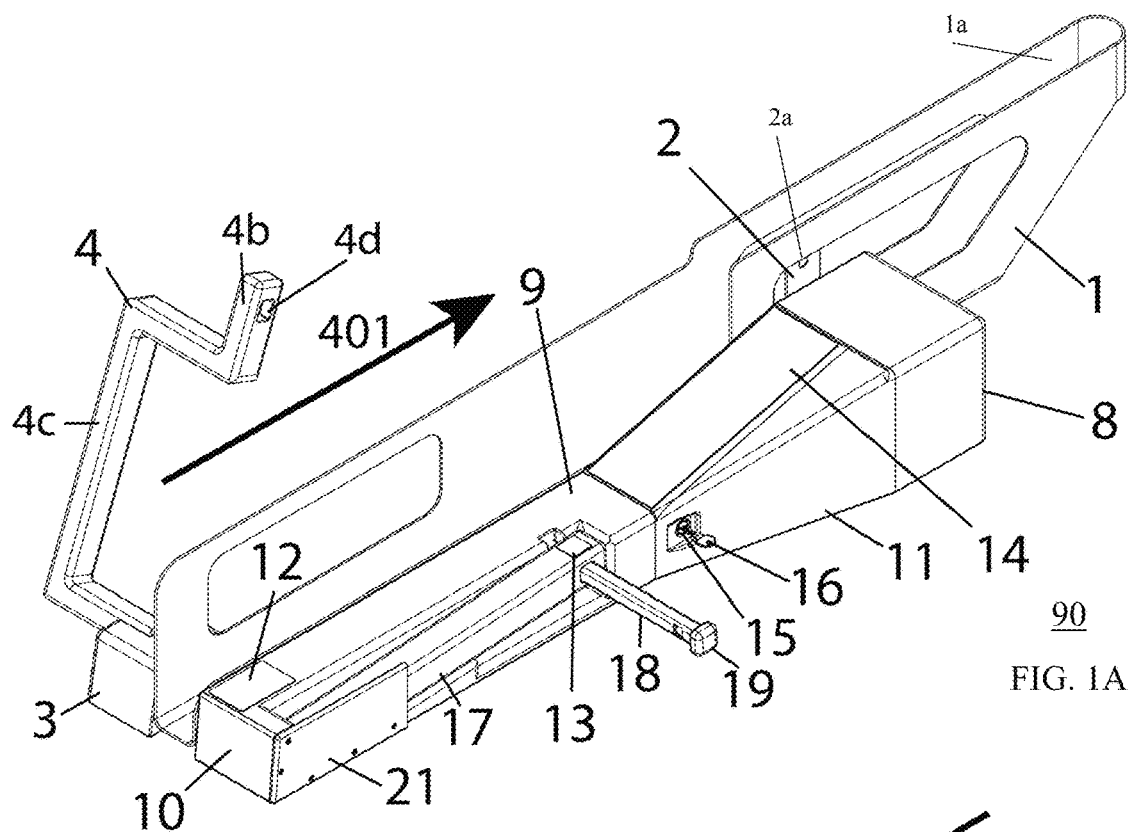
FIGS. 1A and 1B are different perspective views of an exemplary locking apparatus, according to some embodiments of the disclosure.

Systems, methods, and computer-readable media for securely locking vehicles are provided.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. The term "and/or" as used herein may refer to and encompass any and all possible combinations of one or more of the associated listed items. The terms "includes," "including," "comprises," and/or "comprising," when used in this specification, may specify the presence of stated features, integers, steps, operations, elements, and/or components, but do not preclude the presence or addition of one or more other features, integers, steps, operations, elements, components, and/or groups thereof.

The term "if" may, optionally, be construed to mean "when" or "upon" or "in response to determining" or "in response to detecting," depending on the context. Similarly, the phrase "if it is determined" or "if [a stated condition or event] is detected" may, optionally, be construed to mean "upon determining" or "in response to determining" or "upon detecting [the stated condition or event]" or "in response to detecting [the stated condition or event]," depending on the context.

As used herein, the terms "computer," "personal computer," "device," "computing device," "server device," and "controller device" may refer to any programmable computer system that is known or that will be developed in the future. In certain embodiments, a computer may be coupled to a network, such as described herein. A computer system may be configured with processor-executable software instructions to perform the processes described herein. Such computing devices may be mobile devices, such as a mobile telephone, data assistant, tablet computer, or other such mobile device. Alternatively, such computing devices may not be mobile (e.g., in at least certain use cases), such as in the case of server computers, desktop computing systems, or systems integrated with non-mobile components.

As used herein, the terms "component," "module," and "system" may be intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

This disclosure relates to secure parking, locking, energy charging, and/or financial charging solutions for bicycles, tricycles, unicycles, other cycles, scooters, and any other suitable vehicles and transportation devices (e.g., wheeled transportation devices) that may or may not be motorized and/or battery powered.

Bicycle parking slots may allow a user to slide their bicycle in a channel (e.g., a metal channel or other robust structure) and may include an arm (e.g., metal arm) or hole in the channel that may be configured to lock a wheel (e.g., a rear wheel) and/or frame of the bicycle using the user's own lock, such as a U-lock or chain lock or other portable lock. However, users may end up locking their bicycles improperly or with too weak of a lock to protect the important parts of their bicycle. For example, users may lock just a frame or just a wheel, or may pass the lock only around a seat post and/or around the handlebars, and/or may use a cable lock where theft is common and able to overcome a cable lock.

People may also forget to bring their lock or key or both, which can lead to a very frustrating dilemma between going where they wanted to go without their bicycle and keeping their bicycle safe.

To help a user to lock one or both wheels and the frame of a bicycle (e.g., the most valuable parts of the bicycle) more easily and at a higher success rate in good security and for deterring theft, a locking apparatus or system is described herein that may include one or more integrated locking mechanisms for slots or racks that may allow someone to secure a vehicle, such as a bicycle, without needing to carry additional specific personal locks or keys, where such a locking apparatus or system may be operable with a mobile application, a mobile device, a registered card, and/or any other suitable user interface (e.g., a biometric sensor or input component for receiving user credentials (e.g., typed user name and password)).

A locking apparatus or locking system is provided that may be configured to secure a frame and wheel(s) of a transportation device. A framework can be utilized to identify one or more suitable locking regions for the transportation device (e.g., a locking region for a front wheel and/or a locking region for a frame (e.g., rear triangle area) and/or a locking region for a rear wheel of various-sized bicycles or other transportation device type(s) that may be targeted by the geometry of various locking apparatus embodiments. A locking apparatus may include a slot structure for defining a slot for a bicycle, two bases for a locking mechanism, two arms, and a bar. In some embodiments, one or more of the bases may provide at least a portion of the slot structure for defining a slot. Electronics may be stored within one of the bases and/or within one of the arms and/or within any suitable element(s) of the locking apparatus.

An integrated locking mechanism of a locking apparatus or system may include two arms, each of which may be rotatable with respect to a parking slot or rack (e.g., of the locking apparatus that may orient a vehicle) for positioning a portion of each arm adjacent a respective side of a vehicle intersection space or area (e.g., a space or area in common with a first space defined by a first component of the vehicle (e.g., a wheel) and a second space defined by a second component of the vehicle (e.g., a frame)), and a locking bar that may be manipulated into a position whereby a portion of the locking bar extends through the vehicle intersection area and the locking bar is securely held by each of the positioned arms on opposing sides of the vehicle intersection area. For example, such an integrated locking mechanism may include a first arm (e.g., a fixed arm) that may be enabled to rotate (e.g., with a limited rotation) about a first axis, where such rotation of the first arm may enable a portion (e.g., a free end) of the first arm to be rotatably positioned or held adjacent to a first portion of the vehicle (e.g., adjacent on a first side of a bicycle (e.g., a left side of a bicycle) to an intersection between a rear triangle of a bicycle's frame and a rear wheel of the bicycle). The degree of such rotation may be set appropriately for the range of vehicle sizes (e.g., bicycle sizes) a particular locking apparatus may support, such as a range of kid bicycles or a range of adult bicycles. The integrated locking mechanism may also include a second arm (e.g., a lower arm) that may be enabled to rotate (e.g., with a larger range of rotation than the range of rotation of the first arm) about a second axis (e.g., an axis that may or may not be the same as the first axis), where such rotation of the second arm may enable a portion (e.g., a free end) of the second arm to be rotatably positioned or held adjacent to a second portion of the vehicle (e.g., adjacent on a second side of a bicycle (e.g., a right side of a bicycle) to an intersection between a rear triangle of a bicycle's frame and a rear wheel of the bicycle). The integrated locking mechanism may also include a locking bar (e.g., a rear locking bar) that may be coupled (e.g., slidably) to that portion (e.g., a free end) of the second arm and a free end of that locking bar may be operative to be guided along a path through a portion of the vehicle (e.g., a portion of the vehicle that may be adjacent to a portion of each of the first and second arms (e.g., the intersection between the rear triangle of the bicycle's frame and the rear wheel of the bicycle)) and to a portion (e.g., a free end) of the first arm (e.g., into a slot adjacent or defined by the free end of the first arm). Therefore, when the first and second arms are rotated into positions adjacent a particular portion of the vehicle, the rear locking bar may be manipulated (e.g., slid) and then held in place between the two arms while a portion of the rear locking bar between the two arms extends through the particular portion of the vehicle (e.g., through a vehicle intersection area or a wheel-frame intersection area or the intersection of a wheel and a frame of the vehicle (e.g., through a first space defined by a wheel of the vehicle (e.g., a wheel space defined by two or more spokes of the rear wheel of the vehicle) and through a second space defined by a frame of the vehicle (e.g., a frame space defined by a rear portion (e.g., rear triangle) of a frame of the vehicle), where the first space and the second space at least partially overlap or share at least a common space (e.g., including the intersected area) through which the locking bar may extend when the locking bar is held by the two arms)). The locking bar may include an indent located near the side that enters a receptacle or near the side where the user may access the bar to push it through a vehicle intersection area (e.g., an area in common with a first space defined by a first component of the vehicle (e.g., a wheel) and a second space defined by a second component of the vehicle (e.g., a frame)). A motor or actuator or servo or any suitable electronic component with a sensor may be placed within either arm with tip(s) that may interface with an indent of the locking bar when operated to change into a locked state or an unlocked state of the locking mechanism.

To use a locking apparatus with such a parking slot and locking mechanism, a person may slide their vehicle (e.g., back wheel of a bicycle) into the slot (e.g., such that the slot may support the bicycle and at least partially hold it in an upright position), lift (e.g., rotate) an end of one arm (e.g., a lower arm) and possibly another arm (e.g., a more fixed arm) with respect to the slot to a position with a particular height above a surface on which the vehicle may be supported (e.g., to a chain stay height above the chain stay(s) of the bicycle (see, e.g., chain stays 99g of FIGS. 19, 53, and 54)) and to an appropriate position for a locking bar to be pushed through a vehicle intersection area (e.g., through a wheel-frame intersection area (e.g., between spokes of a rear wheel and a triangle of a frame of a bicycle). After pushing a free end of the bar through such a portion of the vehicle's space such that a portion of the bar exists in that space and the bar extends between the two arms (e.g., from one arm and into a receptacle of the other arm), the user can tap their registered card at an appropriate scanning spot or use a corresponding mobile app to scan a code unique to that particular slot or otherwise interact with the locking apparatus to lock their vehicle, which may prevent the bar from being able to be pulled out of either arm and thus out from its locked position that intersects the bicycle space (e.g., a space between spokes of the rear wheel and between portions of the frame).

Any suitable power source (e.g., a battery or a power adapter (e.g., alternating current ("AC") power adapter) can be used to enable the locking and/or unlocking of the locking mechanism and/or any other suitable features of the locking apparatus. A battery is shown in some embodiments.

Such a locking apparatus for wheeled vehicles may offer several advantages, including, but not limited to, the following: (1) it may not take up as much space as other forms of bicycle parking structures; (2) it can be easily configured in different ways to lock the frame and/or wheels of different transportation device types; (3) it can be easily configured to be mounted to a flat surface horizontally or vertically or mounted to parking structures mounted to a flat surface that may be further away from the ground, such as a second tier of parking spaces above the ground; (4) it can work in conjunction with other security features to provide greater security for the parked device; (5) it may not require people to acquire and bring their own lock and key, which may be forgotten, but rather just a card and/or a smartphone and/or mobile device with a compatible mobile application installed or web application loaded thereon can be used to operate the locking apparatus that may be positioned at the location the bicycle is to be secured at, where the card, the mobile application, and/or the web application can be linked to the same user account, so in the case one cannot use one or the other, they can still have the other option, or no additional mechanism may be needed by the user beyond a fingerprint or other identifying characteristic that may be sensed by a biometric sensor of the apparatus or beyond a user name and password or otherwise that may be entered by a user into a computing mechanism of the apparatus; (6) it may provide the capability for real-time monitoring for administrators to be able to quickly respond to any issues; (7) it may allow for the creation and integration of software that can allow administrators of locking apparatus to customize who is authorized to park at which parking slots; (8) it may allow for the creation and integration of software that can allow administrators to communicate with those who use their parking slots and encourage more good behavior, such as removing their parked device after a certain duration or by a certain time of day, depending on their needs and desires; (9) it may allow for the creation and integration of software that can show analytics to administrators to help them better serve those in using the parking slots with integrated wheel locking mechanisms and encourage more good behavior, such as increased biking, in different ways, such as giving prizes or any suitable reward to people who use it the most; (10) it may reduce the amount of learning and difficulty required for people to lock the wheels and/or the frame of their bicycles; (11) it may require less enforcement and education efforts for administrators or clients to ensure people park their bicycles neatly, securely, and in accordance to their policies; and/or the like.

The detailed description is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Figure 1B:
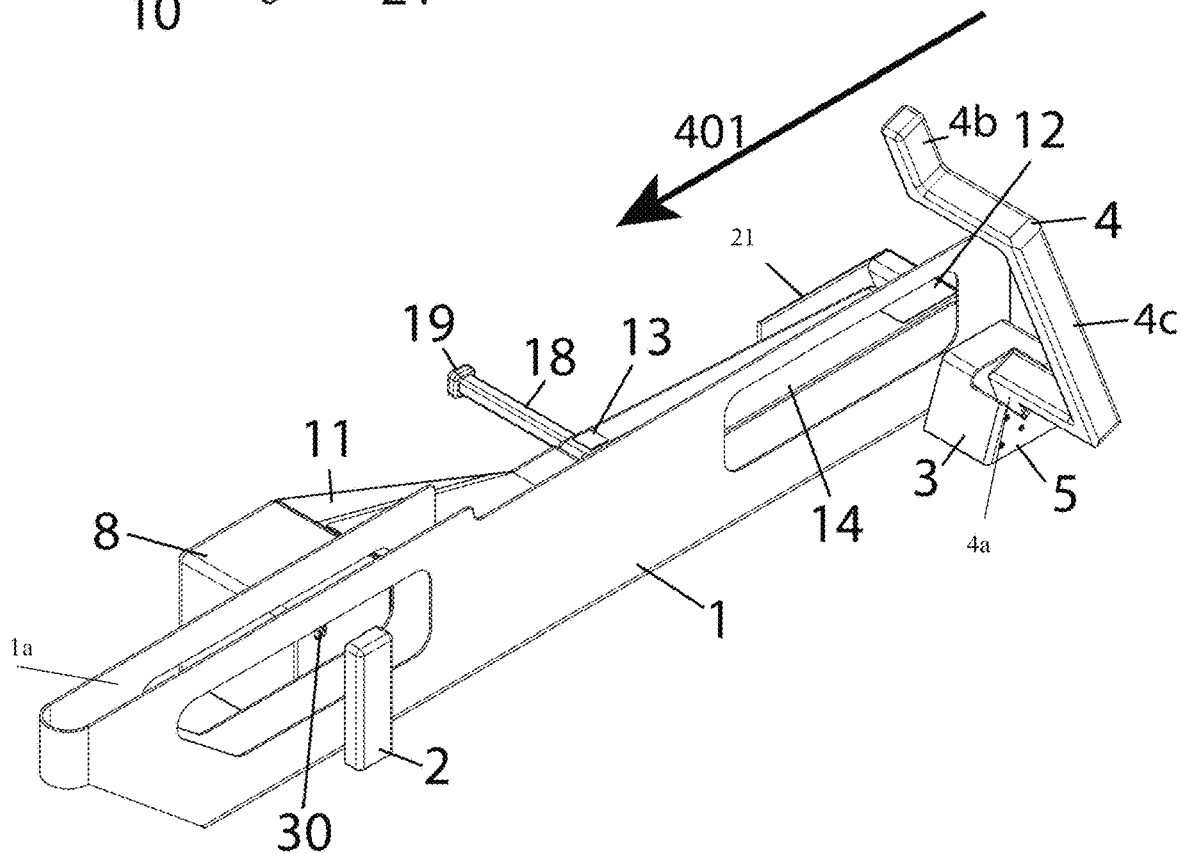

FIGS. 1A-16B, 19, and 20 show a locking system or assembly or apparatus 90, or one or more portions thereof, that may be designed for any suitable size and/or type of vehicle (e.g., for an adult bicycle). As shown in FIGS. 1A and 1B, apparatus 90 may include (e.g., along a middle thereof) a tray or channel or rack or guide or slot structure 1, which may be made of any suitable (e.g., strong, durable, etc.) material, such as a material or combination of materials that may form a structure that may be water or corrosion resistant on the outside with an optional soft finish or UV-resistant plastic, although any other suitable materials may be used. Slot structure 1 may be coupled to or otherwise supported by any suitable surface S (e.g., a sidewalk surface) and may be configured to define a channel or guide or slot 1a for at least partially holding or receiving or guiding at least a portion of a vehicle (e.g., one or more portions of one or more wheels of a bicycle (see, e.g., FIGS. 19 and 20) or other wheeled transportation device) into a suitable position for enabling secure locking, ideally without scratching it or otherwise damaging (e.g., popping) it. Slot structure 1 may include an opening for slot 1a above where the rim of the wheel may be from a bottom position (see, e.g., FIGS. 19 and 20). For example, a lower tray or slot structure 1 of a two-tiered bicycle rack (e.g., where two rows of bicycle racks in a vertical height arrangement) may be used (see, e.g. FIGS. 39 and 40). Various products that fit the purpose and description of the slot may be used. To the sides of slot structure 1 may be two assemblies that may work together to lock one or more components of a vehicle to apparatus 90 (e.g., the rear wheel and frame of a bicycle). For example, as shown, on the left side of apparatus 90 (e.g., on the external left rear portion of slot structure 1), there may be an arm base 3 (e.g., coupled to slot structure 1 and/or to the support surface (e.g., sidewalk)) that may be configured to enable and/or limit rotation of a receptacle arm 4. In some embodiments, arm base 3 may provide at least a portion of the slot structure for defining at least a portion of slot structure 1. Arm base 3 may be configured to allow locking only when a locking bar 18 (e.g., a rear locking bar) goes through the intersection of the rear triangle part of the bicycle frame and the rear wheel (e.g., only when arm 4 is in a particular position (e.g., only in a particular rotated orientation)). Receptacle arm 4 may be defined to include, a first end 4a. Arm 4 may be rotatably coupled to arm base 3 (e.g., for rotation about axis AL) at or adjacent or proximate to first end 4a of arm 4. Arm 4 may extend between first end 4a and a second end or top segment 4b. At or near free end or top segment 4b of arm 4, a rounded square receptacle 4d or a receptacle of any other suitable shape (e.g., a rounded polygon) may be provided that may correspond with an outer periphery of an end 18e of bar 18, but preferably not a circle to prevent perceived easy cutting of bar 18 by a pipe cutter. Arm 4 may include an arm segment 4c in between ends 4a and 4b that may extend outwards away from slot structure 1a in any suitable shape, such as a flattened "C" shape, which may allow any suitable component(s) of the vehicle (e.g., a pedal of the bicycle) to pass by arm 4 when the vehicle is inserted into and moved along slot 1a. Typically, people tend to dismount their bicycles with the left pedal down and have bicycles where they can pedal backwards without leading to braking. If the left pedal hits the upper section of arm 4 (e.g., a "female" receptacle arm), it (e.g., the upper section of the C shaped segment) would most likely rotate the crank and pedal backwards until it is low enough to pass through without stopping forward movement of the bicycle into the slot (see, e.g., FIG. 53), while the other pedal (e.g., right pedal may not be impeded by a right arm (e.g., arm 17)). It is to be understood that, in some embodiments, such an arm 4 may instead be provided on the right side of slot structure 1 rather than or in addition to the left side. Top segment 4b of arm 4 may be held close to or above the height of the chain stays of supported bicycles (see, e.g., chain stays 99g of FIG. 19) or other supported vehicles. If a bicycle were to lean or tip within slot 1a towards arm 4, top segment 4b of arm 4 may be positioned to hold the bicycle upright or substantially upright and/or for preventing the bicycle from falling over and/or potential wheel bending (see, e.g., FIG. 54). Apparatus 90 may also include a second or other or right arm 17 that may also be positioned close to a chain stay to help support a bicycle from the right side, though it may not be as easy for embodiments supporting smaller ranges of bicycles with a card reader and arm 17 in the same positions and locations. Receptacle area 4d, which may be located at top segment area 4b of arm 4, may be configured to receive a portion (e.g., an end 18e of bar 18 (e.g., on the left side of slot structure 1)). Bar 18 may include rounded edges to not feel sharp or scratch the user or the user's bicycle. Its cross-section may have at least two flat edges to avoid being perceived as easy to be cut by a pipe cutter. On the right side of slot structure 1, a main base or container 9 may be provided (e.g., coupled thereto), which may be configured to hold any suitable components (e.g., electronics) inside. For example, as shown, on the right side of apparatus 90 (e.g., on the external right rear portion of slot structure 1), there may be an arm base or main base 9 (e.g., coupled to slot structure 1 and/or to the support surface (e.g., sidewalk)) that may be configured to enable and/or limit rotation of arm 17. In some embodiments, base 9 may provide at least a portion of the slot structure for defining at least a portion of slot structure 1. A sticker or other suitable signage 12 (e.g., a highly water-resistant rectangular sticker) with the image of the card or system icon that an authorized user may have to use for the bicycle parking spot may be stuck on the part of main container 9 closest to where a user might approach the parking space (e.g., adjacent a rear panel 10). Another sticker or other suitable signage 13 (e.g., a highly water-resistant sticker) may include an image of a unique code, such as a Quick Response ("QR") code, or otherwise that may be associated with that parking spot that may be scanned by the user using a particular mobile app. Signage 13 may be provided on arm 17. Arm 17 may be defined to include, a first end 17a. Arm 17 may be rotatably coupled to base 9 (e.g., for rotation about axis AR) at or adjacent or proximate to first end 17a of arm 17. Arm 17 may extend between first end 17a and a second end or top segment 17b.

Figure 2:
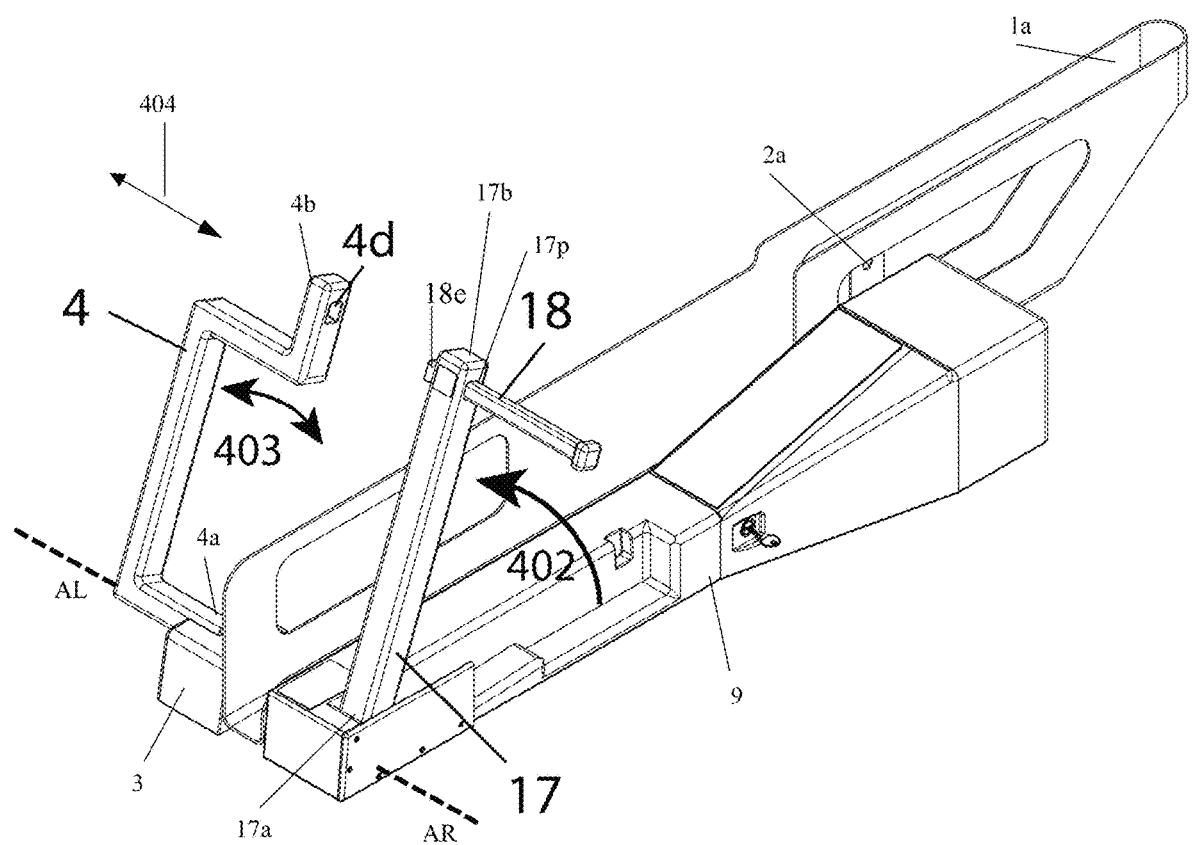
FIG. 2 is a perspective view of the locking apparatus with arms positioned to lock a vehicle, according to some embodiments of the disclosure.
Figure 3A:
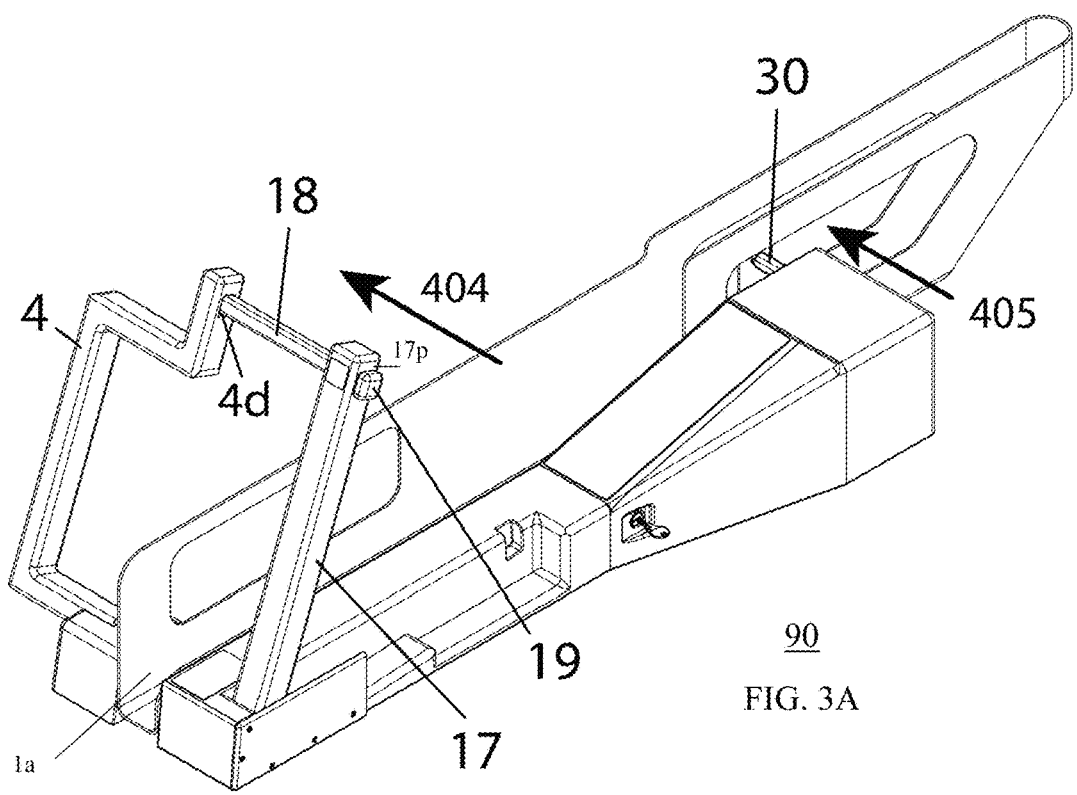
FIGS. 3A and 3B are different perspective views of the locking apparatus in a locked state, according to some embodiments of the disclosure.
Figure 3B:
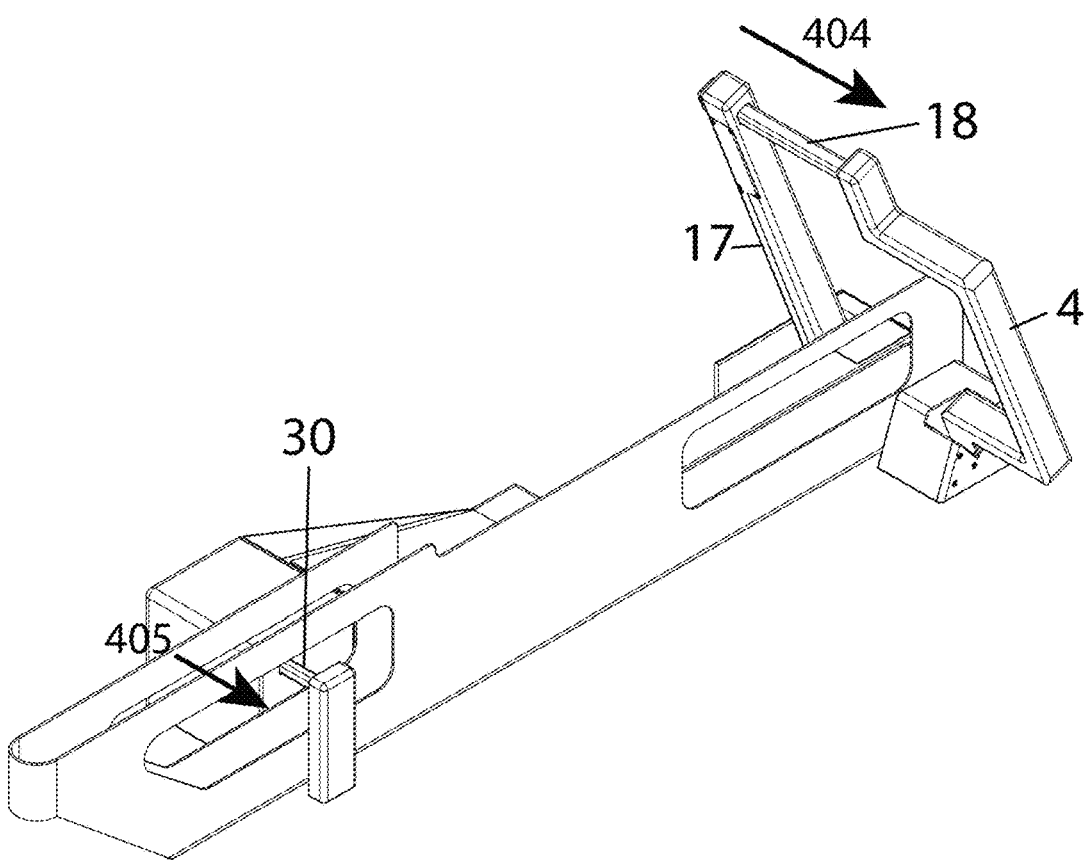

Moving onto FIG. 2, after sliding their bicycle into slot 1a of structure 1 following the guidance arrow 401 in FIGS. 1A and 1B, a user may be enabled to lift in the direction of arrow 402 a free end of arm 17 (e.g., a male or right arm) from the position of FIGS. 1A and 1B to the position of FIGS. 2, 3A, and 3B for rotating arm 17 about an axis AR and, optionally, at least slightly, rotate in the direction of arrow 403 receptacle arm 4 about an axis AL (e.g., the same axis or an axis parallel to axis AR) depending on where the best vehicle intersection area of the vehicle may be (e.g., opening in the rear wheel of the vehicle and in a frame space) for bar 18 to pass through. This arc area of arrow 402 and/or of arrow 403 may be defined to support a large range of bicycles as larger bicycles may have their rear wheels further out backwards and be larger, raising a desired vehicle intersection area (e.g., locking area 59 (see FIGS. 19 and 20)) and shifting it backward as well, which may match the upper area of the rotational arc. The arc or rotational ranges of arrows 402 and 403 may be the same or may be different (e.g., the arc of arrow 403 of arm 4 may be smaller and/or more limited than that of arrow 402 of arm 17). Alternatively, for smaller bicycles, a desired intersection area (e.g., locking area 59 (see FIGS. 19 and 20)) may shift forward and downward. Assembly surrounding one or both of arms 4 and 17 may be provided to help restrict the arm(s) from falling to a lowest rotation angle after being rotated to a desired position, which may help prevent locking bar 18 and the weight of the arms from resting on the vehicle. In some embodiments, both arms 4 and 17 may be similarly fully rotatable like the limits of the rotation arrow 402 and/or to 90 degrees straight vertical orientation to be able to support an even larger size range of bicycles. They can also be more limited like in the rotational arrow 403, with both arms having a flattened "C" shape. In some embodiments, the lifting motion of arm 17 along arrow 402 may be at least partially assisted by the system as or right after a bicycle is slid inside slot 1a. Activation methods may be, but are not limited to, a lever mechanism compressed by the front wheel of the bicycle and a sensor activation. A user may ensure that proper alignment is achieved for locking, but the user may not need to bend down as far to reach one or both arms. In certain embodiments, as may be shown, arm 4 may include an outward bend or geometric shape at portion 4c such that a bicycle pedal clearance may be enabled and such that the arm comes back above such an outward bend (e.g., at its top) to be close to a chain stay of the bicycle. Bicycles may even lean on that part for additional support and prevent potential wheel-bending.

Figure 11A:
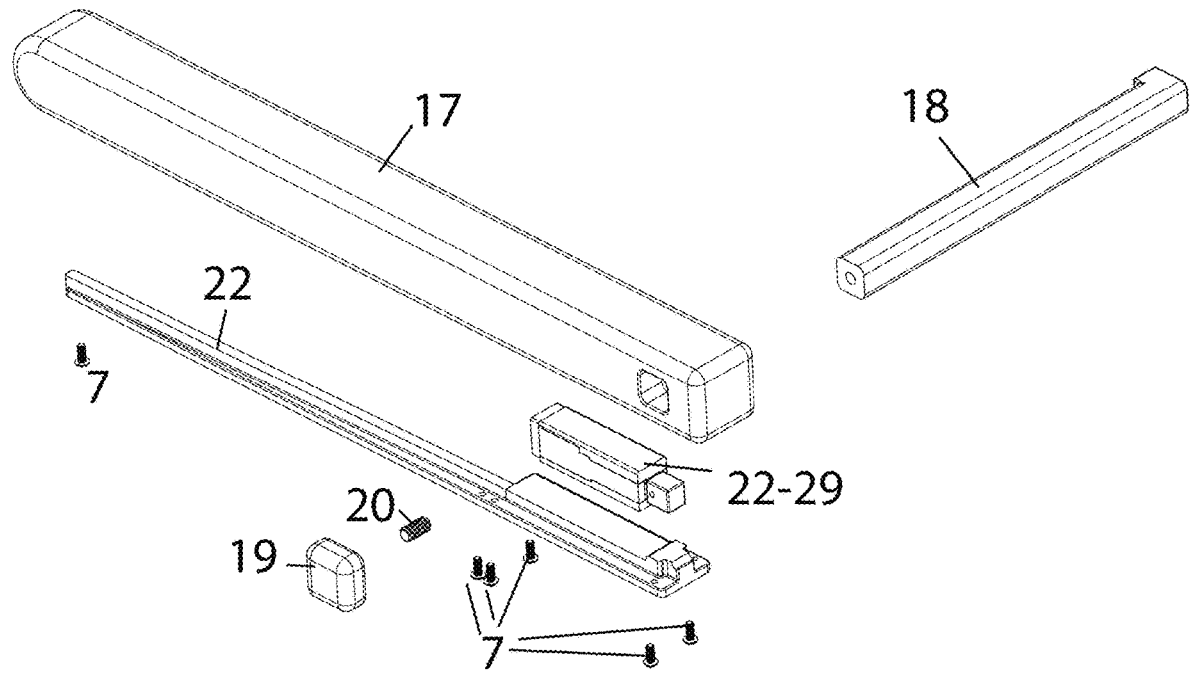
FIGS. 11A and 11B are different perspective exploded views of a locking 'male' arm assembly of the locking apparatus, according to some embodiments of the disclosure.
Figure 11B:
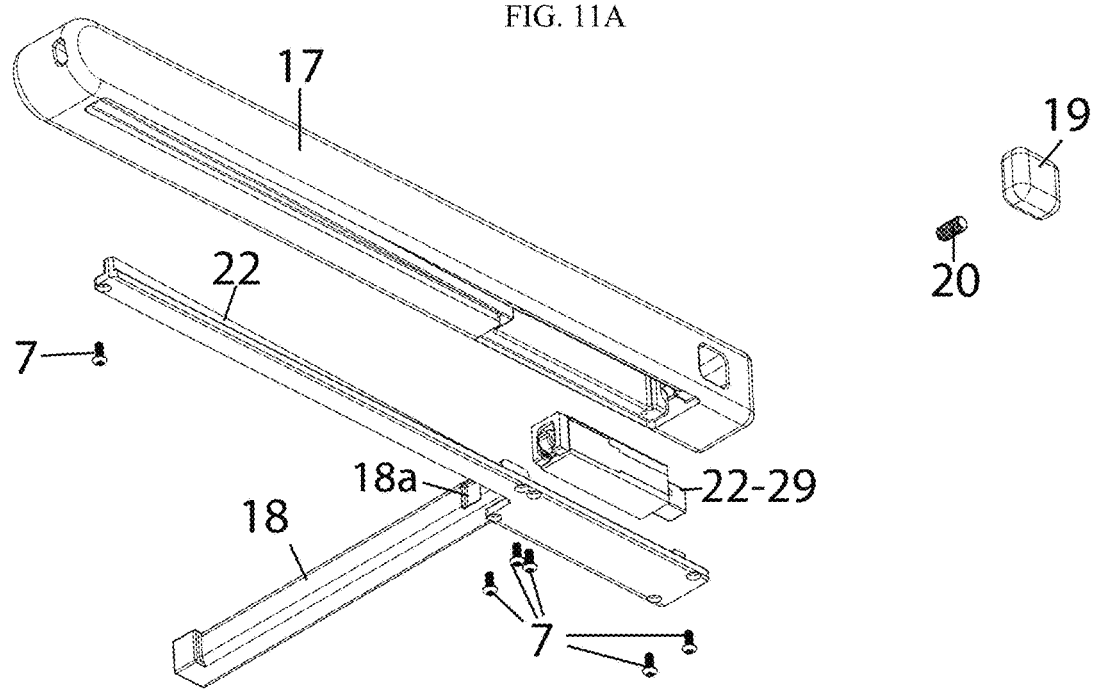
Figure 12:
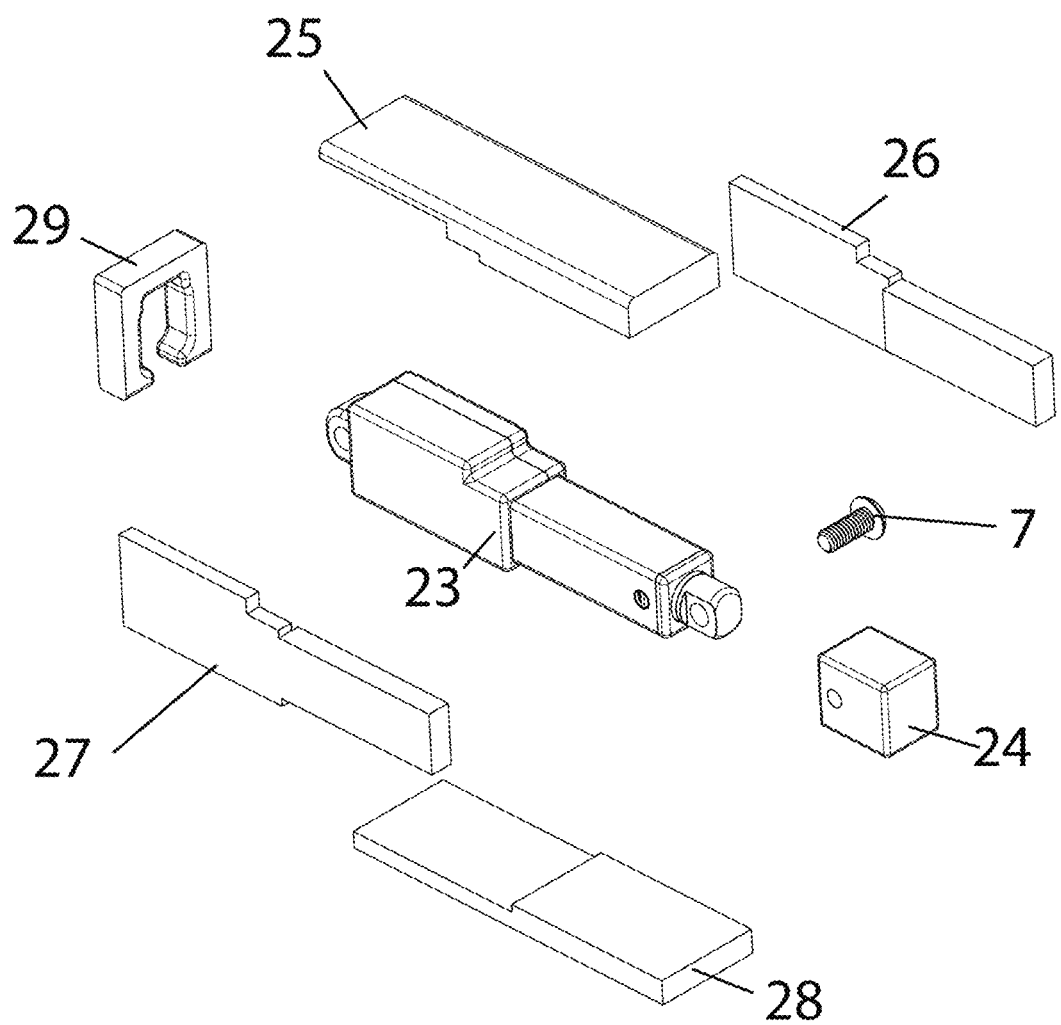
FIG. 12 is a perspective exploded view of a rear linear servo of the locking apparatus, according to some embodiments of the disclosure.

After aligning the arms with respect to opposite sides of the desired vehicle intersection area (e.g., after arm 4 and/or arm 17 is rotated such that a passageway 17p of arm 17 may be aligned with receptacle 4d of arm 4), FIGS. 3A and 3B show the movement(s) that may be facilitated to get the locking mechanism of apparatus 90 to a locked state. The user may hold a cap 19 at a first end of bar 18 and push bar 18 (e.g., in the direction of arrow 404) further through a passageway 17p at or adjacent a top 17b of arm 17 such that a free end 18e of bar 18 (e.g., opposite cap 19) may travel across and through a rear vehicle intersection area of a vehicle and into receptacle 4d of arm 4. Cap 19 and/or end 18e may be configured to prevent bar 18 from being pulled completely out from the passageway of arm 17. Once end 18e of bar 18 has been received by receptacle 4d of arm 4, a user may interact with apparatus 90 in any suitable manner (e.g., by tapping the user's registered card or scanning a code on a respective sticker or any other suitable technique) to activate a locking mode that may be configured to hold end 18e of bar 18 within receptacle 4d of arm 4 or to otherwise hold (e.g., magnetically) end 18e of bar 18 against or otherwise with respect to arm 4 (e.g., using any suitable internal electronic and/or mechanical and/or magnetic components of apparatus 90). Such a locking mode may also be configured to extend (e.g., automatically (e.g., electronically)) an end of a front or tip bar 30 out from a shell 8 and through another vehicle area (e.g., a front vehicle area (e.g., an area between spokes of a front wheel of the vehicle)) and into a receptacle 2a of a block 2, where shell 8 and block 2 may be positioned on opposite sides of slot structure 1 (e.g., towards a front end of slot 1a). In some embodiments, block 2 and/or shell 8 may provide at least a portion of the slot structure for defining at least a portion of slot structure 1. Alternatively, as shown, each one of block 2 and shell 8 may be positioned adjacent a respective opening through a respective side wall of slot structure 1, such that bar 30 may extend out from shell 8, through an opening through a first side wall of slot structure 1, through slot 1a and a vehicle area (e.g., between spokes of a front bicycle wheel), through an opening through a second side wall of slot structure 1, and into receptacle 2a of block 2. An opening through the rear left portion of slot structure 1 may be optional, but, if provided, may be utilized by a user for locking their vehicle manually to slot structure 1 (e.g., with a user provided lock (e.g., if desirable by the organization/individual that manages the locking apparatus)). The slot structure 1 of FIGS. 1A-3B, in some embodiments, may be similar to a structure provided by the Dero Decker Lower Tray. As shown, the rear left portion and the rear right portion of structure 1 may not have the same height as each other or as high as either front portion, as wheel stability may be less important for the rear wheel as for the front wheel, as the front wheel may be capable of turning about a steering axis of the frame while the rear wheel may not be. By reducing the height on the right rear side, it may reduce material, weight, and/or cost for providing the slot structure. Additionally or alternatively, it may allow for greater freedom of the lean of the bicycle from being perfectly vertical as the height of the lower right rear side may be where a bicycle's pedals may typically reach their lowest point and may be less likely to collide with the apparatus. Any suitable internal electronic components may be configured to hold a tip (e.g., a rounded tip) of bar 30 securely in place in receptacle 2a of block 2. While rear bar 18 may be extended manually between arms 4 and 17, front bar 30 may be extended automatically between shell 8 and block 2 as a front wheel position may tend to be more limited by a front end of slot structure 1 and slot 1a and may support a range of different sized bicycles, while the rotational operation of arms 4 and 17 may be utilized to align for the intended locking through a rear vehicle intersection area (e.g., locking area 59 (see FIGS. 19 and 20)), avoid spokes of the rear wheel, and not be expensive or complex to create. In some embodiments (e.g., as shown and described with respect to FIG. 55), rear bar 18 can instead be held by left arm 4 with a receptacle in right arm 17 for receiving a free end of bar 18 after passing through the vehicle area. A bar's receptacle 18a (see, e.g., FIG. 6A and/or FIG. 11B) may be moved to just before a widened segment 18b (see, e.g., FIG. 7) so that a tip 24 (e.g., a rear linear servo tip (e.g., block tip)), as shown in FIGS. 11A, 11B, and 12, can extend into it for locking. This may decrease the overall width of the assembly as locking bar 18 in a retracted state may overlap with the width of the bend (e.g., C-shaped bend) of arm 4. Regardless of which side the locking bar may be on, the controlled movement (e.g., horizontal movement) of the bar through an arm may make it easy for someone to slide it across a vehicle area without hitting and potentially damaging a spoke or another part of a bicycle and easy to understand compared to another method of bar movement, such as rotating a latch or bar. In some other embodiments, a locking bar may be split into two portions (e.g., two halves) and have magnets at certain ends that may face each other (or any other suitable coupling feature(s)) to help join them together, which may shorten the distance each bar end would move from an unlocked resting state to a locked state and vice versa.

Figure 4A:
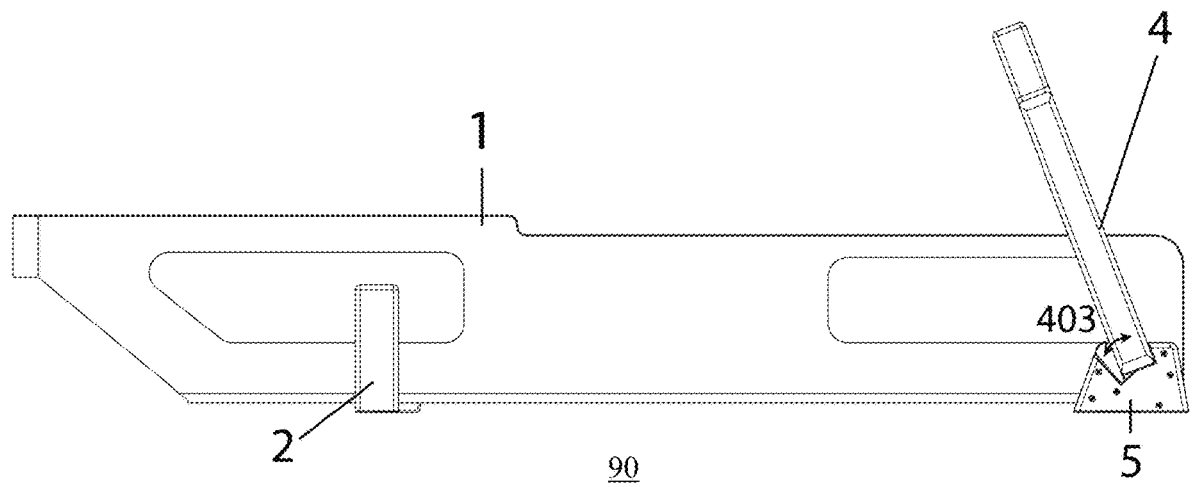
FIGS. 4A and 4B are side and perspective exploded views of a slot and related portion of the locking apparatus, according to some embodiments of the disclosure.
Figure 4B:
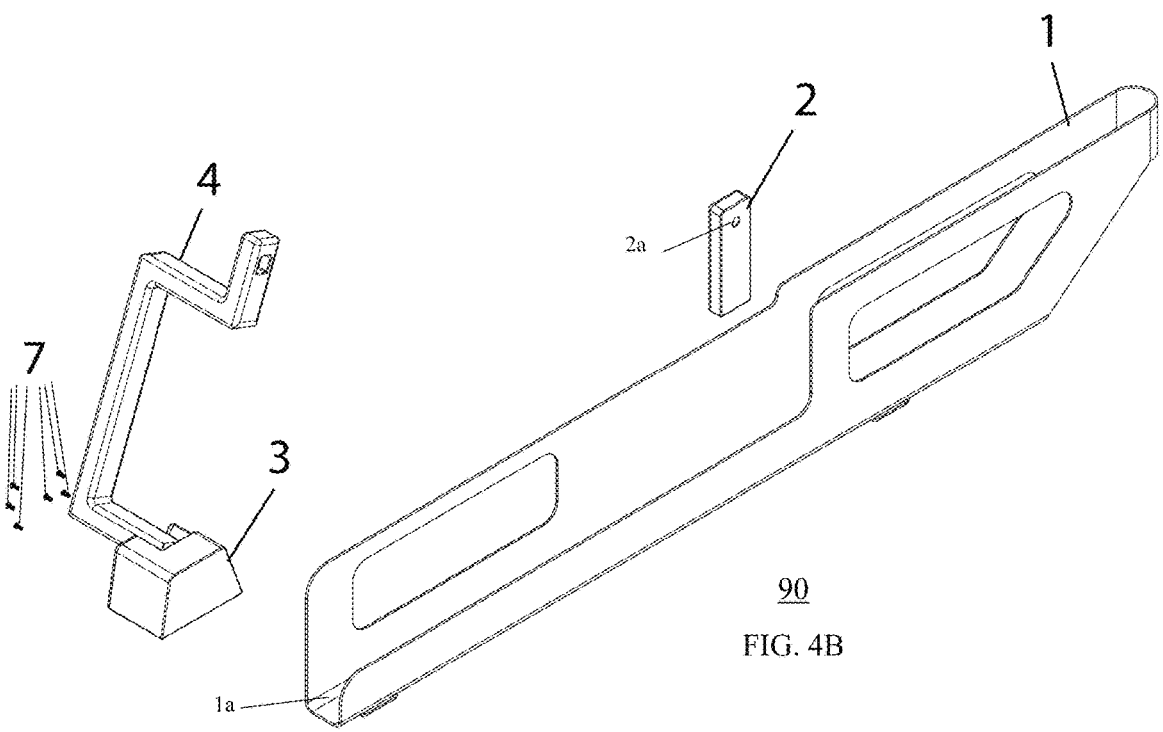

As shown in FIGS. 4A and 4B, for example, slot structure 1 and parts to the left of it may be shown more clearly. Receptacle 2a of block 2 may help prevent unauthorized tampering. An arm guard 5 of apparatus 90 may be provided to hold arm 4 to arm base 3 by security screws 7 or other suitable mechanism(s). Arm guard 5 may be configured to provide enough friction to hold arm 4 in whichever orientation (e.g., angular orientation with a ground surface (e.g., on which slot structure 1 may be positioned)) that the user adjusts it to (e.g., along arrow 403) within any defined range (e.g., as may be defined by the structure of arm guard 5) without requiring too much user force to rotate. For example, foam (e.g., weather and fire-resistant foam) or any other suitable material may be added (e.g., along a surface within a groove of arm guard 5) to accomplish this.

Figure 5A:
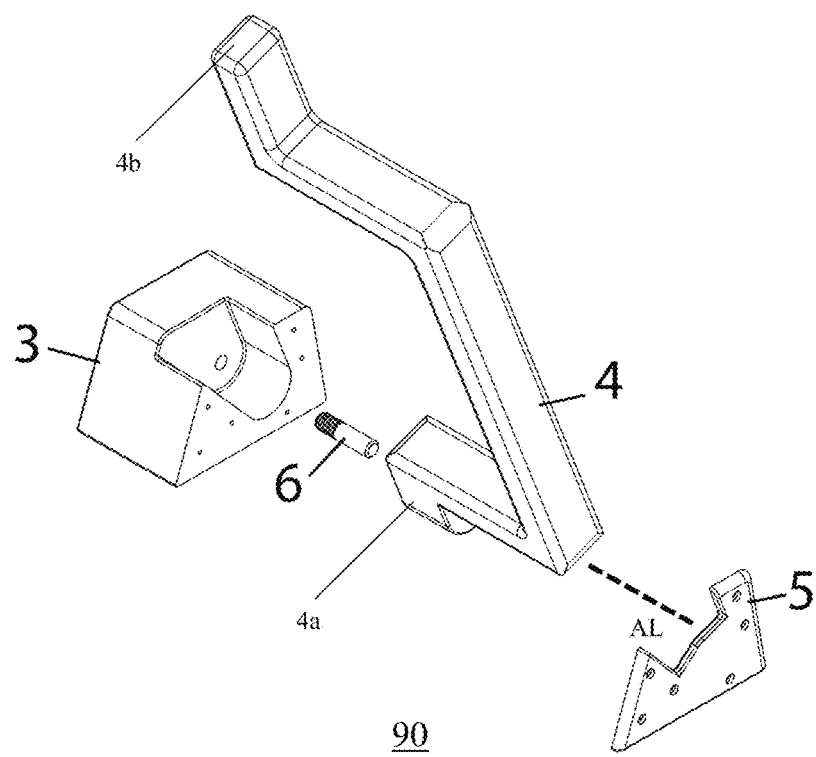
FIGS. 5A and 5B are different perspective exploded views of a receptacle arm and base assembly of the locking apparatus, according to some embodiments of the disclosure.
Figure 5B:
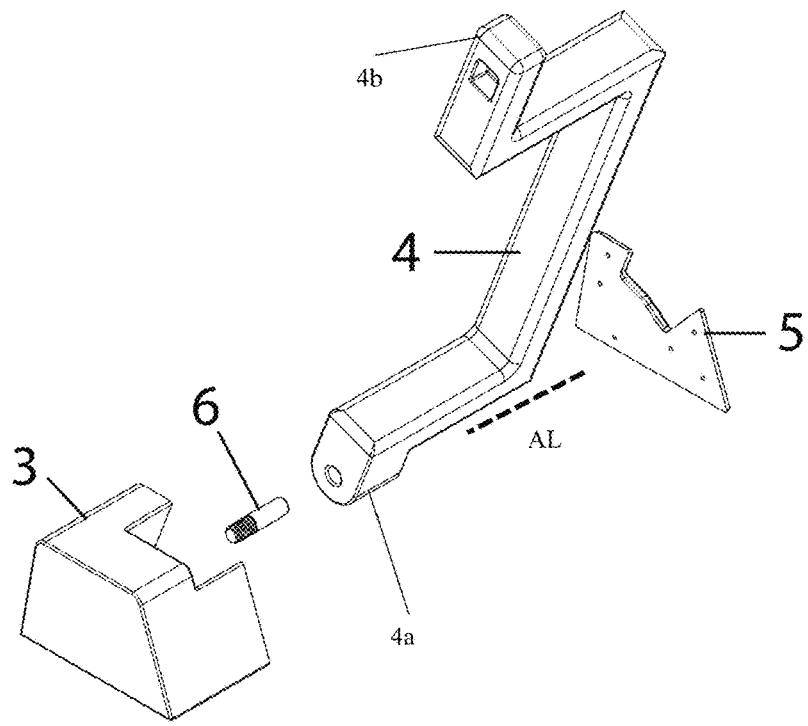
Figure 6A:
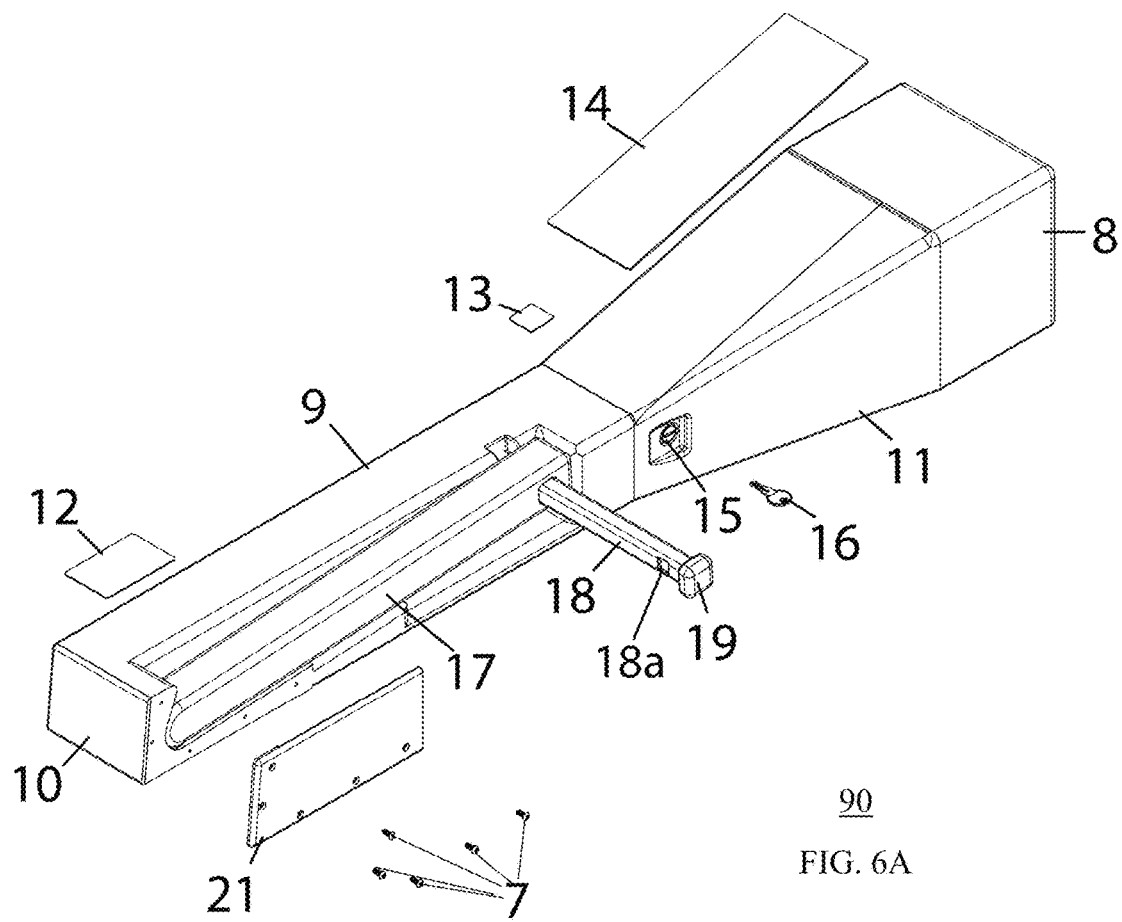
FIGS. 6A and 6B are perspective and side exploded views of a main base of the locking apparatus, according to some embodiments of the disclosure.
Figure 6B:
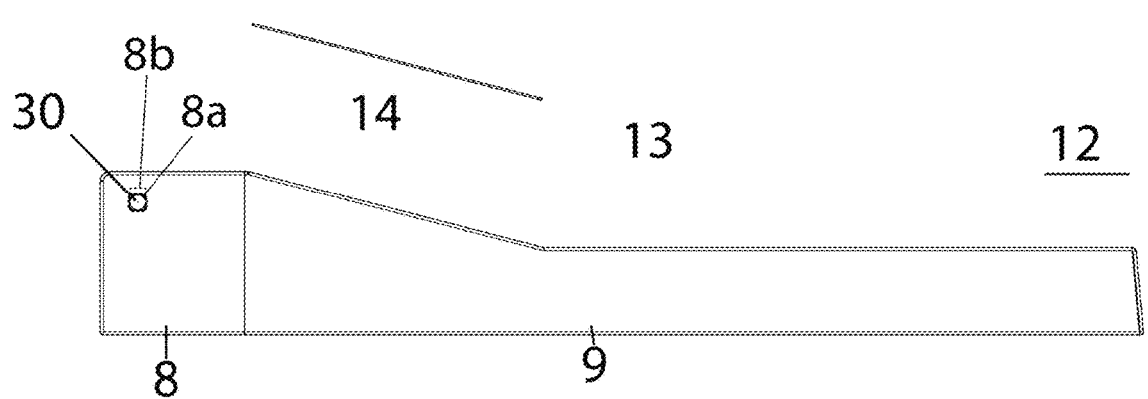

As shown in FIGS. 5A and 5B, a stud 6 may be used to hold or otherwise couple an end of arm 4 to a fixed place on arm base 3 while allowing arm 4 to rotate with respect to arm base 3 (e.g., along arrow 403 of FIG. 2). Arm base 3 may be configured to limit such rotation of arm 4 (e.g., along arrow 403) to be where the desired vehicle intersection area may be (e.g., between spokes of a rear wheel and within a rear space defined by a frame of a bicycle so that both the rear wheel and frame can be locked with one mechanism and prevent users from locking their bicycle incorrectly outside such an intended locking area (e.g., area 59 of FIGS. 19 and 20 within a rear triangle 99f and between two or more spokes 99d of a rear wheel 99c of a bicycle 99).

As shown in FIGS. 6A, 6B, 7A, and 7B, several parts are shown to be exploded away from main housing or container 9, including an optional solar panel 14, sticker 12, code sticker 13, a key 16 that may be configured to unlock a latch mechanism 15 and allow a diagonal or other suitably shaped panel 11 to be removed from container 9 to access internal parts for maintenance and repairs or otherwise, while an arm guard 21 may be provided to hold arm 17 (e.g., at a lower fixed end) to main container 9 (e.g., at a rotational axis arm joint stud 6) and may be held in place using one or more security screws 7 or any other suitable mechanism(s). Like on the other side for the other arm, there may be enough friction provided to hold arm 17 in whichever orientation angle that the user adjusts it to (e.g., along arrow 402) within range without requiring too much force to rotate. Foam (e.g., weather and fire-resistant foam) or any other suitable material may be utilized to accomplish this. Arm 17 may have the same upper rotation angle limit as arm 4. Locking bar 18 may include a small receptacle 18a itself that may be put into a functional position (e.g., a ready to be locked position) by the user (e.g., through sliding bar 18 along arrow 404 of FIGS. 3A and 3B) such that receptacle 18a may interface with tip 24 shown in FIGS. 11A, 11B, and 12 that may be extended and retracted by a small linear servo 23 (e.g., for locking bar 18 in such a position with respect to arm 17). A hole 8a may be provided in shell 8 (e.g., a wheel locking mechanism shell) that may be configured to allow bar 30 to extend therethrough. An optional cover piece 8b may be provided, for example, if an object sensor 55 (see, e.g., FIG. 10) may be provided and used to detect spoke conflict (e.g., conflict between bar 30 and one or more spokes of a front wheel when bar 30 is being extended). Such a cover piece may be configured not to hinder such a sensor's 55 method of detection like the rest of the wheel locking mechanism shell 8 might do in some embodiments.

Figure 7A:
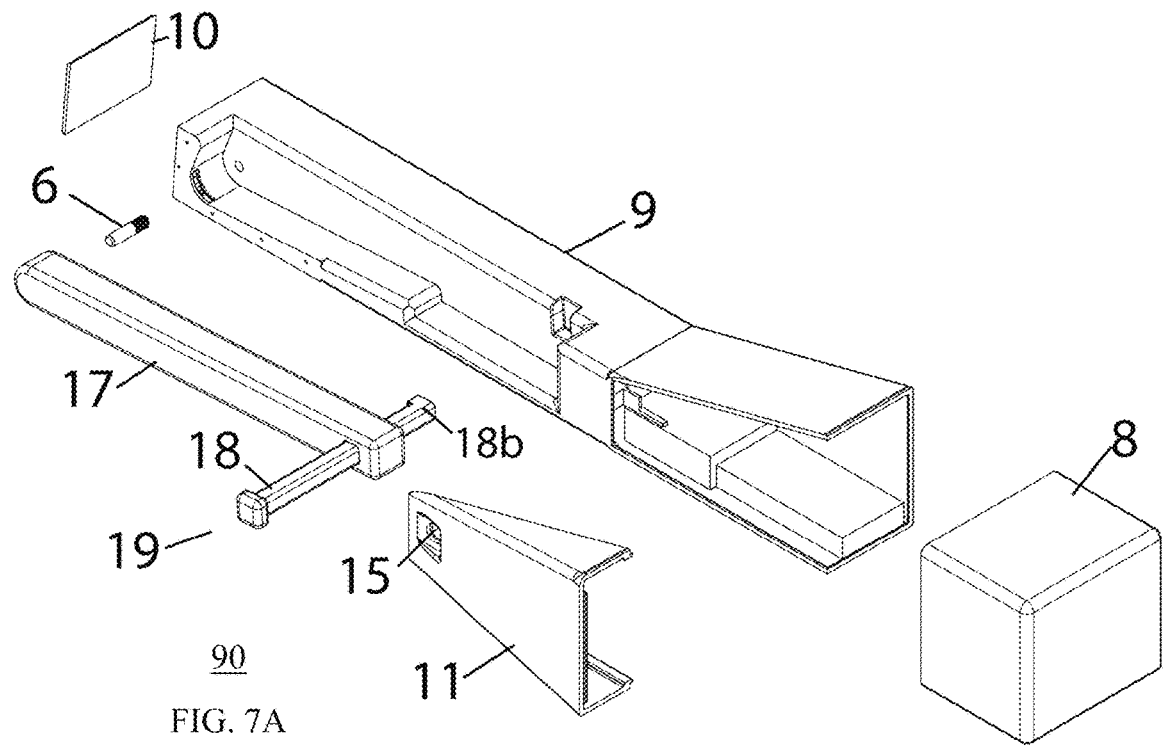
FIGS. 7A and 7B are different perspective further exploded views of the main base of the locking apparatus, according to some embodiments of the disclosure.
Figure 7B:
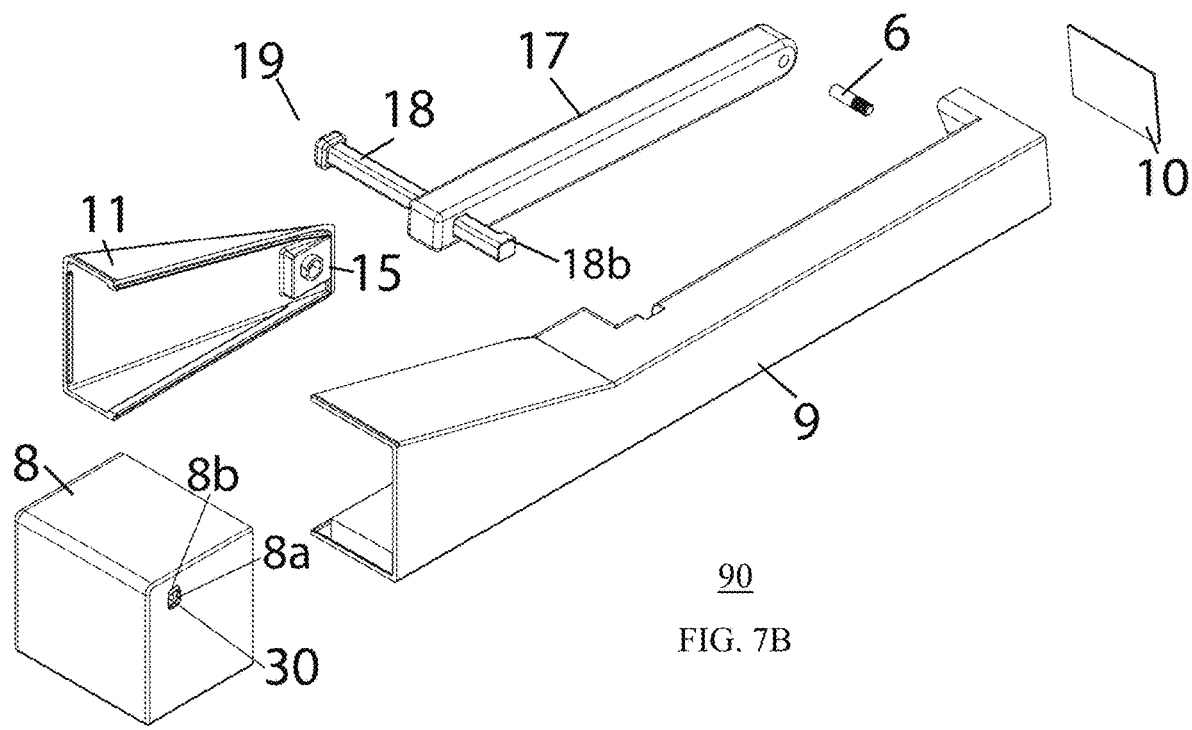

As shown in FIGS. 7A and 7B, assembly in the main container area may be exploded even further. Bar 18 may be shown to have a larger cross-section on one side 18b to prevent removal from arm 17 via that side while being permanently attached via rear locking bar cap 19 on the other side. A partially threaded stud 6 may be configured to hold or otherwise rotatably couple arm 17 to main container 9 at a fixed position while allowing the arm to rotate. Main container 9 and shell 8 may be permanently attached or otherwise coupled after assembly. In some embodiments, main container 9 may also be configured to house one or more electronic components (e.g., one or more electronic boards).

Figure 8:
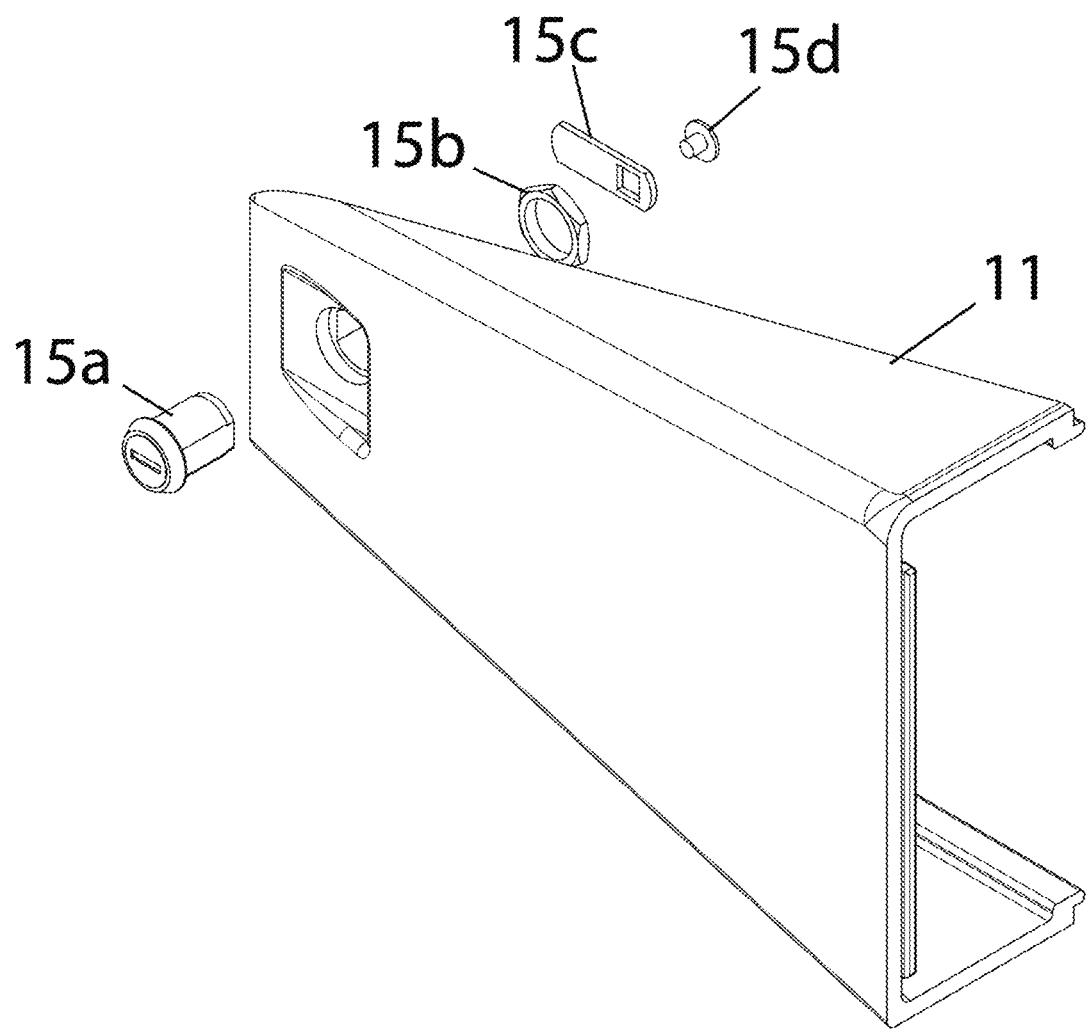
FIG. 8 is an exploded view of an access panel area of the locking apparatus, according to some embodiments of the disclosure.

As shown in FIG. 8, a latch mechanism 15 of panel 11 may include a barrel 15a that may be configured to hold the right key, a washer 15b, a latch 15c that may rotate in and out of locking position with the corresponding receiver in main container 9, and a screw 15d that may hold it together. Latch mechanism 15 may be attached onto access panel 11 to allow a trusted individual to access the internals of main container 9 and mechanism shell 8.

Figure 9A:
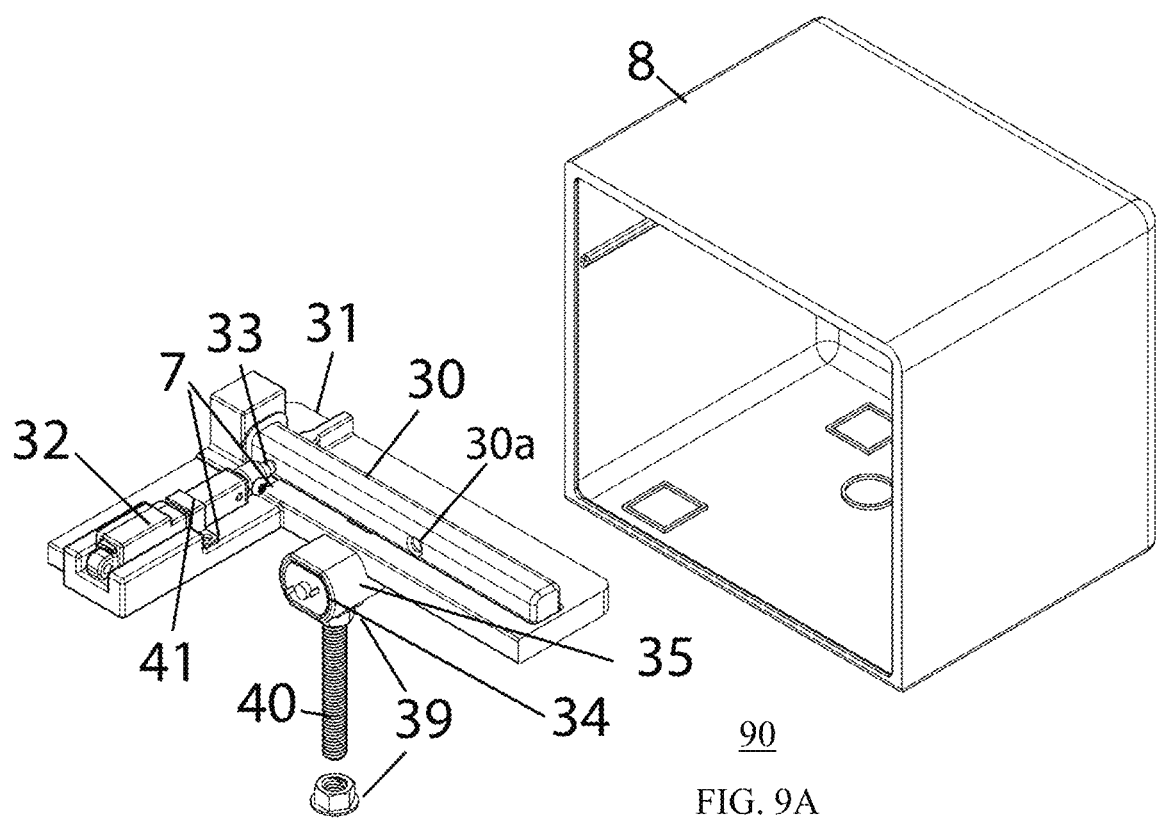
FIGS. 9A and 9B are perspective and side exploded views of an assembly of parts with a wheel locking shell of the locking apparatus, according to some embodiments of the disclosure.
Figure 9B:
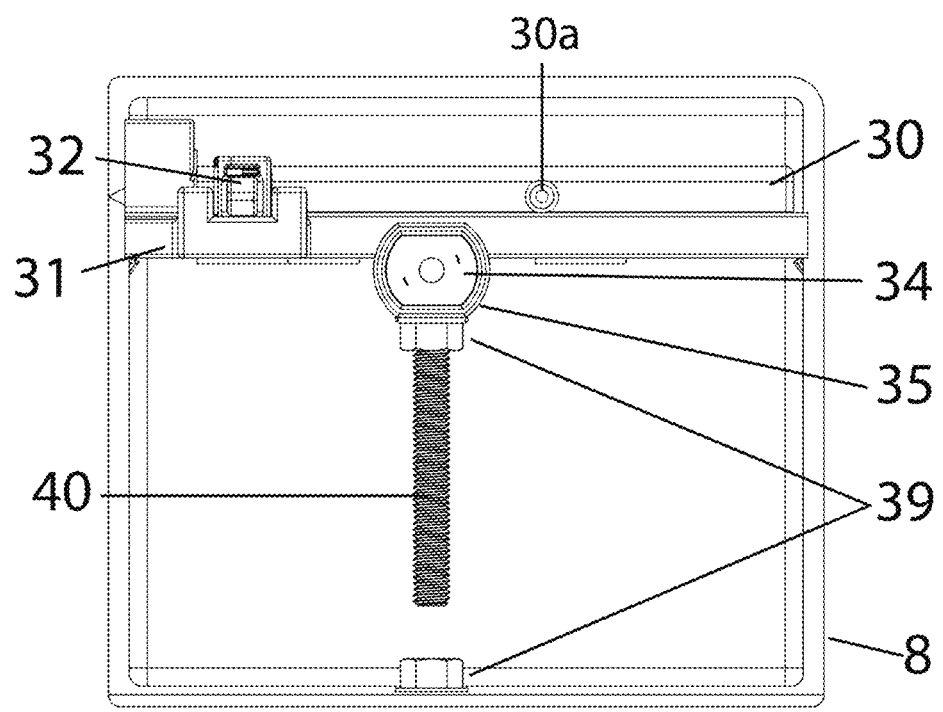

As shown in FIGS. 9A and 9B, various components may be provided about bar 30 and a mounting board 31. A motor 34 may be held in place with the support of a motor mount 35 that may be strongly adhered to mounting board 31, and an optional support assembly may be provided with nuts 39 and a threaded rod 40. Motor 34 may be configured to drive tip bar 30 to extend out of shell 8 when locking and to retract back into shell 8 when unlocking. When locking a vehicle, a linear servo or actuator 32 may be configured to extend its tip into a corresponding receptacle 30a on the tip bar 30 after it moves into the locked area. Shell 8 may have support edges and extrusions (e.g., as shown) or indents to help with accurate placement of the parts that go inside it. A clamp 41 may be configured to hold linear servo or actuator 32 on its spot on mounting board 31 via screws 7 or any other suitable mechanism(s). To help prevent tampering, especially by liquids or other debris from being inserted, mounting board 31 may also feature a cover around a rounded tip area of tip bar 30. Optional sealant may be added to help ensure this.

Figure 10:
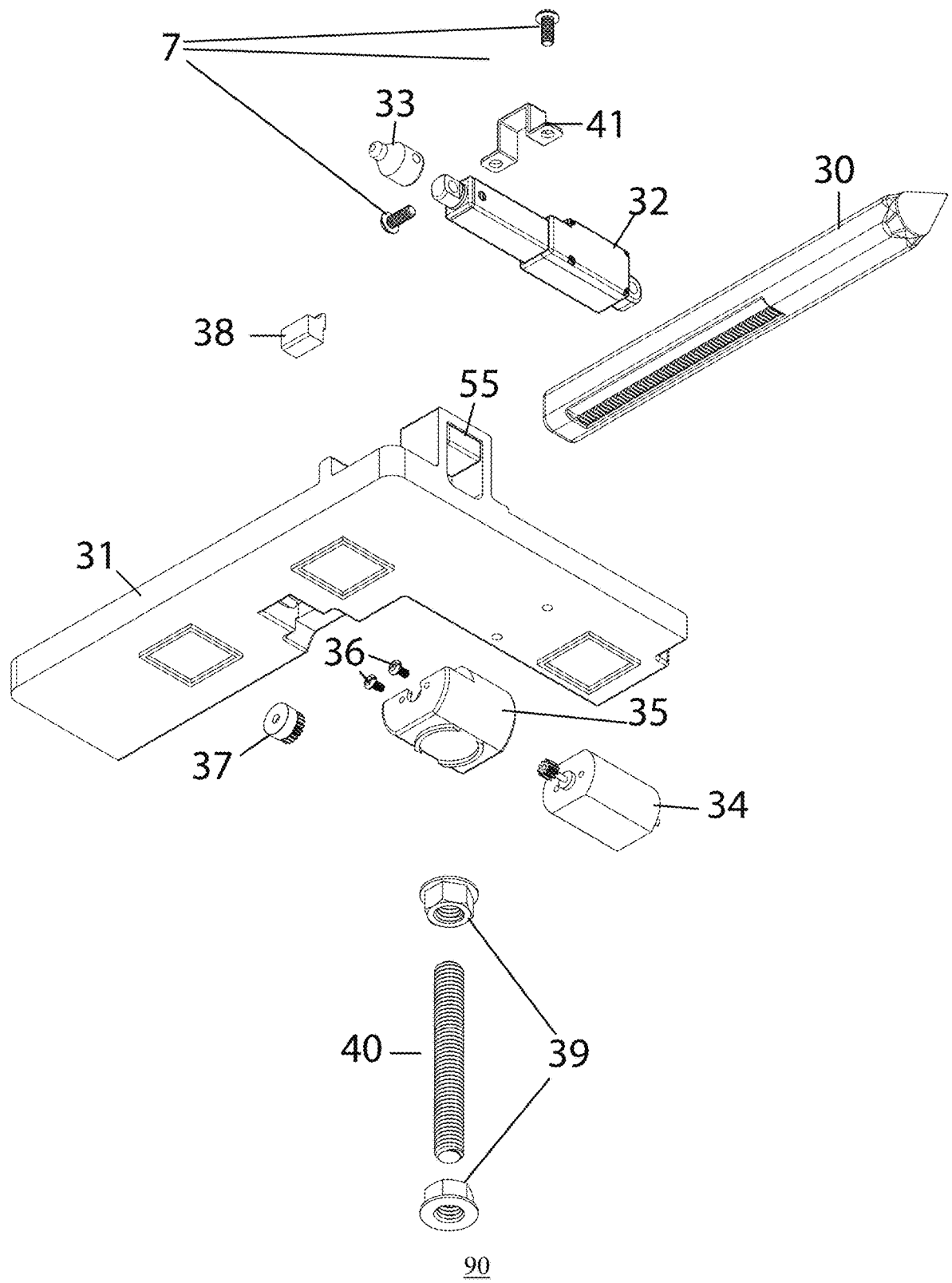
FIG. 10 is a perspective exploded view of a wheel locking assembly of the locking apparatus, according to some embodiments of the disclosure.

As shown by FIG. 10, screw(s) 36 or any other suitable mechanism(s) may be provided to hold motor 34 to motor mount 35. An intermediary gear 37 may be interfaced with by motor 34 to drive bar 30 on linear gear teeth. Intermediary gear 37 may mount through an opening on mounting board 31 onto a small rod extrusion. A gear block piece 38 may be configured to hold gear 37 in place and strongly adhere to mounting board 31. At a hole or cavity in or through mounting board 31e, an optional object or proximity or other suitable type of sensor 55 may be provided for a possible placement, where sensor 55 may be configured to detect whether or not a spoke (e.g., of a front vehicle wheel) is in the way of bar 30 when traveling along an extension path of arrow 405 (see, e.g., FIGS. 3A and 3B) while locking.

As shown by FIGS. 11A and 11B, removing security screws 7 may allow the removal of arm access block 22, and thus a rear linear servo subassembly 23-29. Screws 7, arm access block 22, rear locking bar 18, rear locking bar cap 19, and threaded rod 20 (e.g., which may be optional) may be made of primarily a hardened, highly water-resistant material or materials. Optional threaded rod 20 may be one way to couple bind locking bar 18 and locking bar cap 19 with a strong coupling.

FIG. 12 shows an exploded rear linear servo subassembly. For example, rear linear servo 23 may extend its tip 24 into a receptacle 18a of rear locking bar 18a (see, e.g., FIG. 6A) when it is in position to be locked and may be retracted when it is operated to unlock. A security screw 7 may be configured to hold an optional rectangular block tip 24 to rear linear servo 23 along with the help of space constraints within arm 17. Absorbers 25-28 (e.g., one or more fire-resistant shock absorbers) and a rear guard 29 may be configured to help keep rear linear servo 23 safe from harm of arm 17 being stuck or colliding with something quickly. Rear guard 29 may also be configured to keep rear linear servo 23 from sliding backwards. It is to be understood that, in other embodiments, receptacle 18a may be positioned more adjacent to end 18e such that an electronic component (e.g., motor, actuator, servo, etc.) may be operative to extend a tip within arm 4 into such a receptacle (e.g., rather than the extendable tip being provided within arm 17). In other embodiments, a first arm tip of a first arm may be extendible into a first receptacle of the bar, while a second arm tip of a second arm may be extendible into a second receptacle of the bar, which may provide further security to the locking of the apparatus.

Figure 13:
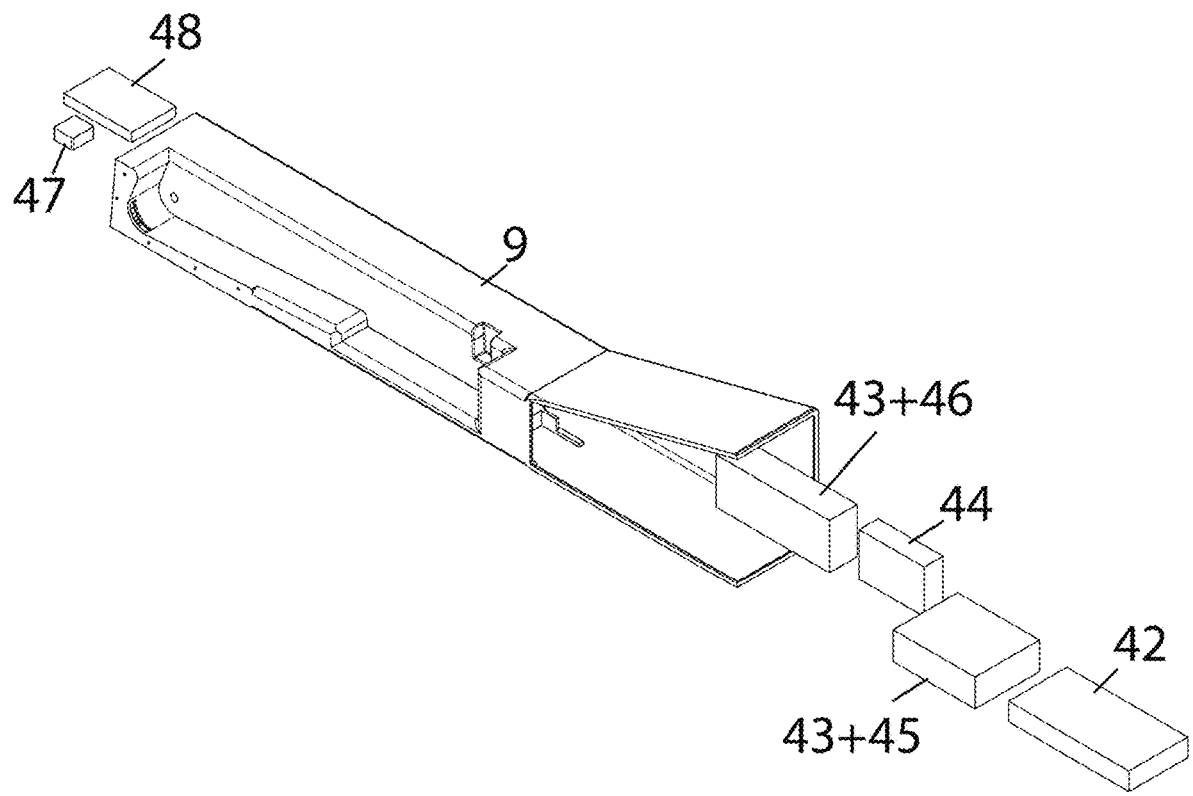
FIG. 13 is a perspective exploded view of various electronic parts of a main container of the locking apparatus, according to some embodiments of the disclosure.

In FIG. 13, various electronic boards may be shown exploded outwards from container 9. For example, toward a rear of container 9 may be an optional speaker 47 and card reader 48. In a front of container 9 may be positioned a primary battery 42, a microprocessor 44, a microcontroller 43, and a wheel locking circuit board 45, and a microcontroller 43 and frame and rear wheel locking circuit board 46 that may be utilized to control one or more operations of apparatus 90.

Figure 14A:
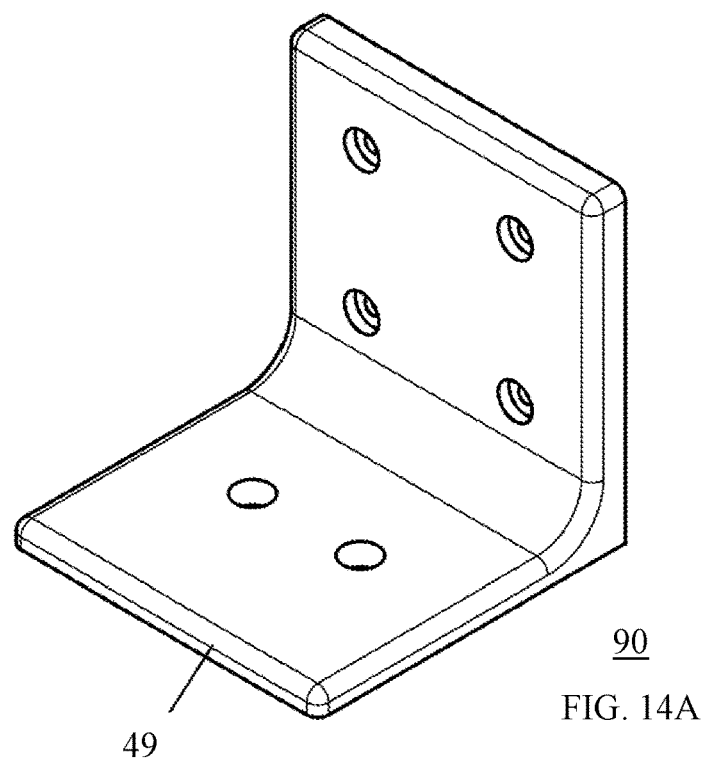
FIG. 14A and FIG. 14B are different perspective views of flange mounts of the locking apparatus, according to some embodiments of the disclosure.
Figure 14B:
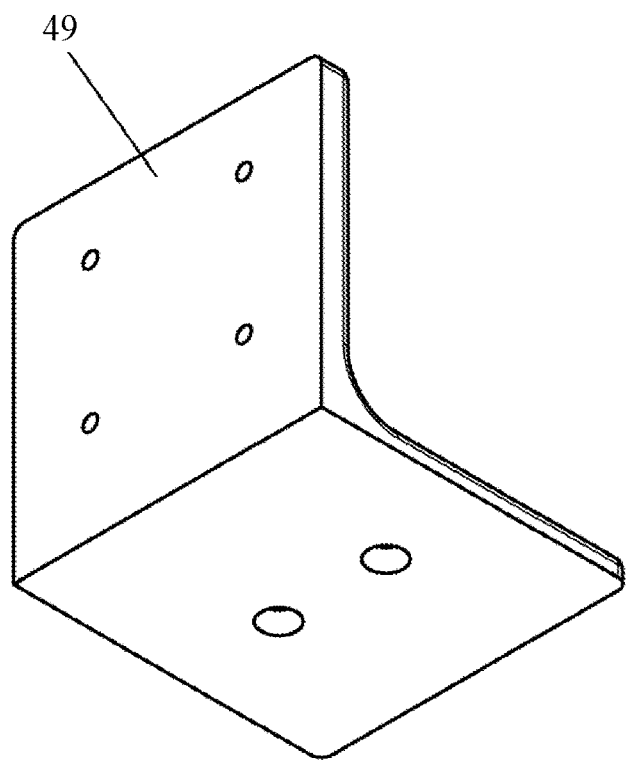

Flange mounts 49, as shown in FIG. 14A and FIG. 14B, or any other suitable mechanism(s) may be provided in any suitable shape(s) (e.g., with strategically tapped holes in any suitable previously mentioned parts of apparatus 90) to help mount or otherwise couple apparatus 90 to the ground (e.g., sidewalk) or any other suitable anchor surface (e.g., in a difficult-to-tamper with way). Things like anchor spikes or any other suitable coupling mechanism(s) may be used to couple each mount to the anchor surface and/or to one or more portions of apparatus 90.

Figure 15A:
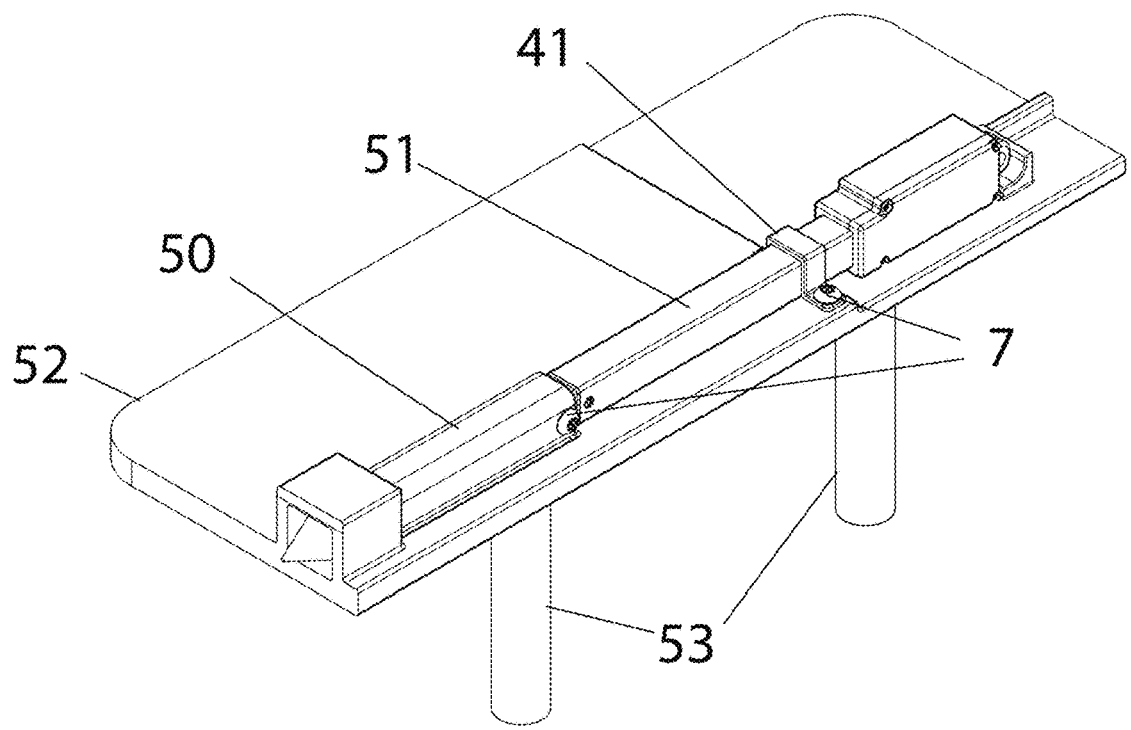
FIGS. 15A and 15B are different perspective exploded views of an alternative embodiment of a wheel locking mechanism of the locking apparatus, according to some embodiments of the disclosure.
Figure 15B:
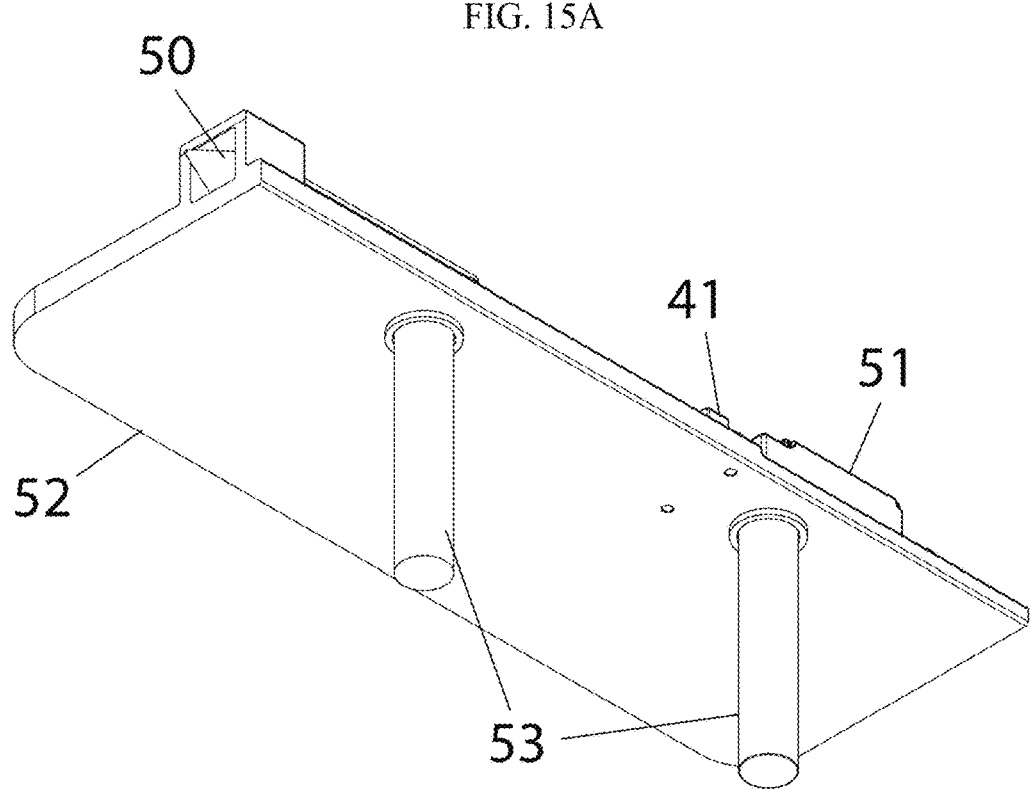

Revisiting the wheel locking mechanism area, FIGS. 15A and 15B may show an alternative embodiment to a side (e.g., a right side) of a wheel locking mechanism (e.g., the mechanism shown in FIGS. 9A and 9B). A longer linear servo or actuator 51 may extend out a rounded tip bar 50 secured to it with a security screw 7 to simplify the locking apparatus by using one less motor and gear but may use a widened wheel locking mechanism container 8 to fit the longer linear servo. A mounting board 52 may be in a different shape to support them and still maintain a tight opening to prevent tampering, especially liquids from getting inside. Optional sealant may be added to help ensure this.

Figure 16A:
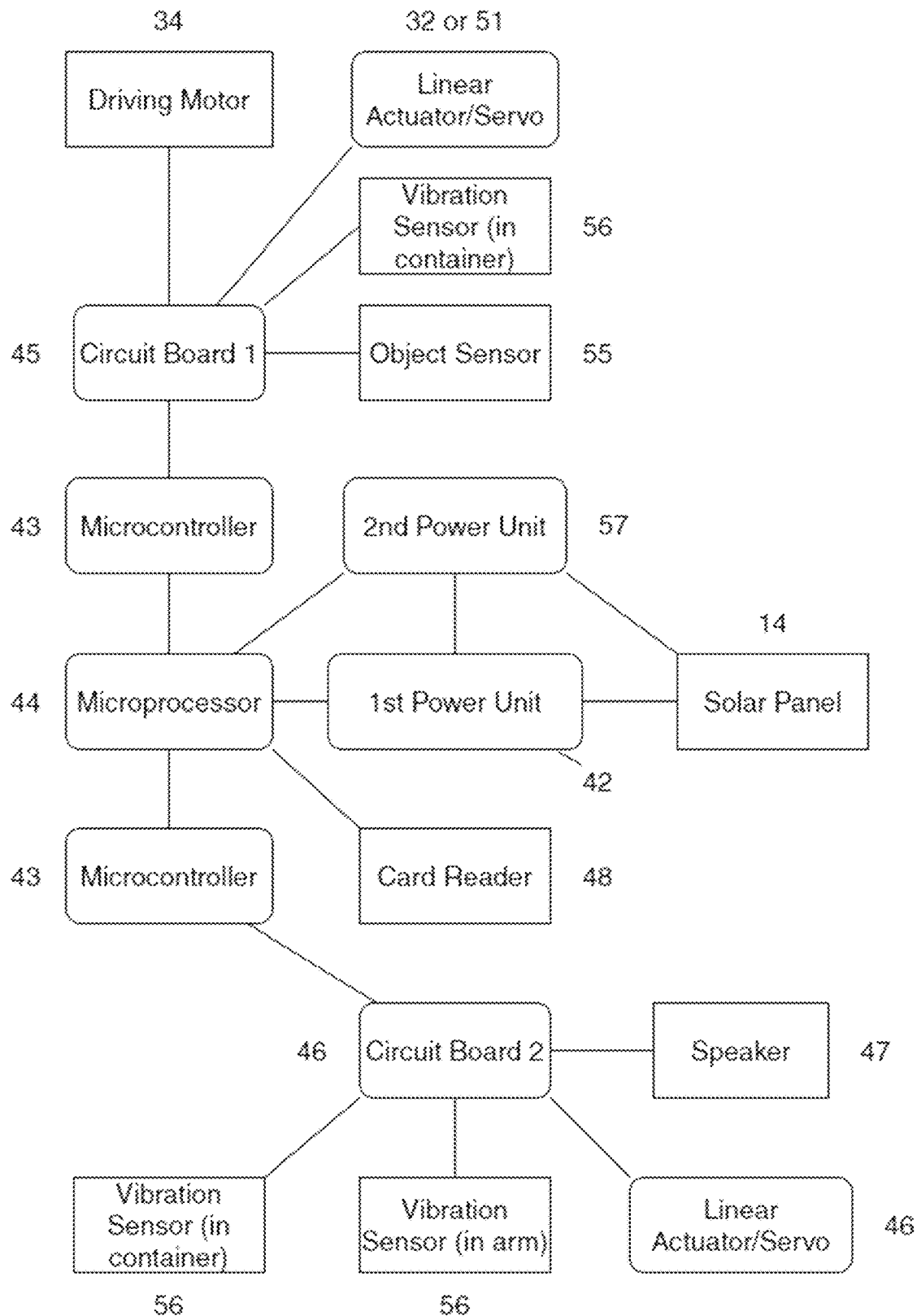
FIGS. 16A and 16B are schematic diagrams of electronic components of the locking apparatus, according to some embodiments of the disclosure.
Figure 16B:
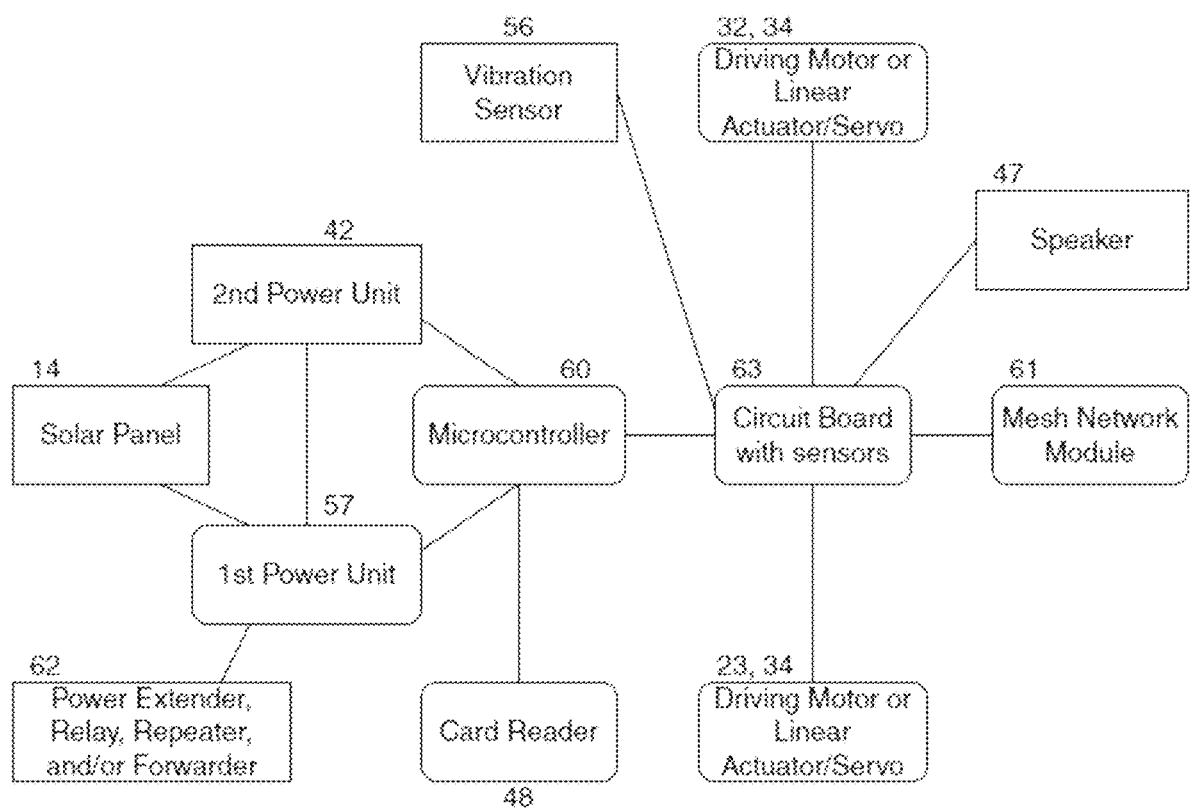

FIGS. 16A and 16B depict diagrams of how various electrical components may be coupled in a system with or of locking apparatus 90. As shown in FIG. 16A, a first power unit 42 may be any suitable primary power source that may use alternating current ("AC") power or a battery. A second or backup power unit 57 may typically be a battery or other form of on-device stored power to keep the device (e.g., apparatus 90) operating normally in case first power unit 42 fails for any reason. There may be a space in main container 9 to add second power unit 57. Optional and reconfigurable parts may be shown in non-rounded rectangles, which may include a driving motor 34, object sensor 55, vibration sensor(s) 56 (e.g., in a container and/or in one or more arms), a speaker 47, solar panel 14, and card reader 48. If a driving motor 34 is provided, a shorter linear actuator/servo 32 may be used (see, e.g., FIGS. 9A-10). If no driving motor is provided, a longer linear actuator/servo 51 may be used (see, e.g., FIGS. 15A and 15B). Both driving motor 34 and longer linear actuator/servo 51 may be strong enough to rotate a bicycle wheel forward or backward (e.g., if bar 30 and/or bar 50 were to hit a bicycle wheel spoke (e.g., with angled surface(s)) when attempting to extend through a vehicle space. Object sensor 55 may be provided in a wheel locking mechanism area to be able to help detect if bar 30 (e.g., a rounded tip bar) would hit a bicycle wheel spoke or other suitable vehicle component when attempting to extend through a vehicle space. A vibration sensor 56 or any other suitable sensor(s) may be configured to help detect any suitable suspicious activity depending on where the sensor may be positioned (e.g., a kicking of main container 9, a shaking of arm 4 and/or arm 17, a using of a power saw to try to cut shell 8, etc.). Multiple such sensors may be used for extra security. Speaker 47 may be configured to output any suitable audio, such as tones or short melodies if approval, rejection, or adjustment needed, or any other sounds that may be appropriate for guiding apparatus use depending on the situation. If the parking is outdoors or under a lot of light, solar panel 14 may be provided and linked to a battery to lower the need for maintenance based on frequency. Card reader 48 can be used to detect a user's identification card for locking/unlocking. The card may be a distinct physical card or incorporated into a user's portable media device (e.g., smart phone), either of which may be issued and/or controlled by an entity that may manage apparatus 90 or otherwise. In some embodiments, card reader 48 may be any suitable sensor(s) for detecting a particular user using any suitable techniques (e.g., biometrics (e.g., fingerprint, facial scan, voice recognition, etc.), typed or spoken inputs (e.g., user identifier and password, etc.), and/or the like), such that a user may not have to carry around a physical card or portable media device. A user may communicate with a locking apparatus and/or system management server (e.g., server(s) 505 of FIG. 18) and/or any suitable user device(s) (e.g., smart phones, portable media players, smart watches, etc. (see, e.g., smart card 501, app 502, app 503 of FIG. 18, etc.)) using direct interaction with a locking apparatus user interface (e.g., card reader(s), sensor(s), display screen(s), speaker(s), etc.) and/or via wireless communication using a physical card, portable media devices, mobile application(s), web app(s), web pages, and/or the like. Any suitable subsystem communication may be utilized to help manage one or more locking apparatuses, for example, communication between one or more management servers and an apparatus to manage user log-ins, apparatus availability, maintenance, and/or the like. As shown in FIG. 16B, a microcontroller 60 of a locking apparatus or any other suitable electronic component of any locking apparatus or any other suitable electronic component coupled to any locking apparatus (e.g., a kiosk that may be utilized by multiple locking apparatus) may include any suitable communication component(s) that can be configured to provide wireless communications using any suitable short-range or long-range communications protocol, such as Wi-Fi (e.g., an 802.11 protocol), Bluetooth, radio frequency systems (e.g., 1200 MHz, 2.4 GHz, and 5.6 GHz communication systems), near field communication ("NFC"), Zigbee, wireless local area network ("WLAN"), universal serial bus ("USB"), infrared, protocols used by wireless and cellular telephones and personal e-mail devices, or any other protocol supporting wireless communications. Such a communications component or components can also be operative to connect to a wired communications network or directly to another data source wirelessly or via one or more wired connections. Such a communications component or components may be a network interface that may include the mechanical, electrical, and/or signaling circuitry for communicating data over physical links that may be coupled to any suitable network and/or remote servers and/or other locking apparatus. Such network interface(s) may be configured to transmit and/or receive any suitable data using a variety of different communication protocols, including, but not limited to, TCP/IP, UDP, ATM, synchronous optical networks ("SONET"), any suitable wireless protocols, Frame Relay, Ethernet, Fiber Distributed Data Interface ("FDDI"), and/or the like. In some embodiments, one, some, or each of such network interfaces may be configured to implement one or more virtual network interfaces, such as for Virtual Private Network ("VPN") access. One or more circuit boards may be combined with any suitable sensor(s) (e.g., sensors for handling the functions of one or more of the motor(s) or actuator(s)/servo(s) 32, 34, 23, 51, and/or the like. Any suitable onboard sensor(s) may be configured to tell if a locking process has a collision with an object (e.g., vehicle spoke) before it is completed. A mesh network module 61 may be provided to connect multiple parking units together and have a group only needing one to connect directly via Wi-Fi and/or cellular or the like to reduce ongoing congestion and cost. A power extender, relay, repeater, and/or forwarder 62 may be used to connect multiple units together.

Figure 17:
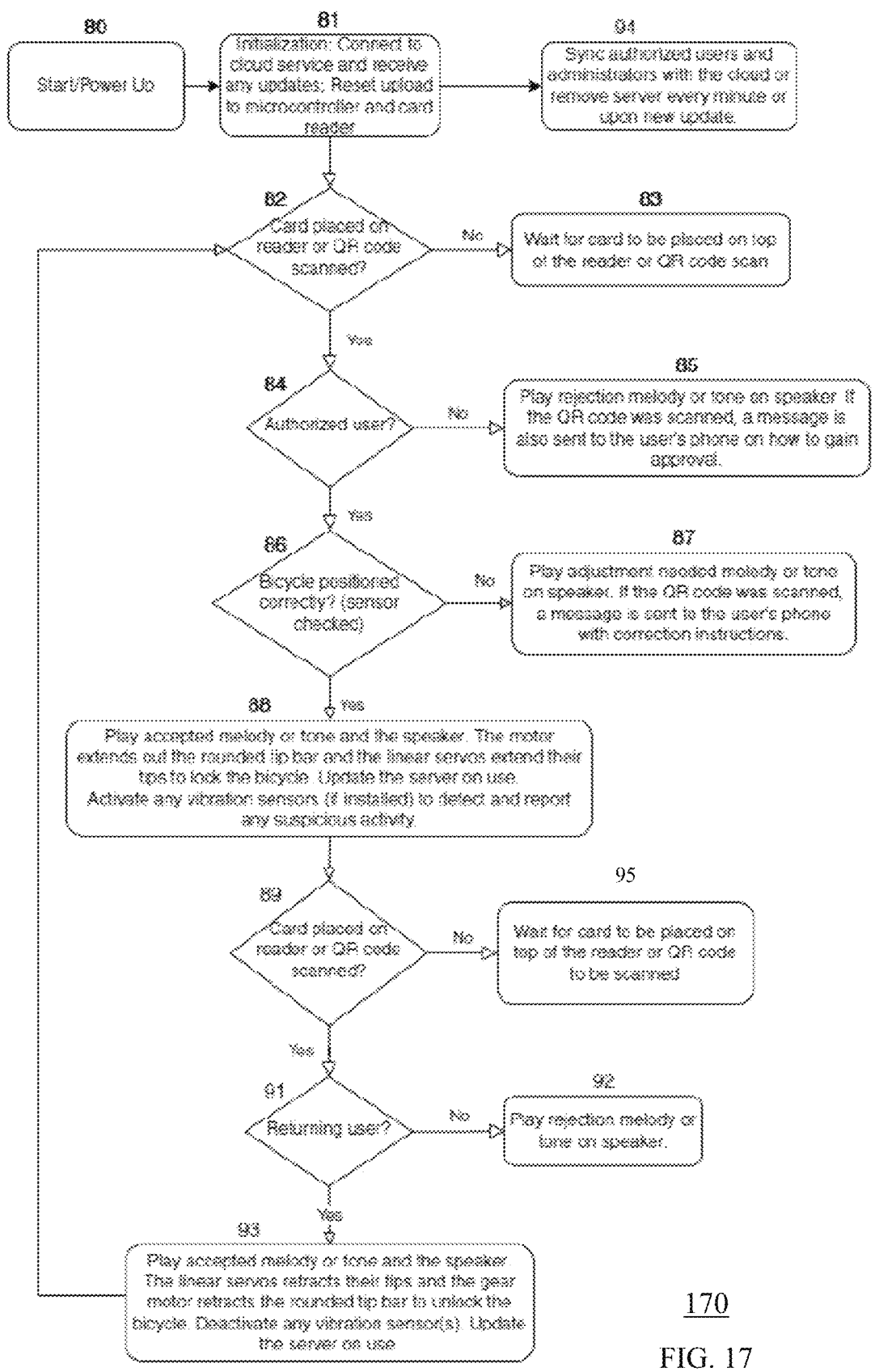
FIG. 17 is a flowchart of an exemplary process for operating the locking apparatus, according to some embodiments of the disclosure.

FIG. 17 is a flowchart of an exemplary process 170 that may be used for operating a locking apparatus, according to some embodiments of the disclosure. For example, process 170 may depict the flow of a typical use case for how the electronics of the apparatus may operate. After a start/power up at operation 80, an apparatus may be configured to run any suitable initialization operation 81, which may include coupling to any suitable cloud service and receiving any suitable updates (e.g., via a server 505), resetting upload to a microcontroller and/or card reader, and/or the like. In some embodiments, an operation 94 may then include carrying out any suitable update condition (e.g., synchronizing a list of authorized users and administrators (e.g., with server(s) 505) (e.g., periodically (e.g., every minute or upon new update)). Once the locking apparatus is running (e.g., after any suitable update(s)), it may be configured to determine at operation 82 if a user input has been received (e.g., card detected by card reader, QR code scanned, biometrics detected, user identifier/password obtained, etc.). If not, process 170 may wait at operation 83 until operation 82 does detect a user input (e.g., operation 83 may be configured to wait for someone to scan their card on the card reader or to scan a QR code or otherwise provide user identification after they position their bicycle and the arms and rear locking bar correctly). If a user input is detected at operation 82, the locking apparatus may or may not be configured to allow just any user to use their parking slots, so the system may be configured to check at operation 84 if the detected user is authorized or not. If not, it may respond to indicate that rejection to the person at operation 85 (e.g., play a rejection melody or tone on a speaker, if QR code scanned then a message may be sent to a user's phone on how to gain approval, or any other suitable output presentation may be provided for a user). If so, it may check at operation 86 to determine if the vehicle has been positioned correctly with respect to the locking apparatus (e.g., is the bicycle positioned correctly (e.g., any suitable sensor(s) may be provided by the apparatus to detect that a vehicle is positioned within slot 1a and/or that one or more bars 18 and/or 30 have been positioned properly for enabling locking and/or to determine if a vehicle component (e.g., spoke) has prevented proper bar positioning, etc.). If any necessary adjustments are detected at operation 86, then operation 87 may provide any suitable adjustment instructions (e.g., play adjustment needed melody or tone on speaker, if QR code was scanned a message may be sent to the user's phone with correction instructions, etc.), which may indicate by any suitable sound or alert or other suitable user interface on the apparatus of user device or otherwise that one or more adjustments ought to be made. If no necessary adjustments are detected at operation 86 (e.g., if a locking extension path is clear), then operation 88 of the locking apparatus may provide any suitable feedback and complete a locking function (e.g., play accepted melody or tone with a speaker, use motor(s) to extend out a rounded tip bar (e.g., bar 30) and/or use linear servo(s) to extend tip(s) to lock one or more bars to lock the vehicle, update a server with current use status of the apparatus, activate any feedback sensor(s) (e.g., haptic sensor(s) to detect and/or report any suspicious activity with respect to the vehicle once locked, etc.), advance the user's mobile app to the locking complete message when appropriate, and/or the like). The vehicle may remain securely locked. While the vehicle is securely locked (e.g., after any suitable operation(s) 88), it may be configured to determine at operation 89 if a user input has been received (e.g., card detected by card reader, QR code scanned, biometrics detected, user identifier/password obtained, etc.). If not, process 170 may wait at operation 95 until operation 89 does detect a user input (e.g., operation 95 may be configured to wait for someone to scan their card on the card reader or to scan a QR code or otherwise provide user identification). If a user input is detected at operation 89, the system may be configured to check at operation 91 if the detected user is authorized or not (e.g., whether the detected user is the same as or has an authorized association with (e.g., shares a family plan with) the user that was previously authorized at operation 84 prior to the locking). If not, it may respond to indicate that rejection to the person at operation 92 (e.g., play a rejection melody or tone on a speaker, if QR code scanned then a message may be sent to a user's phone on how to gain approval, or any other suitable output presentation may be provided for a user). If so, then operation 93 of the locking apparatus may provide any suitable feedback and complete an unlocking function (e.g., play accepted melody or tone with a speaker, use linear servo(s) to retract tip(s) to unlock one or more bars and/or use motor(s) to retract out a rounded tip bar (e.g., bar 30) to unlock the vehicle, update a server with current use status of the apparatus, deactivate any feedback sensor(s) (e.g., haptic sensor(s) used to detect suspicious activity during locking, etc.), advance the user's mobile app to the unlocking complete message or manual unlocking now ready message (e.g., for bar 18) when appropriate, and/or the like). Then process 170 may return to operation 82 (e.g., to return to determining if a user input is received to park a vehicle). Such a return to operation 82 from operation 93 may also be configured to occur only after the apparatus determines that the previously locked vehicle has been removed from the apparatus (e.g., from slot 1*a*). For example, operation 91 may checks to determine if user information obtained at operation 89 matches or is associated with the user identified by the user information obtained at operation 82 (e.g., to see if the information matches the original user). If it is not a match, rejection is indicated at operation 92. If it is a match, it may be configured at operation 93 to indicate the acceptance sound(s), unlock, send the appropriate indication to the mobile app or otherwise for user notification, and/or the like. Additional operations and flows for more atypical cases can be developed. Also, at each operation of responding to user input, the activities may be reported to a cloud service to be monitored and analyzed to keep vehicles safe, help create better parking experiences, and/or help create ways to encourage people to ride vehicles more for transportation. Optional additions of electronic parts can add additional functionality, such as microprocessor 44 for determining from sensor readings (e.g., of object sensor 55) that a bar (e.g., bar 30) may likely collide with a spoke or another part of a vehicle and prompt the user to change the orientation of the vehicle (e.g., orientation and/or position of a bicycle wheel), such as through any suitable user notification (e.g., by a specific speaker tone, melody, or speech, and/or mobile app notification, and/or the like). Another example may be using one or more vibration sensors 56 to detect unauthorized tampering of an arm and/or locking bar after a vehicle is locked and have a microprocessor send a command to a cloud service to notify the vehicle owner, the person or entity in charge of managing the parking slots, and/or any relevant support members, so that they may act and help prevent any theft from being carried out successfully.

It is understood that the operations shown in process 170 of FIG. 17 are only illustrative and that existing operations may be modified or omitted, additional operations may be added, and the order of certain operations may be altered.

Figure 18:
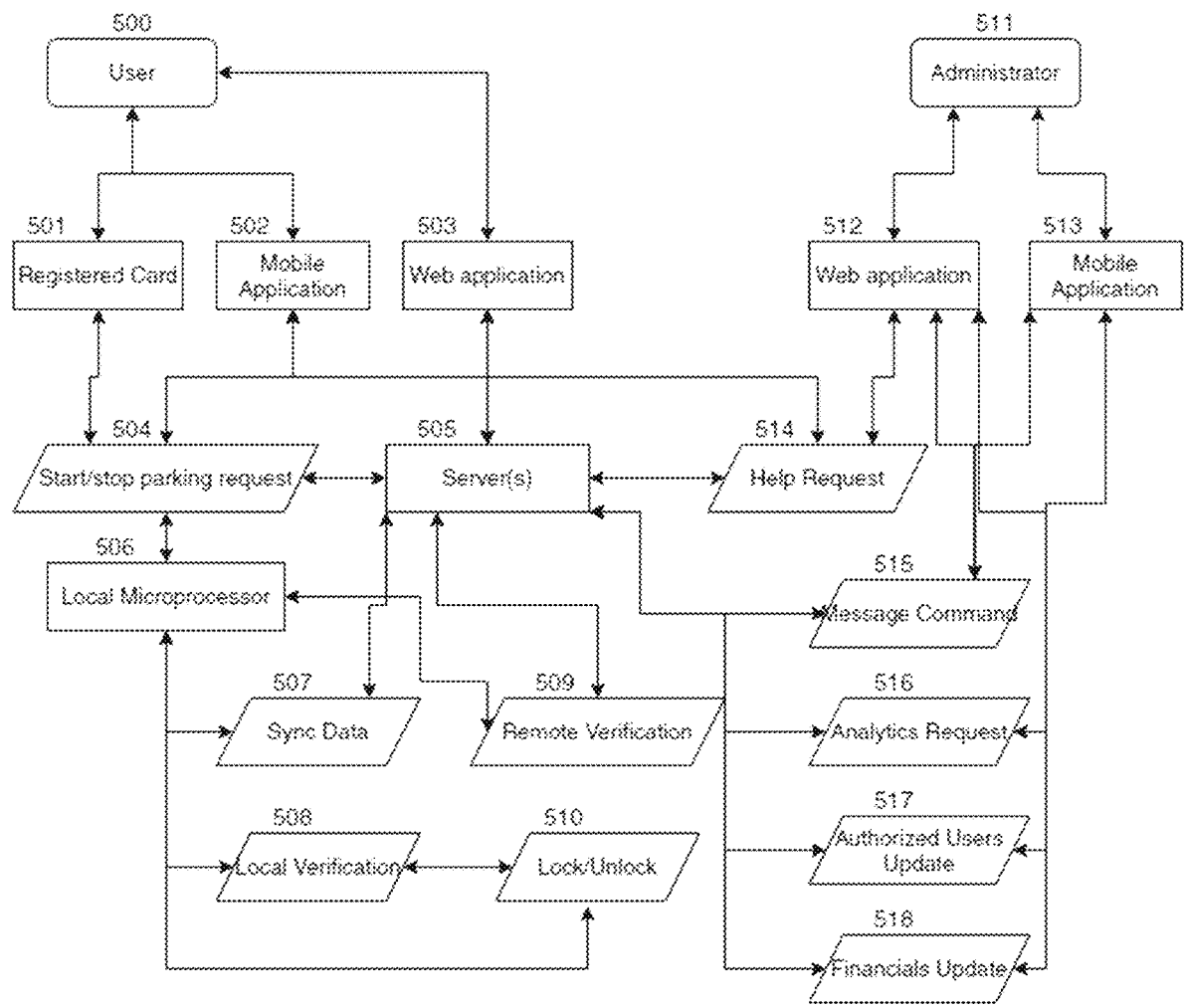
FIG. 18 is an exemplary device flow diagram of how various devices of a system including the locking apparatus may work together, according to some embodiments of the disclosure.

FIG. 18 is an exemplary device flow diagram 180 of how various devices of a system including a locking apparatus (e.g., locking apparatus 90) may work together, according to some embodiments of the disclosure, such as when operated by one or more users 500 (e.g., vehicle owner(s)/user(s)) and one or more clients or administrators 511 (e.g., owner(s) of the parking spot(s) and/or those designated by the owners to oversee or manage the parking spot(s)). Each user 500 may use a registered card 501, a mobile application 502, and/or a web application 503 on a device (e.g., a smart phone or the like) that they bring to be able to use the parking slots and lock and unlock their vehicles. Alternatively, as mentioned, the system may be configured such that a registered user need not carry any additional component(s) but instead may user biometrics or identifier/password knowledge to provide to the apparatus during an attempted use. A registered card 501 may be configured to communicate directly with the local system with a start/stop parking request 504 and any suitable microprocessor 506 that may be configured to check locally at operation 508 and/or remotely via one or more server(s) 505 at operation 509 for a registered and perhaps an authorized user as set by an administrator 511 of that parking spot, which may lead to any suitable locking and/or unlocking operation 510 if approved. A mobile application 502 and/or a web application 503 may be configured to allow the user to directly make a start/stop parking request 504 if an embodiment is configured for Bluetooth or other proximity connection or through server(s) 505. Such a mobile application 502 and/or web application 503 can be configured to allow users to request help and/or report issues at an operation 514. Users verified remotely may not have to pass a local verification check, although, in some embodiments, server(s) 505 may be configured to update the local systems/microprocessors 506 at operation 507. Aside from locking and unlocking a vehicle, a user 500 may receive any suitable communications 515 from administrator 511 of the parking spot to help ensure vehicles are parked as desired (e.g., within certain hours, granted authorization, unusual activity alerts, etc.) in an automated way or manually such as for specific cases. Administrator(s) 511 may manage their parking spots using a web application 512 and/or a mobile application 513 with any suitable digital device(s). Administrator(s) 511 may restrict at operation 517 their parking spaces for registered users in their organization or of a group of their choosing and make changes to those authorized users and/or set conditions (e.g., authorized period, locations authorized, etc.) if desired. Administrator(s) 511 may also choose to charge at operation 518 one or more users 500 for parking based on duration or another appropriate reason. User(s) 500 may be notified (e.g., through mobile application 502 and/or web application 503) based on any appropriate reason, such as being notified of the charged amount or credit deduction when they request the parking to stop at operation 504. It may be set up so that users may deposit money into their account with the system before parking use. Over time, they can view usage metrics and analytics at operation 516 on utilization as well as maintenance or service needs, such as battery levels, and the number of times each spot has locked and unlocked bicycles. In the case of emergency or other unusual situation, administrator(s) 511 may unlock and lock their parking spots and trigger automatic notification to user(s) 500 affected. These flows may be modified to serve the purposes appropriate for each location and cover more or fewer functions and/or devices.

It is understood that the operations shown in diagram 180 of FIG. 18 are only illustrative and that existing operations may be modified or omitted, additional operations may be added, and the order of certain operations may be altered.

Figure 19:
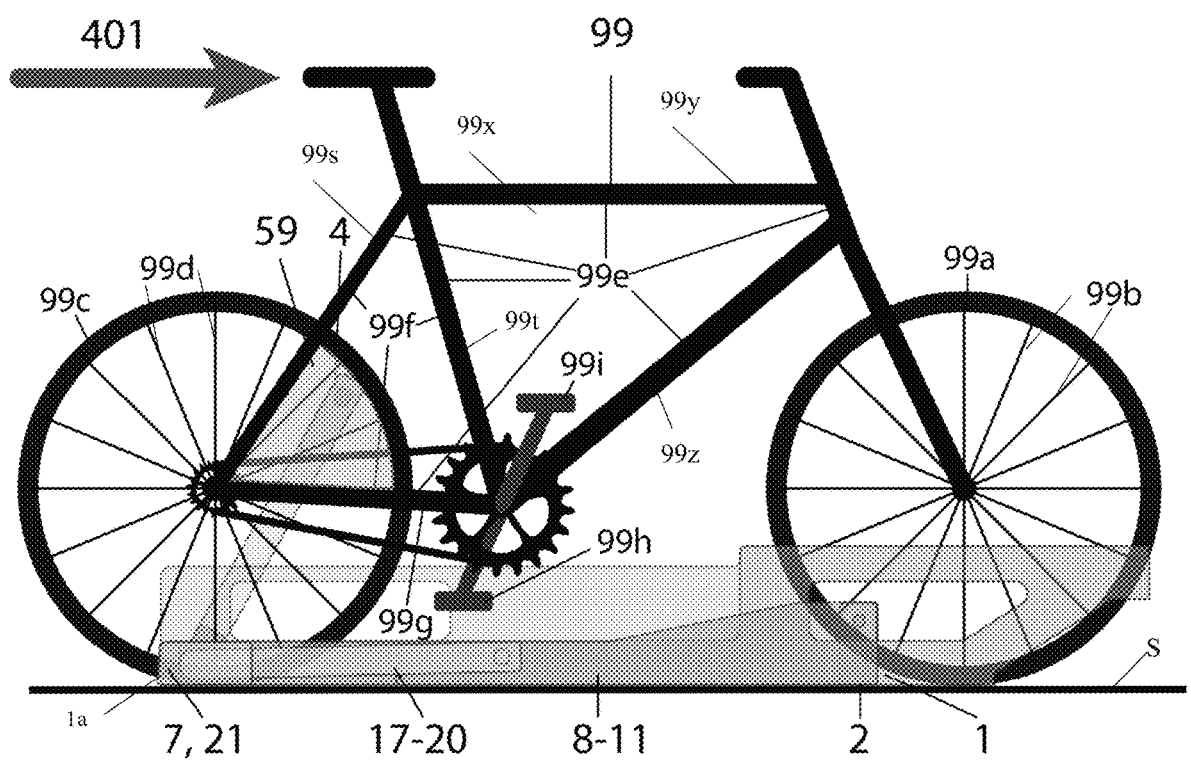
FIG. 19 is a side view of a bicycle inserted in a bicycle slot of the locking apparatus, according to some embodiments of the disclosure.

FIG. 19 depicts a diagram of a bicycle 99 inserted in the direction of arrow 401 into a slot 1*a* of apparatus 90. In some embodiments, as shown, bicycle 99 may include a front wheel 99*a*, front wheel spokes 99*b*, a rear wheel 99*c*, rear wheel spokes 99*d*, a chassis or frame 99*e* that may include a rear triangle 99*f* (e.g., as may be defined by a seat tube 99*t*, chain stays 99*g*, and seat stays 99*s*) and a front triangle or portion 99*x* (e.g., as may be defined by seat tube 99*t*, a top tube 99*y*, and a down tube 99*z*), a left pedal 99*h*, and a right pedal 99*i*. Arm 4 may already be oriented in the generally correct position and may be configured to have limited rotation to keep the user from locking improperly outside the intended locking zone 59 (e.g., a wheel-frame intersection area or space or the intersection of wheel 99*c* and frame 99*e* of the vehicle (e.g., through a first space defined by wheel 99*c* (e.g., a wheel space defined by two or more spokes 99*d* of wheel 99*c*) and through a second space defined by frame 99*e* of the vehicle (e.g., a frame space defined by rear triangle 99*f* of frame 99*e*), where the first space and the second space at least partially overlap or share at least a common space 59 (e.g., including the intersected area) through which locking bar 18 may extend when locking bar 18 is held by arms 4 and 17)), while rotation of arm 4 may allow some freedom to avoid portions of the vehicle (e.g., spokes 99*d* and/or frame 99*e*) and/or to support larger and smaller bicycles. Bar arm assembly 17-20 may be configured to rest on main container 9 (e.g., in an upward tilted manner (e.g., as may be shown in FIG. 1A) to help indicate that it can be moved upwards).

Figure 20:
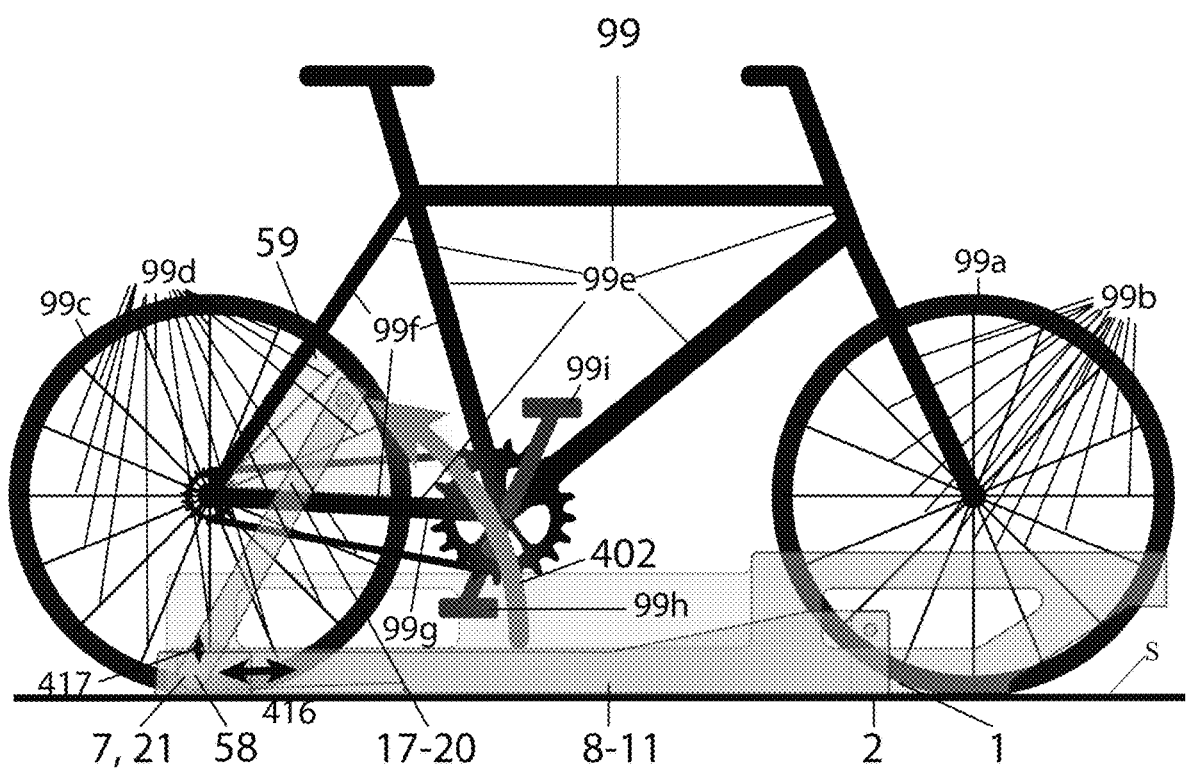
FIG. 20 is a side view of the bicycle in a locked state of the locking apparatus, according to some embodiments of the disclosure.

As shown in FIG. 20, after moving bar arm assembly 17-20 upward following the direction of arrow 402 (e.g., from the position of FIG. 19) so that the position of a bar portion (e.g., top) of arm 17 may substantially oppose the position of a bar portion (e.g., top) of arm 4, bar 18 may be extended therebetween via vehicle intersection space or common space 59 such that apparatus may then be locked or in a ready-to-lock state (e.g., pending card tap or code scan or any other suitable user authentication). In some embodiments, axis of rotation 58 for both arms 4 and 17 may be shifted together laterally in either direction of arrows 416 and/or vertically in either direction of arrows 417 to be able to accommodate an increased size range of bicycles.

FIGS. 21A-26 depict an alternative embodiment of a locking apparatus 90' with a different slot or rack and just a wheel locking mechanism. Such an embodiment may be used as a less expensive and/or smaller offering and/or to be combined with other security measures in a different way. A similar embodiment that may be scaled up in size may be used for a range of motorcycles or mopeds. Another similar embodiment that may be scaled down in size might be used for a range of scooters.

Figure 21A:
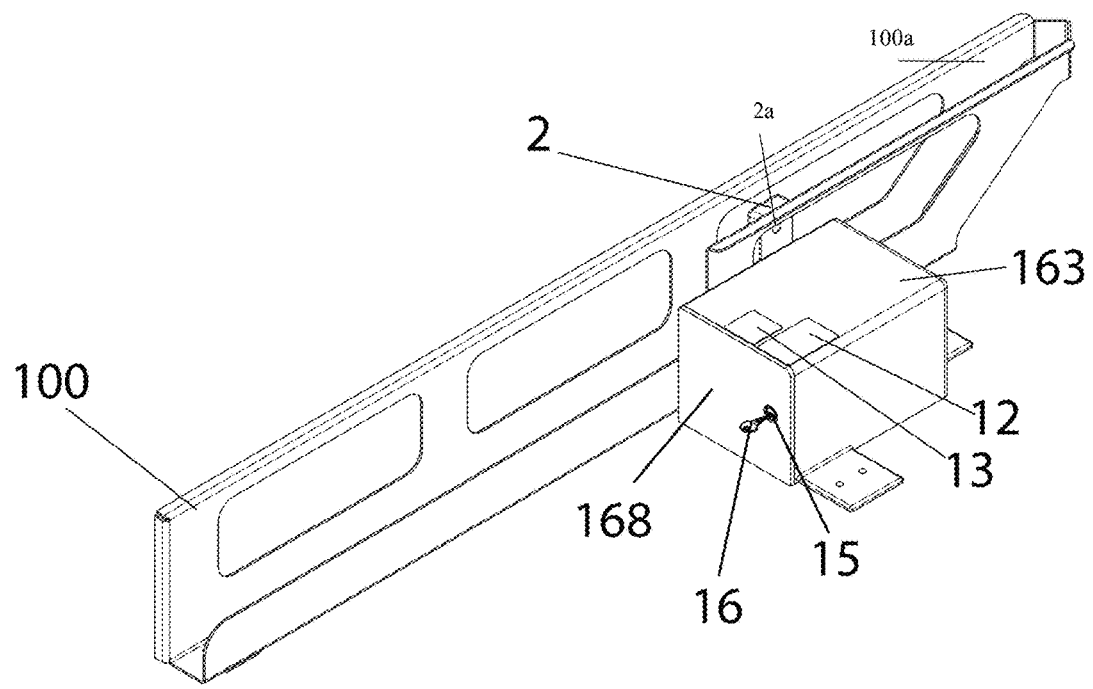
FIGS. 21A and 21B are different perspective views of an exemplary alternative locking apparatus, according to some embodiments of the disclosure.
Figure 21B:
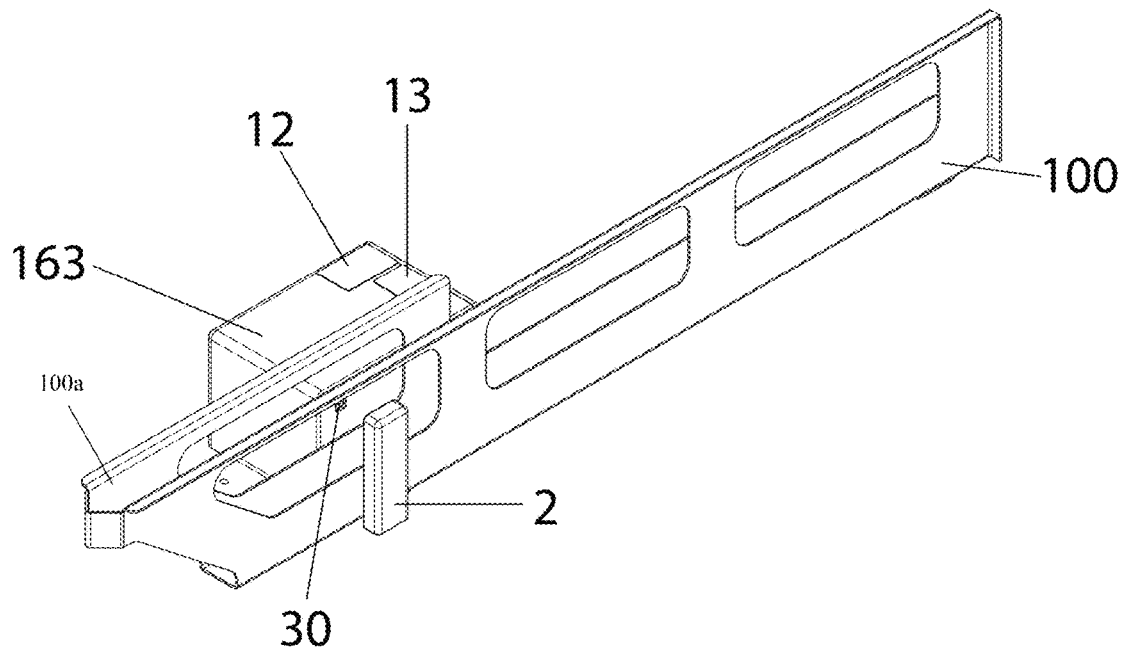

FIGS. 21A and 21B show the overall assembly from two views. A different slot structure 100 may be provided (e.g., made of a strong, durable metal that may be at least water or corrosion resistant on the outside with an optional soft finish or UV-resistant plastic for holding a bicycle, ideally without scratching it). For example, slot structure 100 may be a Dero Decker lower tray or any other suitable tray that may provide any suitable slot 100a for receiving any suitable vehicle (e.g., a wheel of a bicycle or other suitable wheeled transportation device). Block 2 with a receptacle 2a may be provided on a side of slot structure 100 and a differently shaped main container 163 may be provided with any suitable signage or stickers or indicators 12 and/or 13, and an access panel assembly for maintenance of elements 15, 16, and/or 168. For maintenance, a key 16 can be inserted into a latch mechanism 15 and turned to unlock a panel 168 to access the components inside main container 163. Latch mechanism 15 can also be replaced by an internal opening mechanism that may be configured to open when an authorized administrator sends a software command for it to do so. Block 2, main container 163, panel 168, and latch mechanism 15 may be made of a metal or any suitable strong material, for example, with a rust-resistant surface and/or finish, including, but not limited to, stainless steel, zinc-plated steel, and/or the like.

Figure 22A:
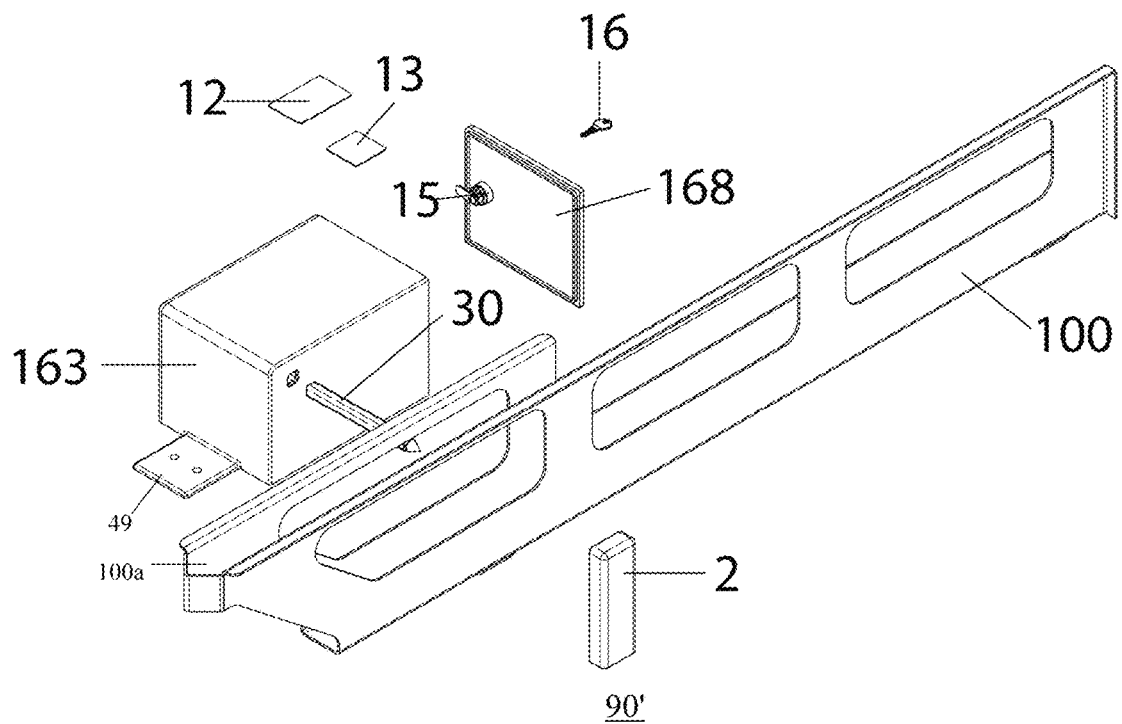
FIGS. 22A and 22B are different perspective exploded views of the alternative locking apparatus, according to some embodiments of the disclosure.
Figure 22B:
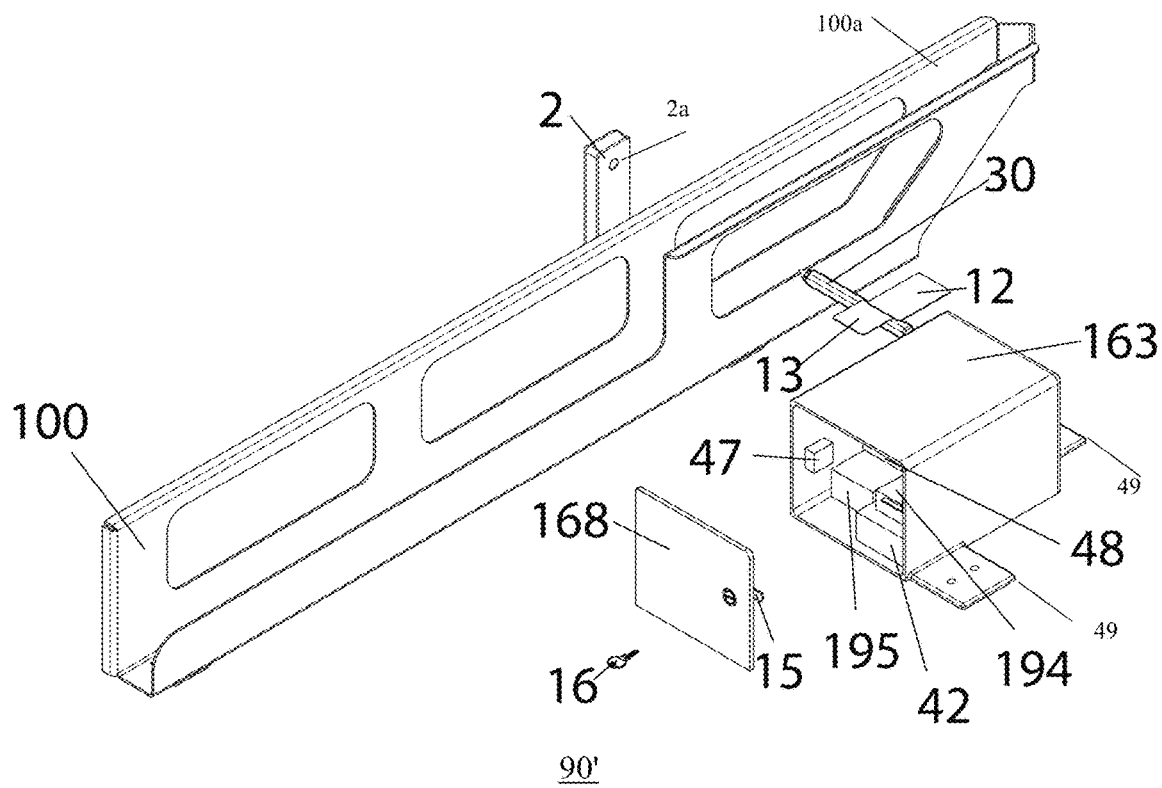

FIGS. 22A and 22B explodes main sub-groups of FIGS. 21A and 21B. Block 2 with receptacle 2a may be mounted (e.g., permanently) to slot structure 100 or a solid surface with adhesive or a flange mount 49 like those shown on main container 163. Main container 163 may be mounted to the ground, preferably made of a solid material like concrete, by driving something like an anchor spike through its flange mount holes (e.g., of flanges 49). Bar 30 (e.g., a rounded tip bar) may be extended out of main container 163 and into receptacle 2a of block 2 on the opposite side of slot 100a to lock a bicycle. After using key 16 to unlock latch mechanism 15 and detach panel 168 from main container 163, several electronic boards may be revealed (e.g., speaker 47, circuit board 195, microprocessor 194, a power unit (AC power unit or battery) 42, card reader 48, and/or the like).

Figure 23A:
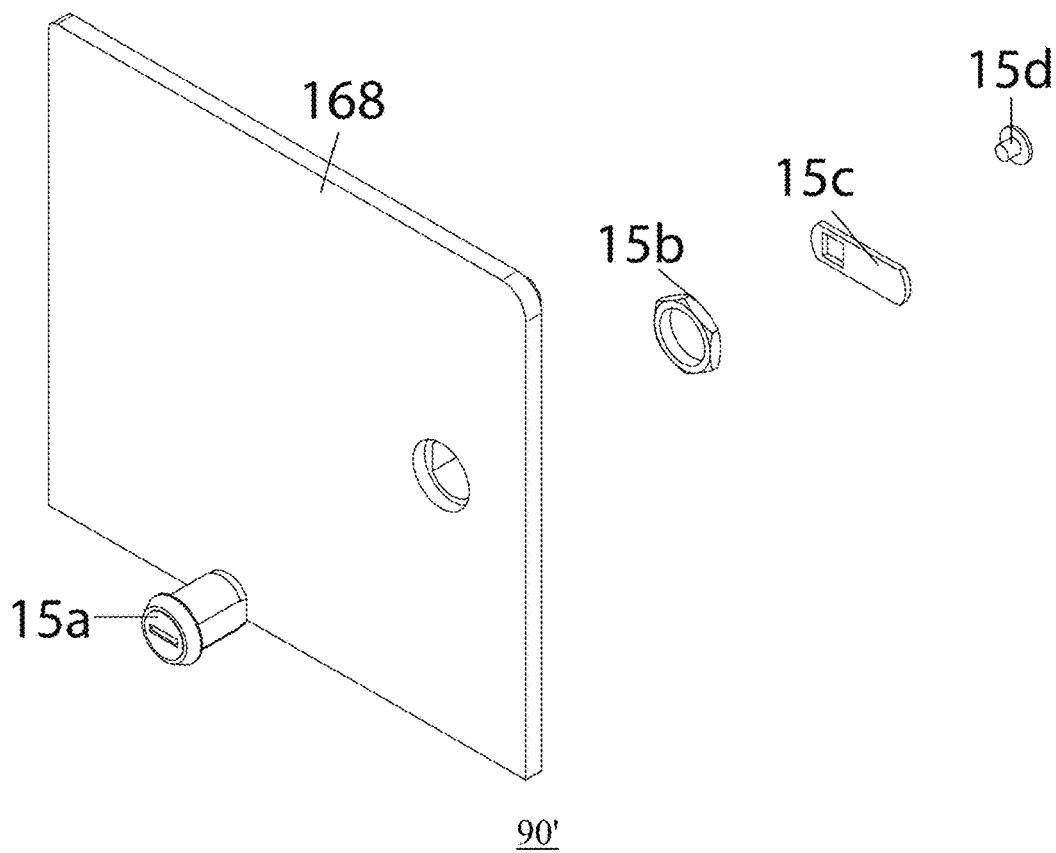
FIGS. 23A and 23B are different perspective exploded views of an access panel of the alternative locking apparatus, according to some embodiments of the disclosure.
Figure 23B:
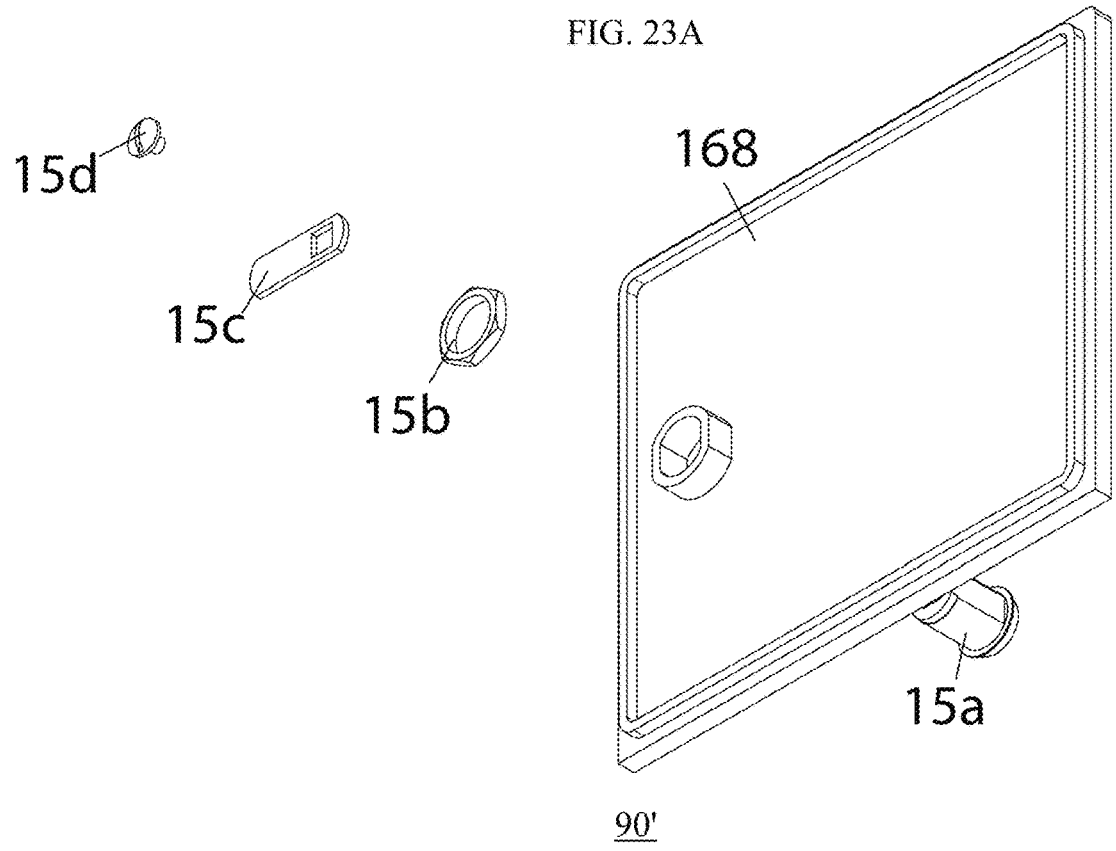

FIGS. 23A and 23B explodes latch mechanism 15 that may be used to lock and unlock panel 168 from main container 163. This is just one example and variations can be made to serve the same purpose. A barrel with keyhole 15a can be used to rotate latch 15c into and out of the corresponding area in main container 163 that may prevent panel 168 from being pulled out. A screw 15d may be used to hold latch 15c and washer 15b to keyhole barrel 15a.

Figure 24A:
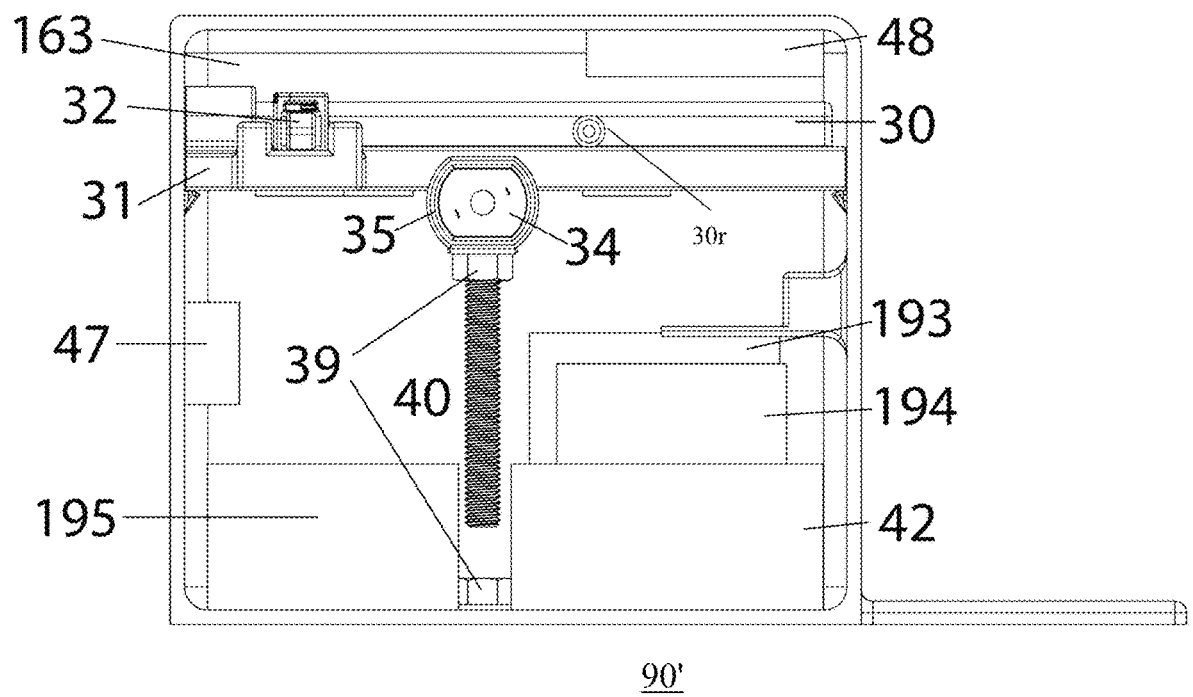
FIGS. 24A and 24B are side and perspective views of internals of a container of the alternative locking apparatus, according to some embodiments of the disclosure.
Figure 24B:
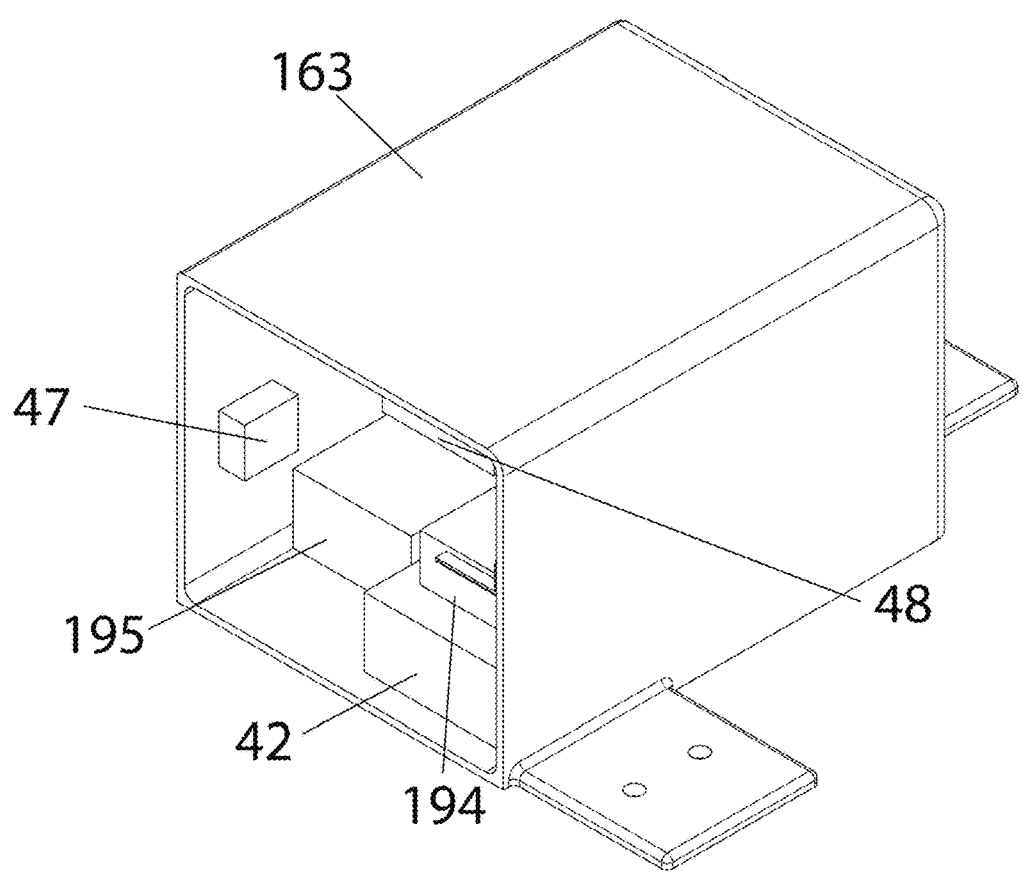

FIGS. 24A and 24B show an interior of main container 163 after panel 168 may be removed, but with various components assembled inside it. FIG. 24A reveals a microcontroller 193 in the rear. To the right of it and much closer to the front may be a stub of main container 163 that may be configured to limit the rotation of latch mechanism 15 to approximately 180 degrees and prevent it from being pulled out at around the 0 degrees position. Bar 30 may include a receptacle 30r (e.g., as shown by circles, although receptacle 30r can be any other suitable shape(s)) to which a linear actuator or servo 32 may extend its tip into to keep it in a locked position after bar 30 is extended out. Both bar 30 and linear actuator or servo 32 may be mounted on top of a platform 31, which may or may not have guide extrusions for support columns and may rest on two guides that may be a part of main container 163. A motor 34 with a mount 35 may have vertical support. In this case, it may be in the form of two nuts 39 and a threaded rod 40 that can be longer than depicted.

Figure 25:
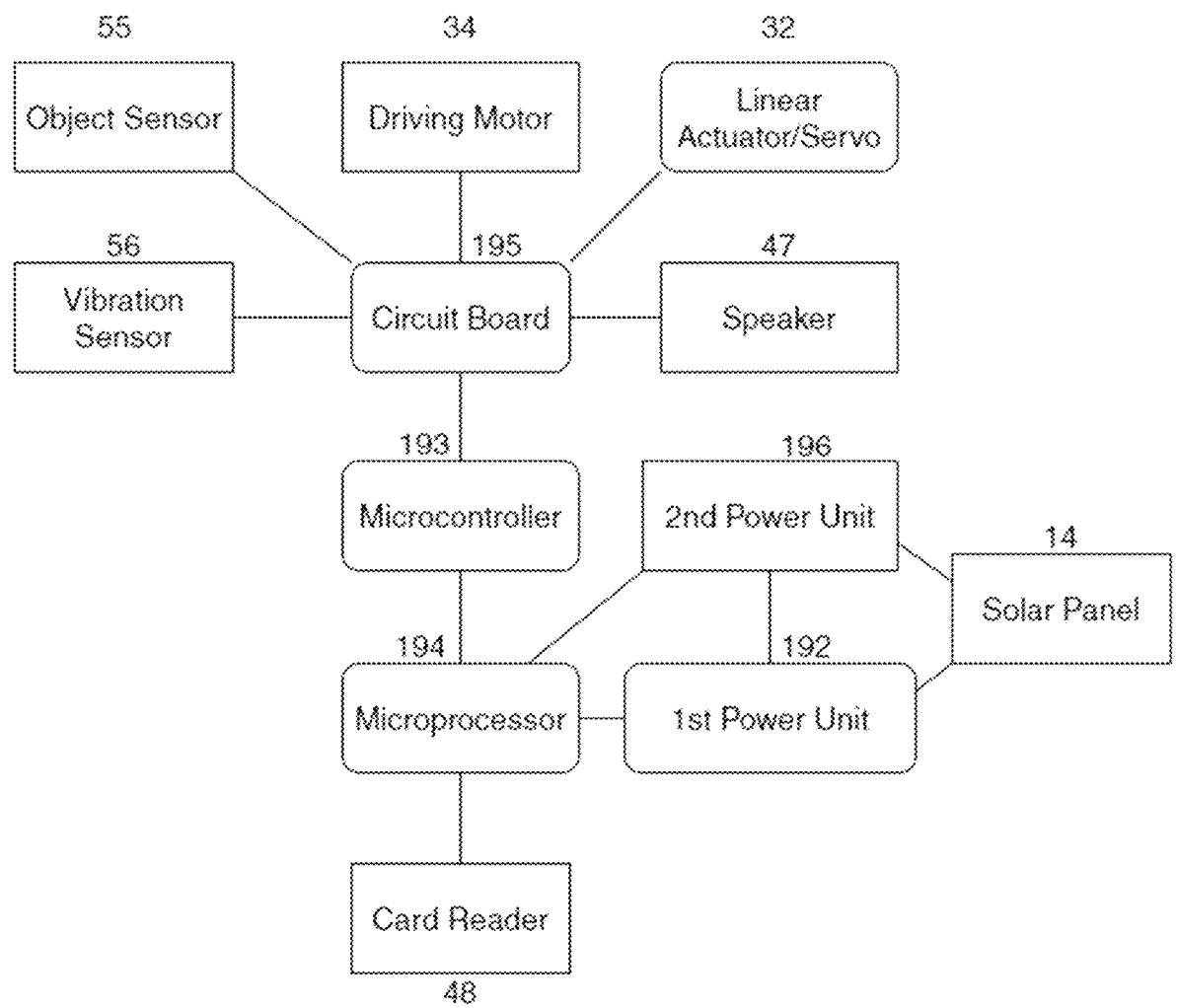
FIG. 25 is a schematic diagram of electronic components of the alternative locking apparatus, according to some embodiments of the disclosure.

FIG. 25 shows a configuration of how various electronic parts may be coupled in apparatus 90'. The layout may be similar to that in FIG. 16A, although some of the parts like a microprocessor, microcontroller, and/or circuit board may be chosen or designed differently. Optional parts may be in sharp rectangles, which may include object sensor 55, a vibration sensor 56, a speaker 47, a card reader 48, a solar panel 14, and a second power unit 196. Object sensor 55 may be configured to help detect if bar 30 would hit (e.g., head on) a spoke or any other suitable component of the vehicle. Vibration sensor 56 may be configured to help detect suspicious activity like someone kicking the container. Speaker 47 may be configured to play tones or short melodies in approval, rejection, if adjustment needed, and/or any other situations that would be appropriate. If parking is outdoors or under a lot of light, solar panel 14 can be added and linked to a battery to lower the need for maintenance based on frequency. Second or backup power unit 196 (e.g., a battery) can be added as well to prevent the system from being inoperable in case the primary power unit fails unexpectedly for whatever reason.

Figure 26:
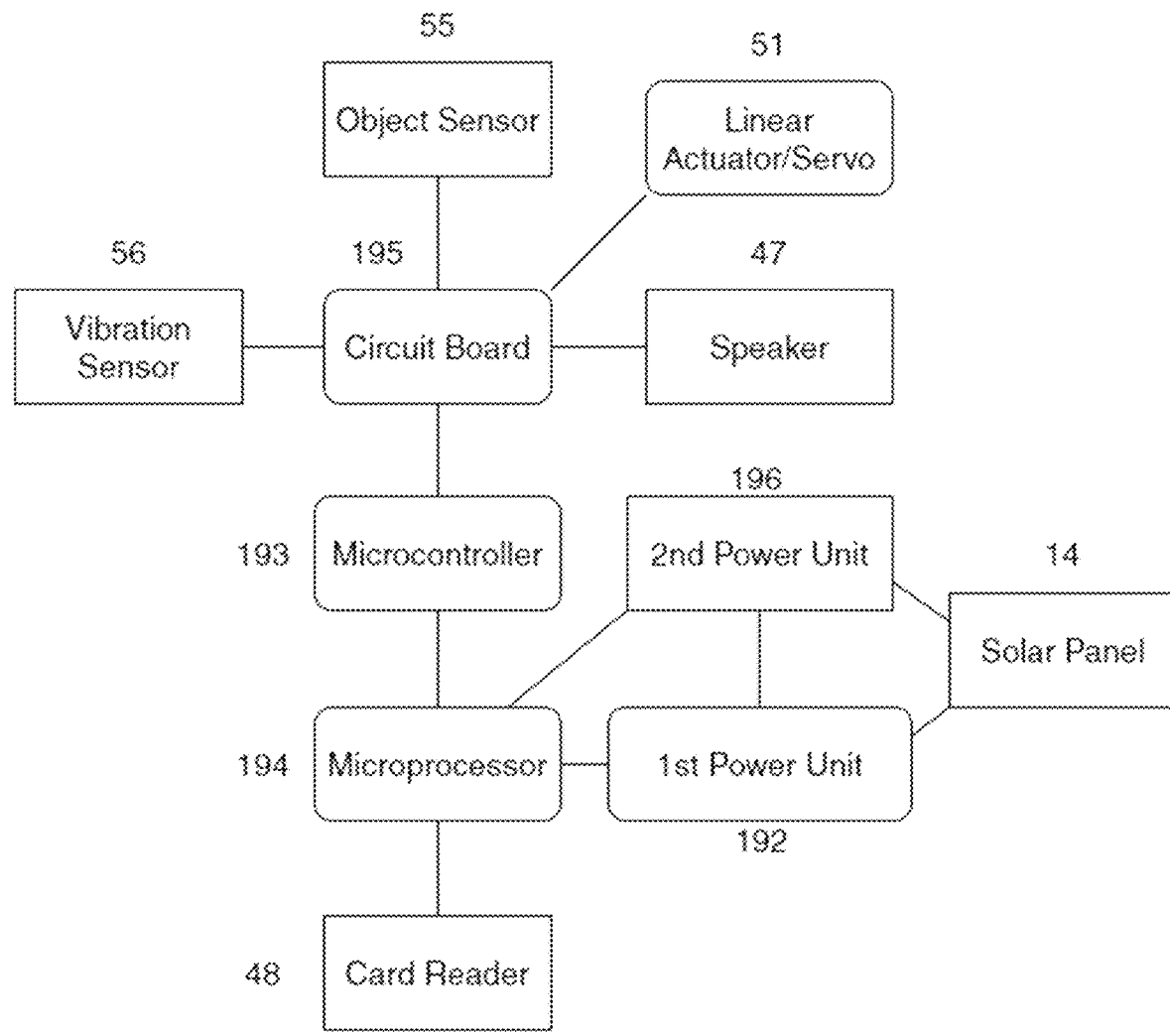
FIG. 26 is a schematic diagram of alternative electronic components of the alternative locking apparatus, according to some embodiments of the disclosure.

FIG. 26 shows a configuration of how various electronic parts may be coupled with a single motor (e.g., the linear actuator/servo) configuration (e.g., like the possible one shown in FIGS. 15A and 15B). By removing a second motor, an intermediary gear may also be removed along with other additional parts, which may reduce the complexity and number of moving parts, which may make the system more durable and/or easier to maintain.

Figure 27:
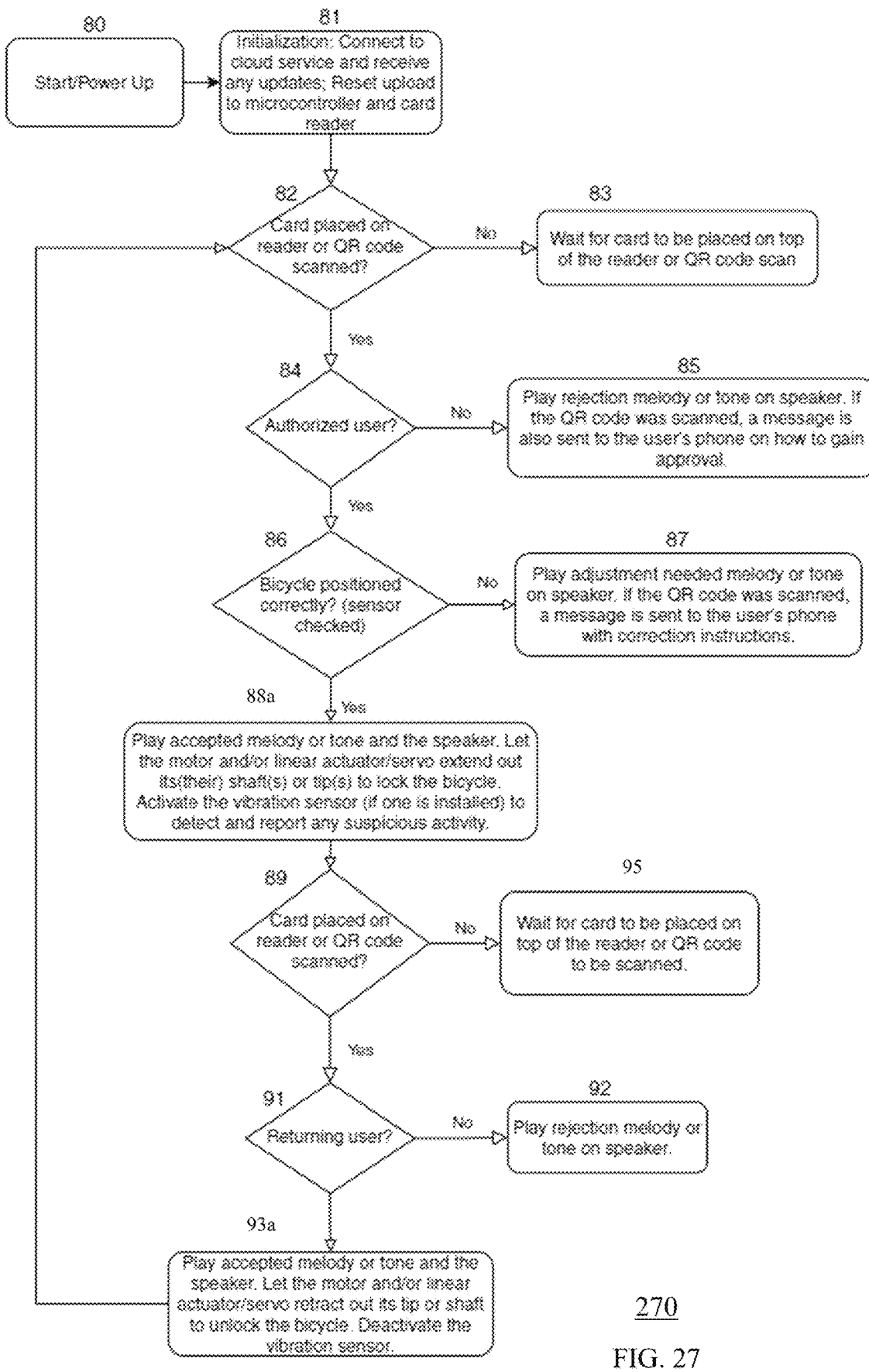
FIG. 27 is a flowchart of an exemplary process for operating the alternative locking apparatus, according to some embodiments of the disclosure.

FIG. 27 is a flowchart of an exemplary process 270 for operating alternative locking apparatus 90', which may show how the electronics may work and/or may be controlled (e.g., for the software running it). Periodically, the system may receive updates on who is authorized to access the system or not. Process 270 may be the same or substantially the same as process 170, except operation 88a and operation 93a of process 270 may differ from operation 88 and operation 93, respectively, of process 170 for locking and unlocking by not activating any linear servos with respect to any rear arm/bar assembly (e.g., arms 4/17 and bar 18). Moreover, although not shown in FIG. 27, operation 94 of FIG. 17 may be similarly provided in process 270.

It is understood that the operations shown in process 270 of FIG. 27 are only illustrative and that existing operations may be modified or omitted, additional operations may be added, and the order of certain operations may be altered.

FIGS. 28A-32 are depictions of an exemplary other alternative locking apparatus 90" that may include a slot structure 100 and just the frame and rear wheel locking mechanism. This embodiment may be appropriate for densely packed parking spaces in an arrangement like ones shown in FIG. 38A that may be next to a wall or another row of parking slots facing the opposite direction as a less-expensive alternative for the spaces in the middle and not at the edges. Front wheels may be more difficult for thieves to reach, so protecting the rear wheel and frame may be enough. Also, depending on the area where this is installed, just locking the rear wheel and the frame of the bicycle may be enough to deter nearly all cases of theft. This may also be combined with other forms of security.

Figure 28A:
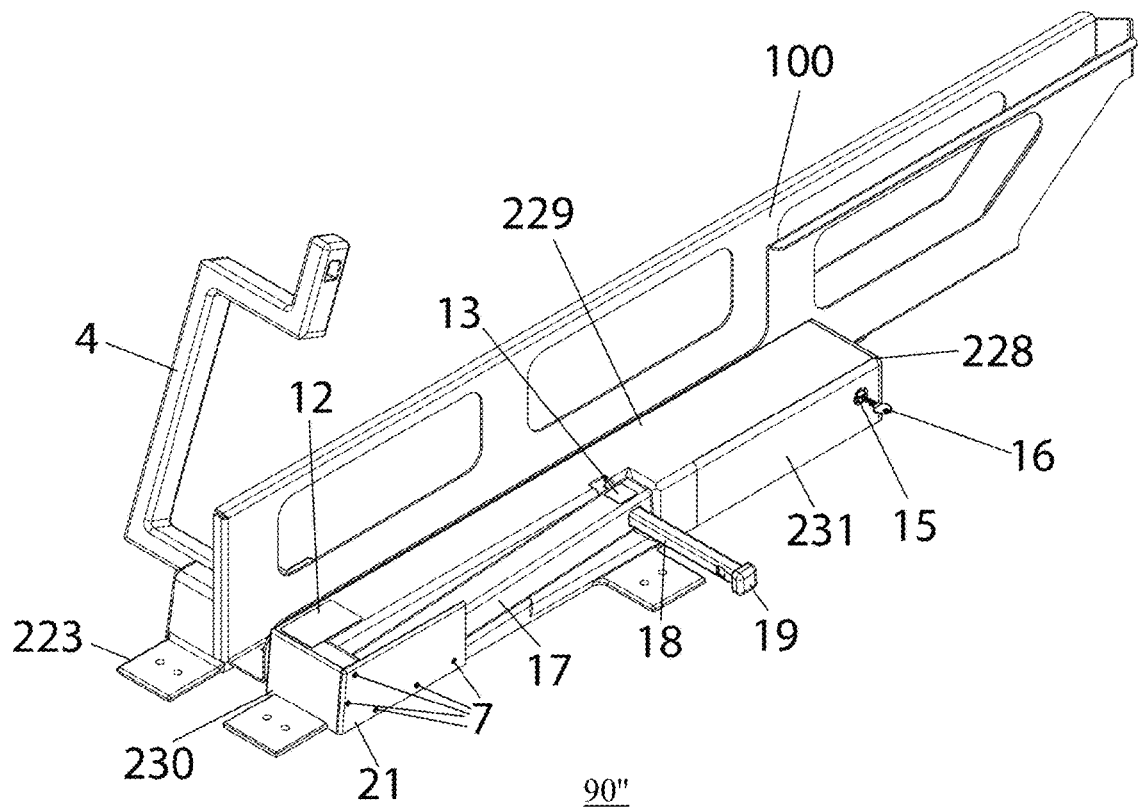
FIGS. 28A and 28B are different perspective views of an exemplary other alternative locking apparatus, according to some embodiments of the disclosure.
Figure 28B:
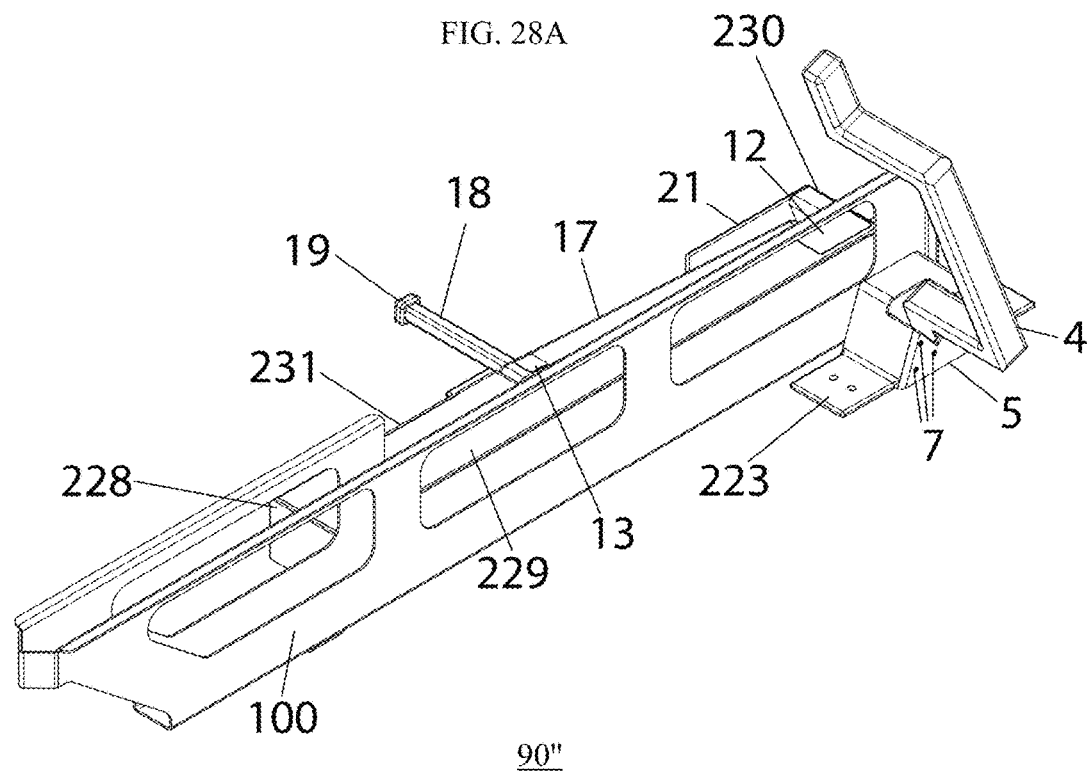

FIGS. 28A and 28B depict apparatus 90" with just the assembled frame and rear wheel locking mechanism. A main container 229 may include a shape that is smaller than other embodiments feature some flange mounts. Instead of a diagonal access block 11, there may be a flat block 231 with latch mechanism 15 shifted. There may also be a front panel 228. On the left side, an arm base 223 may feature flange mounts, too, for a possible mounting configuration. Aside from those changes, it may be similar to apparatus 90.

Figure 29A:
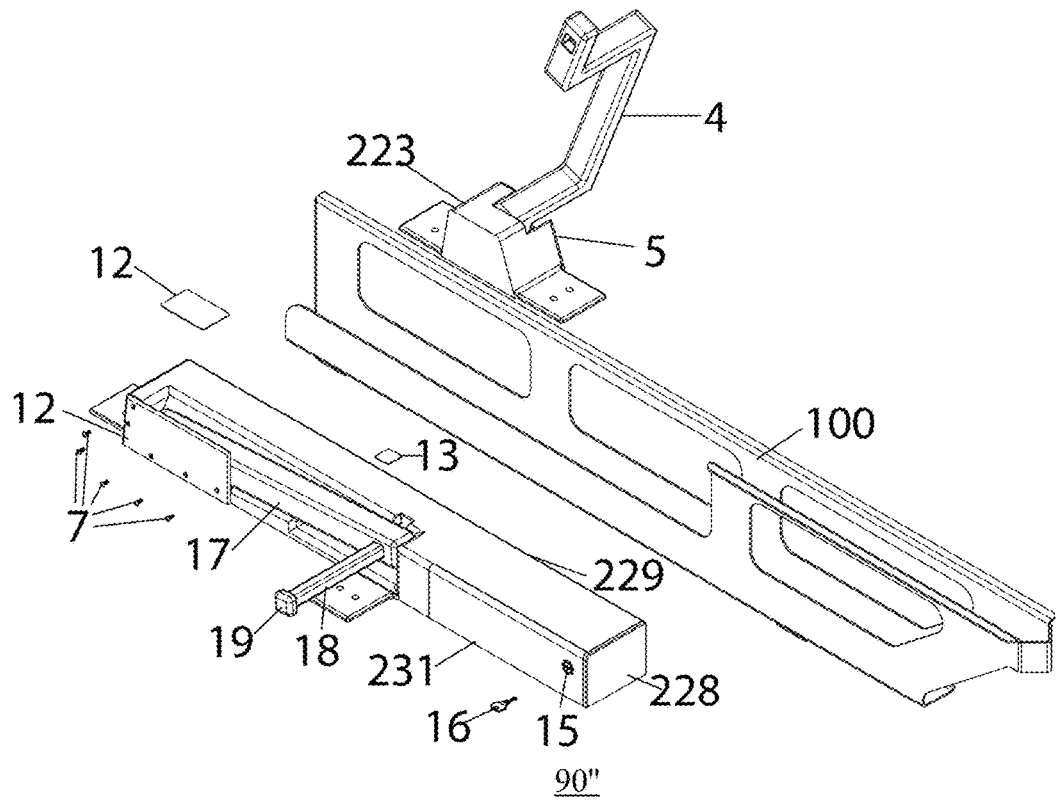
FIGS. 29A and 29B are different perspective exploded views of the other alternative locking apparatus, according to some embodiments of the disclosure.
Figure 29B:
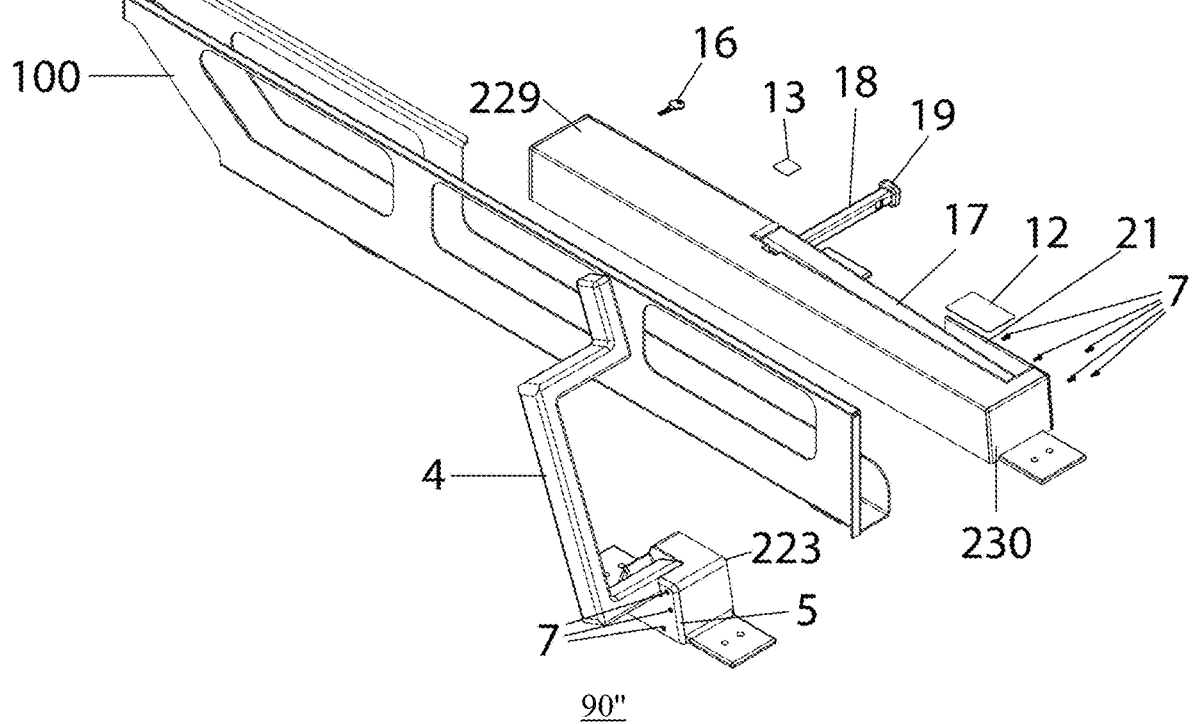

FIGS. 29A and 29B illustrate an exploded view of apparatus 90" of FIGS. 28A and 28B (e.g., to a limited level). Arm base 223 (e.g., a corrosion resistant metal arm base) may be mounted permanently to the ground (e.g., preferably made of a solid material like concrete) with 2-4 bolts, such as anchor spikes, at least one on each side and with adhesive to help base 223 be stuck onto slot structure 100 as well with strong adhesive or tape. This also may apply to main container 229 on the other side (e.g., for permanent or substantially permanent mounting to the ground as well as sticking to slot structure 100).

Figure 30A:
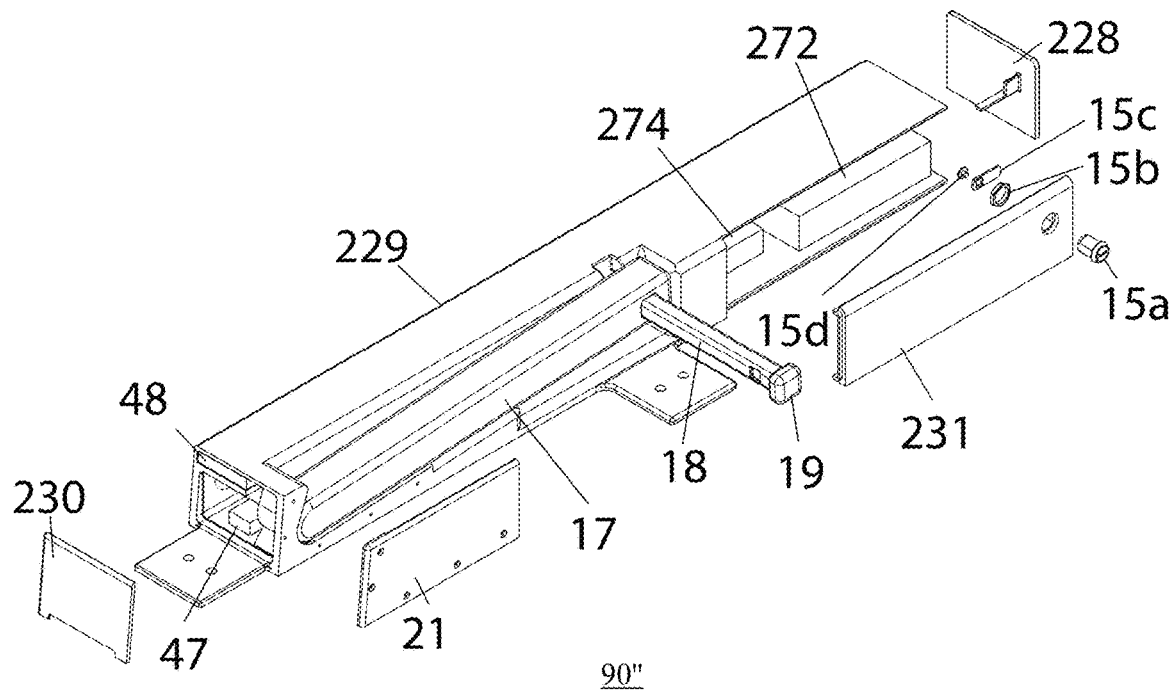
FIGS. 30A and 30B are different perspective exploded views of the other alternative locking apparatus, according to some embodiments of the disclosure.
Figure 30B:
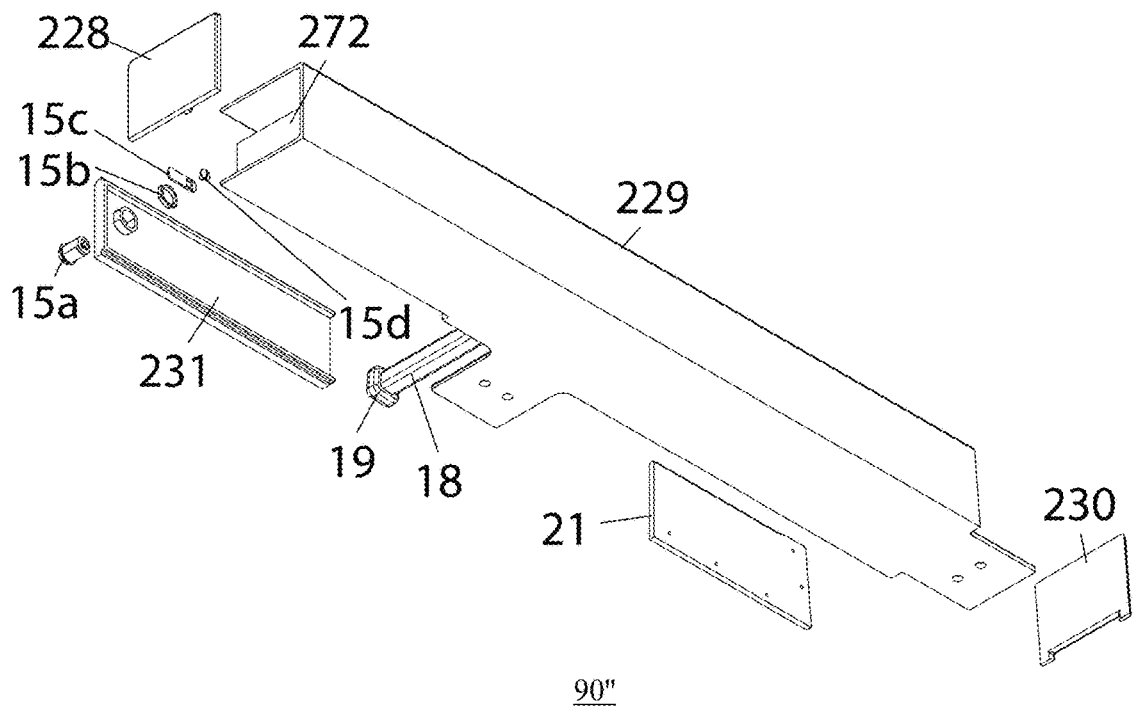

Focusing on the main container side, FIGS. 30A and 30B show an embodiment of the subassembly slightly exploded. Two panels 228 and 230 may be coupled (e.g., permanently attached) to main container 229 with strong adhesive or any other suitable method(s) after the other parts are assembled correctly. The electronics inside main container 229 may be in slightly different positions than in apparatus 90 with a first power unit 272 and a microprocessor 274.

Figure 31A:
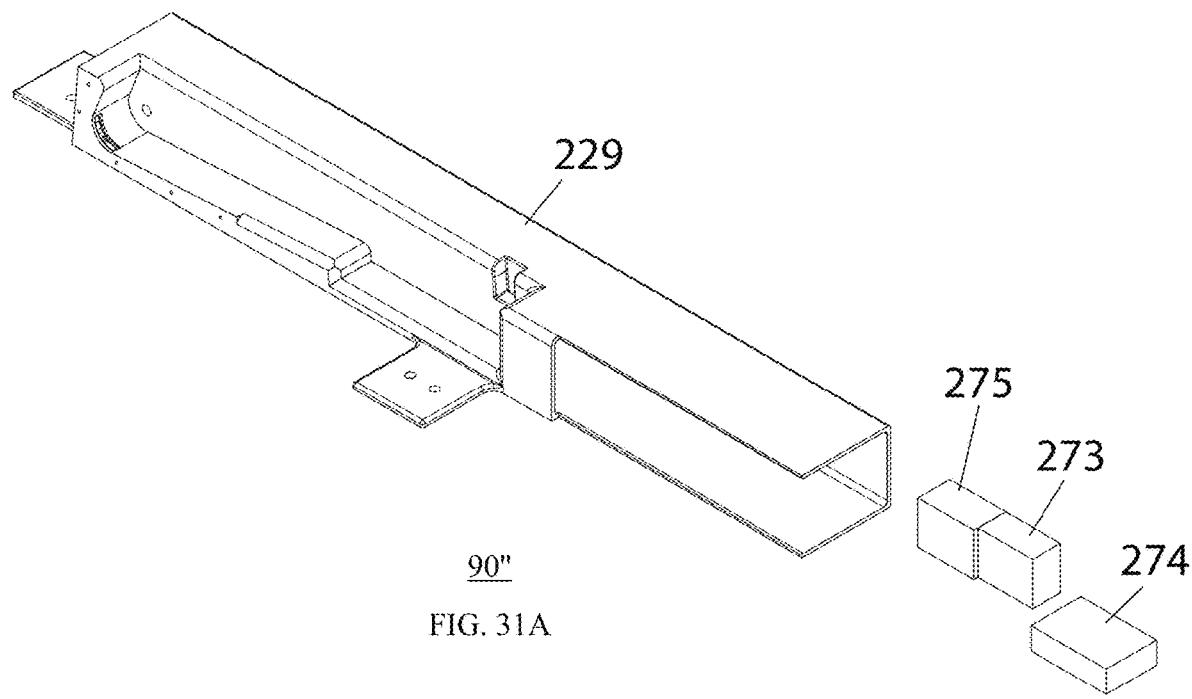
FIGS. 31A and 31B are different perspective views of the other alternative locking apparatus, according to some embodiments of the disclosure.
Figure 31B:
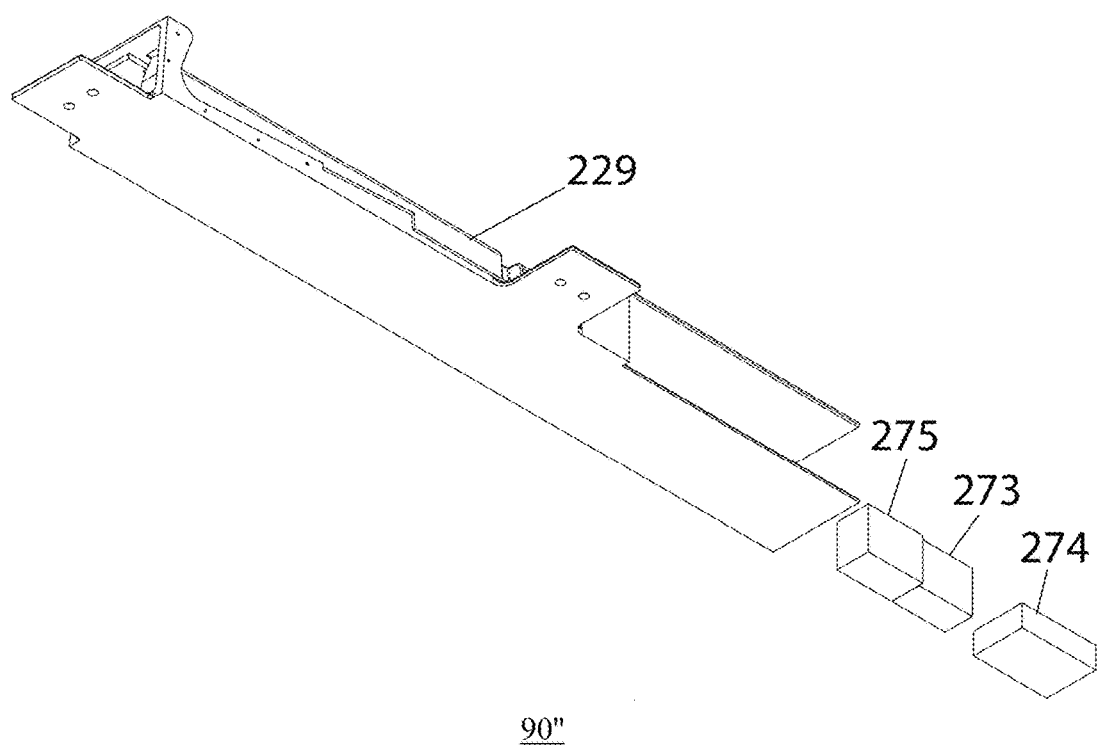

FIGS. 31A and 31B continue to show electronic boards in an exploded view where they were not shown in FIGS. 30A and 30B with respect to apparatus 90", such as micropro-cessor 274, microcontroller 273, and circuit board 275.

Figure 32:
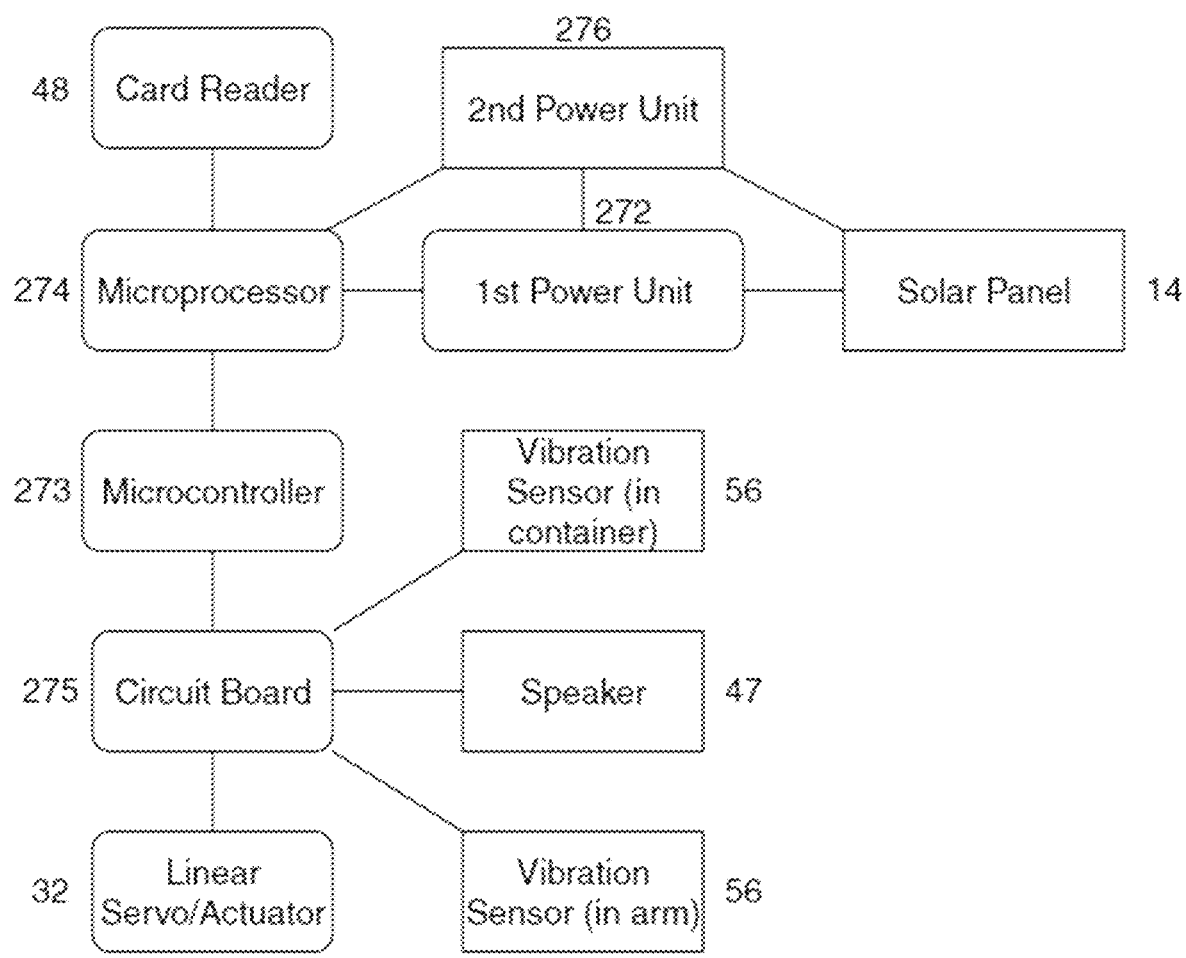
FIG. 32 is a schematic diagram of electronic components of the other alternative locking apparatus, according to some embodiments of the disclosure.

FIG. 32 depicts a diagram of how various electrical components may be coupled in apparatus 90" (e.g., in a frame and rear wheel locking mechanism standalone embodiment). Similarly to as shown for other embodiments (e.g., in FIGS. 16A, 25, and 26), parts with a non-rounded rectangle may be optional and may work similarly as those above. An optional object sensor 55 here may not be as helpful as the user may be sliding rear locking bar 18 across and through a rear wheel's spokes instead of a motor doing that. There may be fewer components involved, so fewer electronics may need to be maintained as well as less complexity for producing may be involved.

Figure 33:
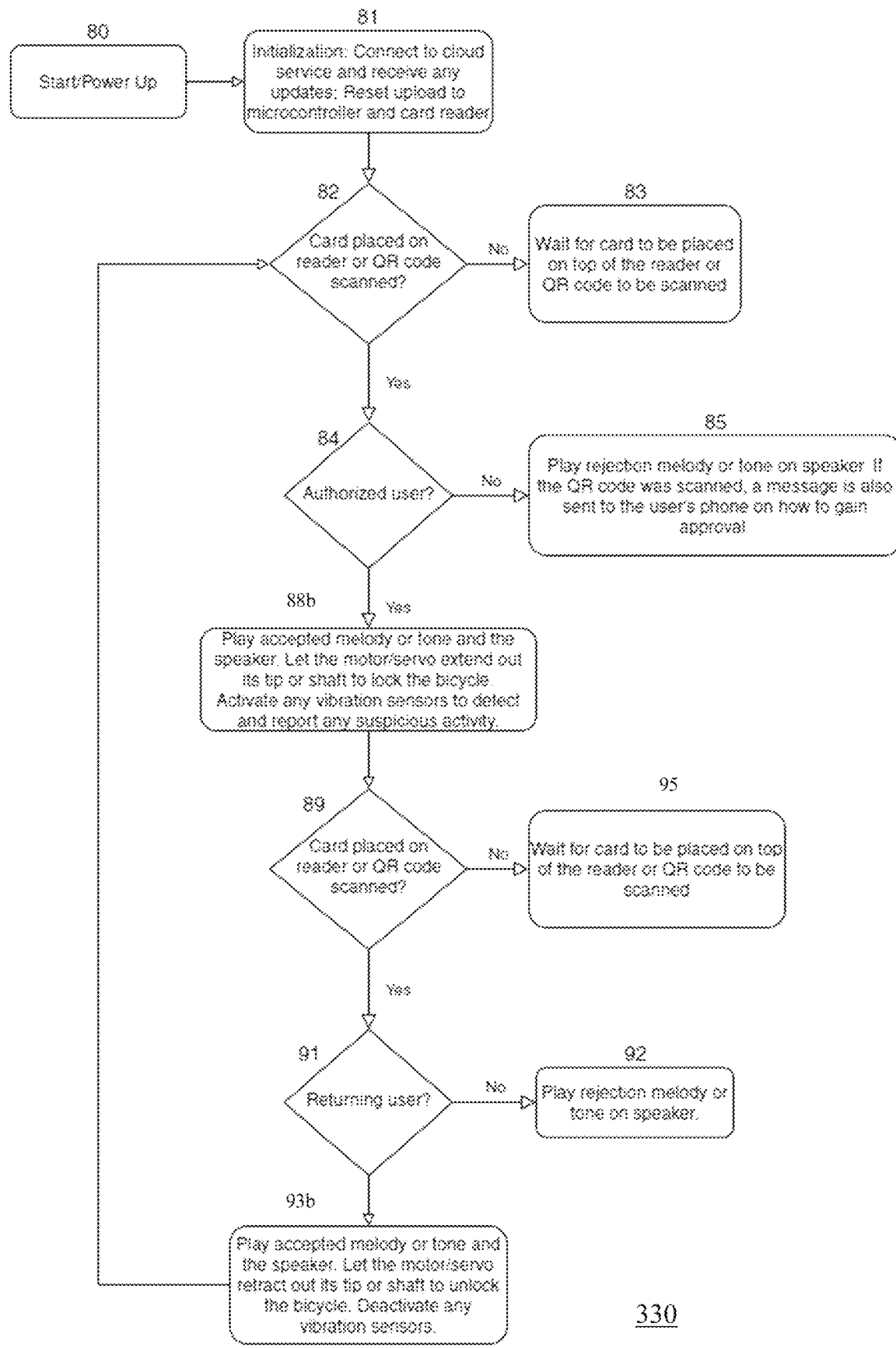
FIG. 33 is a flowchart of an exemplary process for operating the other alternative locking apparatus, according to some embodiments of the disclosure.

FIG. 33 is a flowchart of an exemplary process 330 for operating other alternative locking apparatus 90", which may show an embedded software flow of how the system would respond to a typical use flow. It may be the same or substantially similar to process 170, except operations 86 and 87 may be omitted as there may be no object sensor involved. Operation 88b and operation 93b of process 330 may differ from operation 88 and operation 93, respectively, of process 170 for locking and unlocking by only activating any linear servos with respect to any rear arm/bar assembly (e.g., arms 4/17 and bar 18) but not also using any motor to extend out a round tip bar (e.g., process 330 may only involve a single motor/servo to perform a locking or unlocking function). Moreover, although not shown in FIG. 33, operation 94 of FIG. 17 may be similarly provided in process 330.

It is understood that the operations shown in process 330 of FIG. 33 are only illustrative and that existing operations may be modified or omitted, additional operations may be added, and the order of certain operations may be altered.

FIGS. 34-37 and 56 show alternative embodiments with how the arms and a few other elements may be configured.

Figure 34:
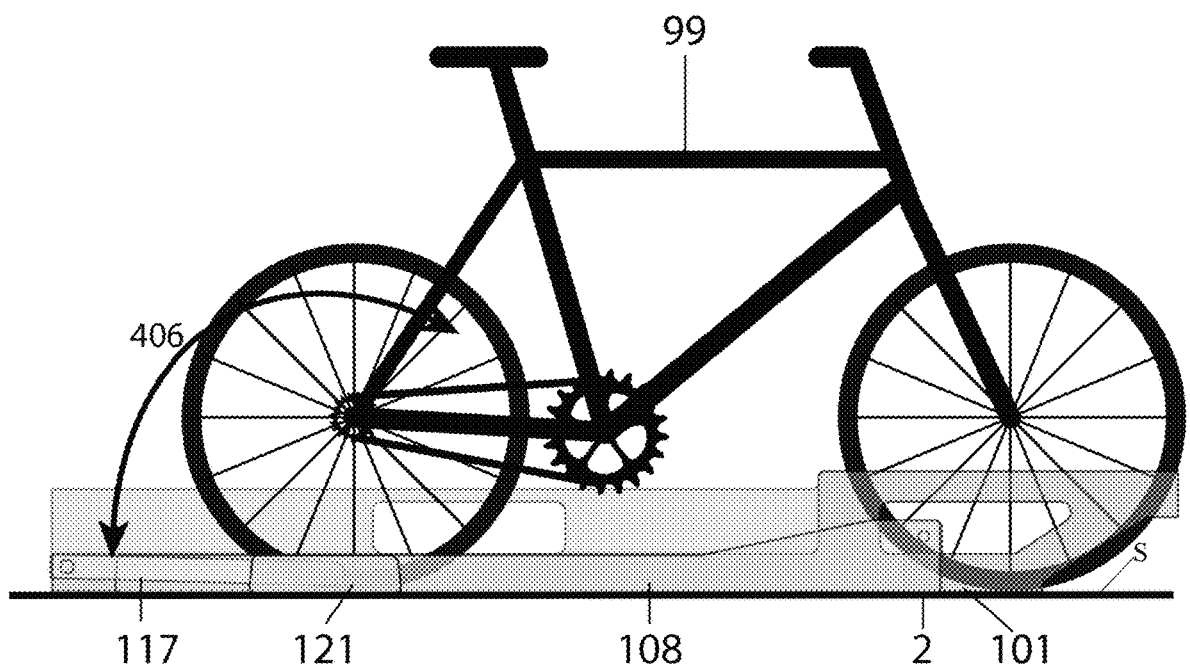
FIG. 34 is a side view of the bicycle inserted in a bicycle slot of yet another exemplary locking apparatus, according to some embodiments of the disclosure.

FIG. 34 shows an apparatus 90''' with a main container assembly 108 and a slot structure 101 that may be lengthened out toward the rear (e.g., as compared to apparatus 90). The arms (e.g., right arm 117 with arm guard 121 as shown and a left arm (not shown)) may rest to the rear side instead of the front (e.g., the arm(s) may rotate upwards in the direction of arrow 406 from the rear of the vehicle rather than up towards the rear of vehicle 99 (e.g., a bar of arm 117 may be located behind the rear wheel when the bicycle is positioned and before the arm has been rotated upwards)). The arms may need to be far enough apart to not clash with the rear wheel's skewers or other most far extending out-ward to the sides component(s) of the rear wheel. Unlike with left arm 4 of apparatus 90, a left arm of apparatus 90''' (not shown) may be straight and/or not include an outer bend (e.g., C-shape bend) as potential pedal conflict may not be an issue here (e.g., as such a left arm may rest parallel or substantially parallel to the ground (e.g., as shown with right arm 117 in FIG. 34) when the vehicle is inserted into the slot of slot structure 101). This may open the opportunity to support both typical and longtail bicycles or other bicycles with a longer wheelbase by the arc of rotation of arrow 406.

Figure 35:
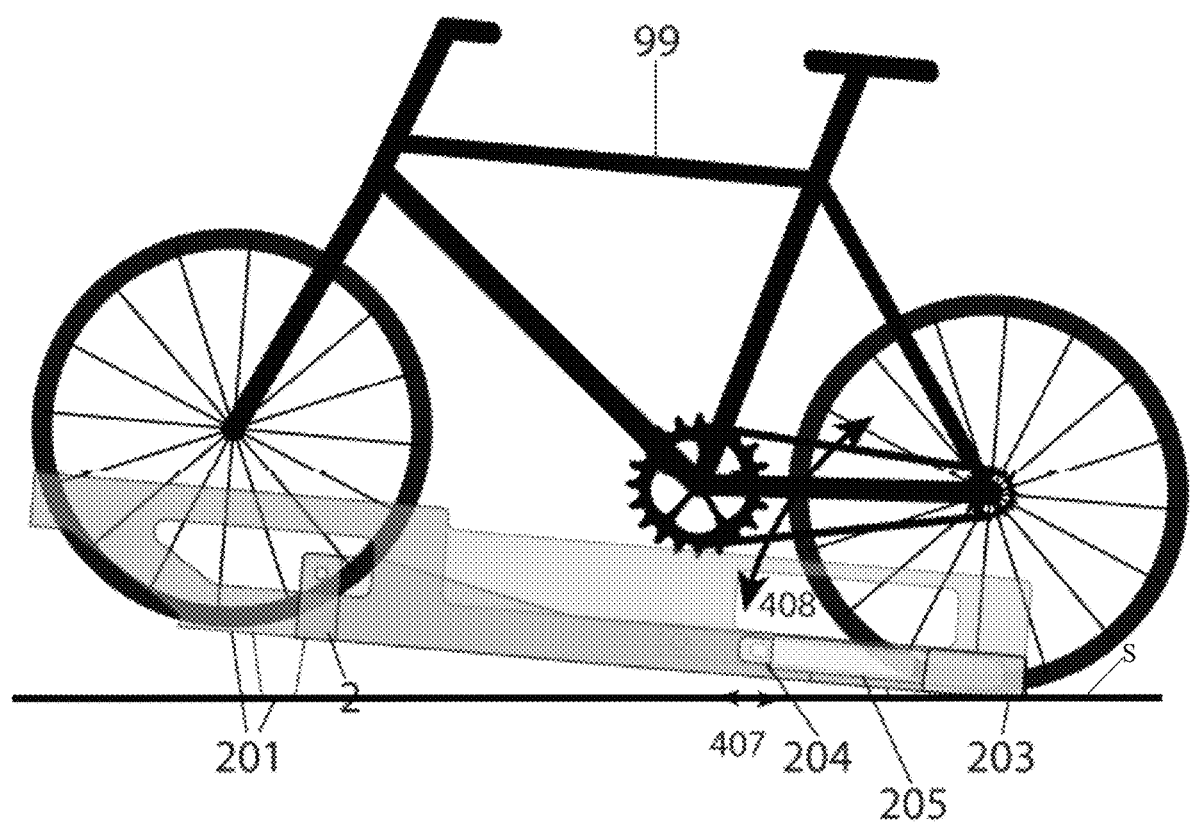
FIG. 35 is a side view of the bicycle inserted in a bicycle slot of still yet another exemplary locking apparatus, according to some embodiments of the disclosure.

FIG. 35 shows an apparatus 90'''' with a secondary slot structure 201 that may have a raised forward position that may be used to allow bicycles 99 to be parked next to other slot structures in a compact manner without the handlebars and/or pedals of adjacently parked bicycles from clashing, depending on the width of separation between the slots. Another configuration for the left arm 204 of apparatus 90'''' (and/or right arm (not shown)) may be to configure it to be telescopic (e.g., from left arm base 205) along arrow 407 just enough to not come into conflict with pedals (e.g., when rotated upwards along arrow 408) while being a straight arm or otherwise shaped arm that does not have an outward C-bend. While such arm(s) can be manually extended and retracted along arrow 407, it may (e.g., ideally) extend automatically along arrow 407 once it rotates along arrow 408 beyond the pedal zone and at the beginning of the frame and rear wheel locking zone and retract along arrow 407 automatically when rotating downward along arrow 408 the other way beyond that point.

Figure 36:
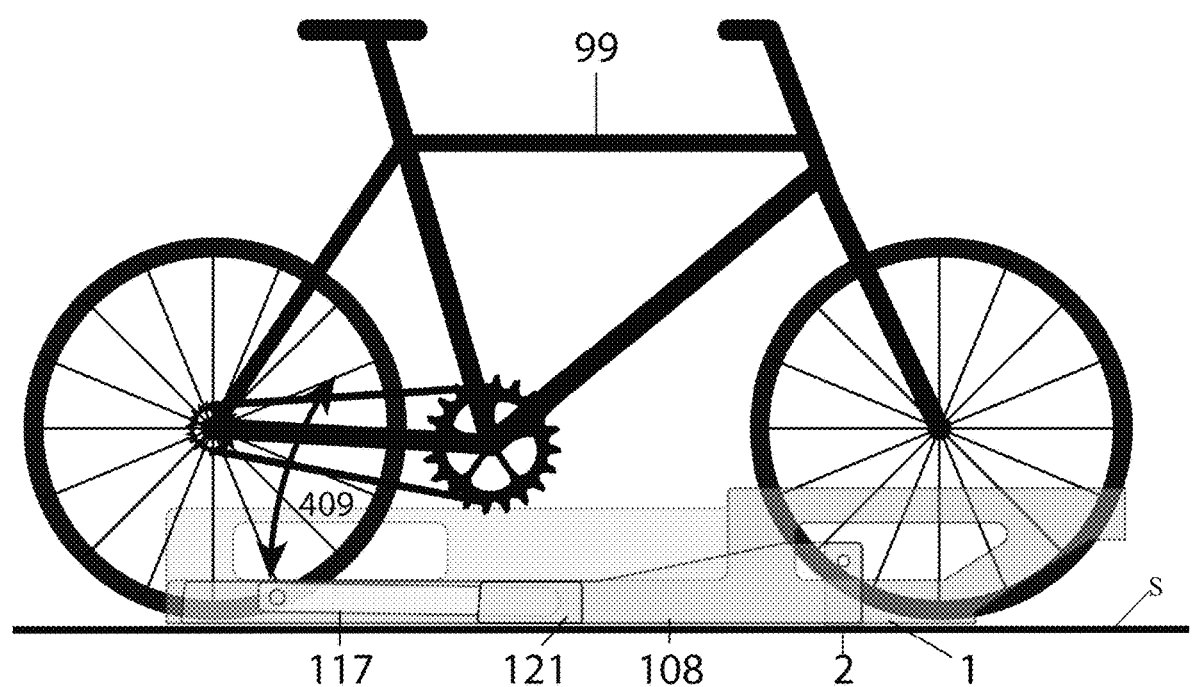
FIG. 36 is a side view of the bicycle inserted in a bicycle slot of still yet another exemplary locking apparatus, according to some embodiments of the disclosure.

FIG. 36 shows an apparatus 90''''' with a possible embodiment of the arms resting backward (e.g., with its free ends (e.g., the ends interfacing with a rear locking bar) pointing towards the rear of the vehicle) with their axis of rotation moved forward closer to the front of the device. The locking zone determined by arc of rotation of arrow 409 and, thus, the supported range of bicycles may be more limited than the previous configurations for locking both the frame and the rear wheel when at ground level, but may be better if it were around a slot on a higher secondary tier of parked bicycles above one or more of the other slots shown, as the rear wheel may be more steady in position with less variation than the front wheel.

Figure 37:
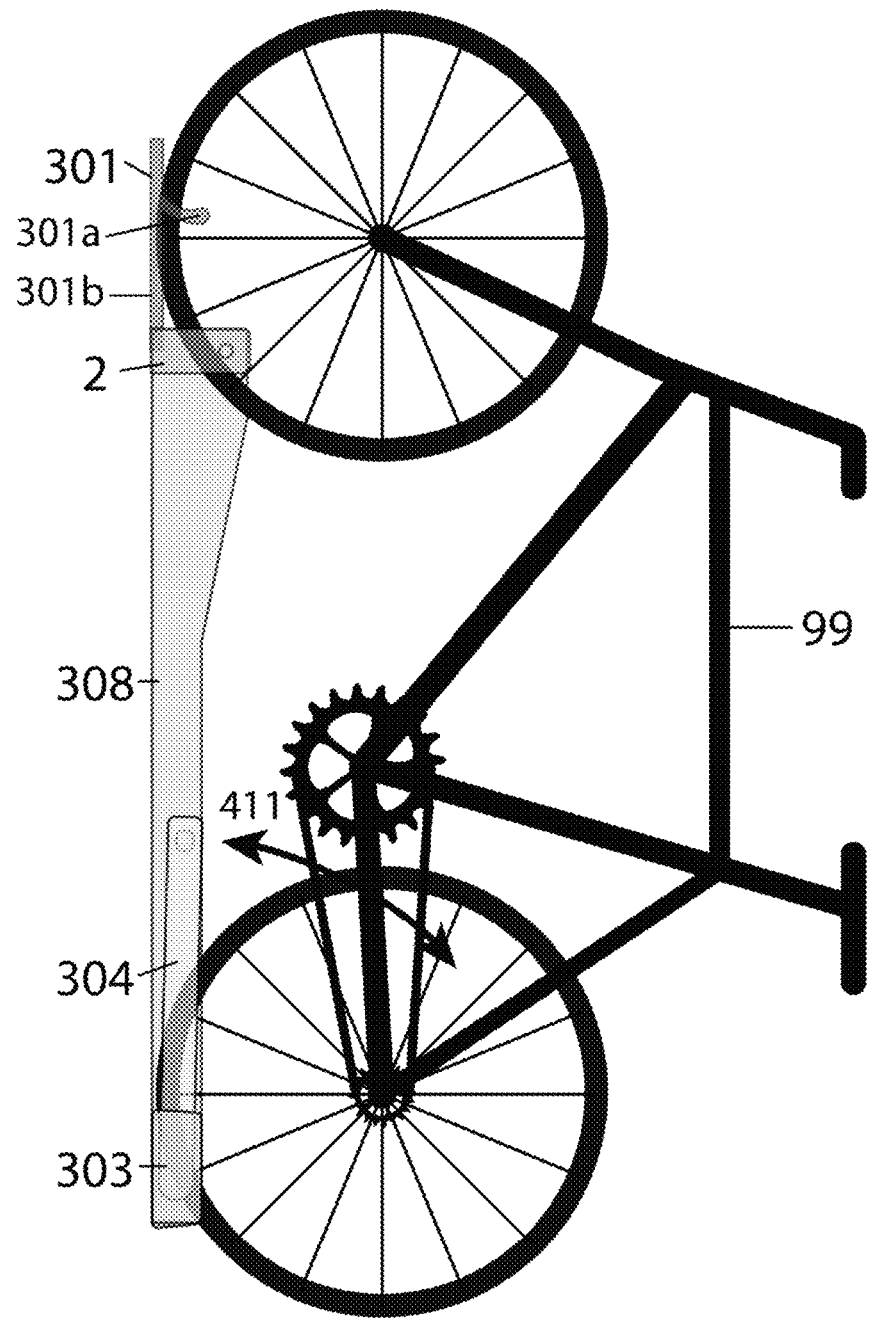
FIG. 37 is a side view of the bicycle inserted in a bicycle slot of still yet another exemplary locking apparatus, according to some embodiments of the disclosure.

FIG. 37 shows an apparatus 90'''' with an embodiment of locking mechanisms that may support a vehicle 99 parked on a vertical rack or slot structure 301. Rack structure 301 may include any suitable hook 301a and/or any suitable channel guide 301b for a front vehicle wheel. Arms (e.g., a left arm 304 with arm base 303 and a right arm (not shown)) and a container assembly 308 may be configured to extend further out to the rear or bottom with the arms slightly longer so that left arm 304 may have a straight shape or otherwise without an outer (e.g., C-shaped) bend (e.g., like the right arm) and may have minimal chance of coming into conflict with the vehicle (e.g., left pedal of bicycle vehicle). Having an upper segment to support one or more chain stays may not be as helpful in this embodiment as the vehicle may be held in place by hook 301a through its front wheel and by gravity. Both arms may be configured to rotate along arrow 411 to their intended locking positions.

Figure 56:
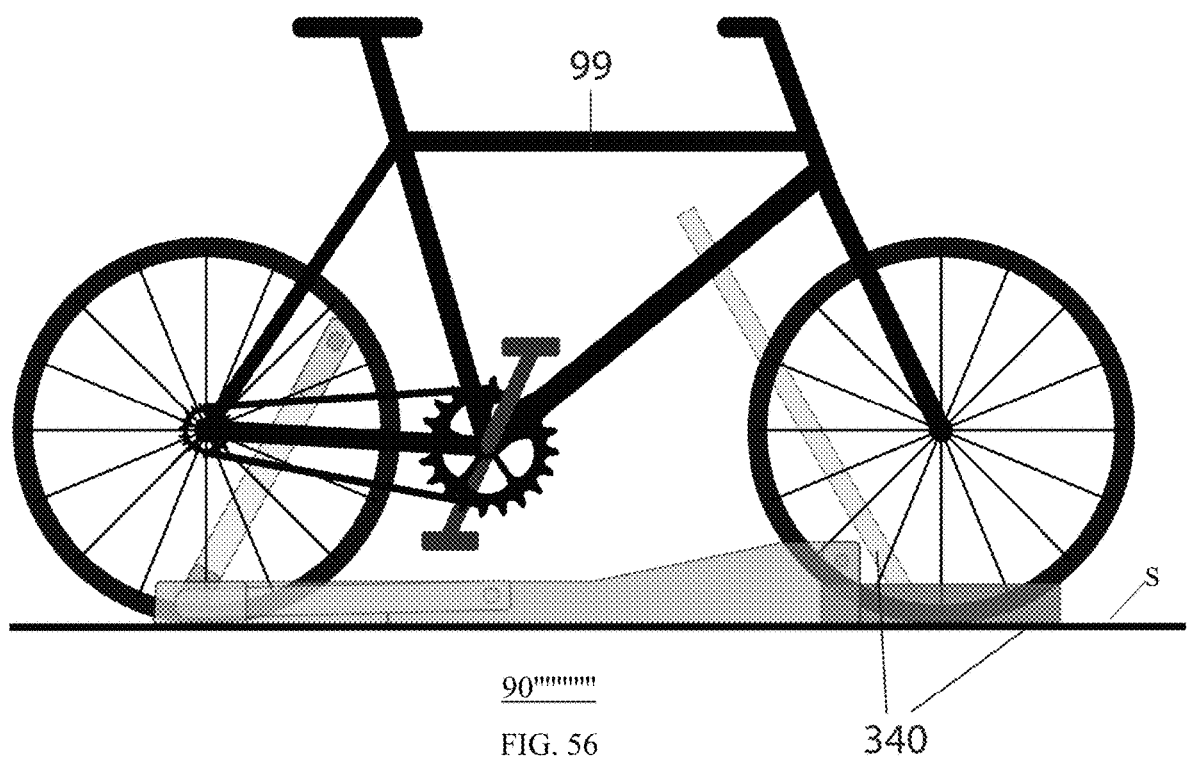
FIG. 56 is a side view of the bicycle inserted in a bicycle slot of still yet another exemplary locking apparatus, according to some embodiments of the disclosure.

FIG. 56 shows an apparatus 90'''''' with an embodiment of locking mechanisms that may support a vehicle 99 parked on or with respect to a wheel-well slot or rack structure 340 that may include a base configured to hold a wheel of a bicycle (e.g., for the user to place the front wheel to keep it steady) and may also include a bent, upward support arm for the bicycle (e.g., the bicycle's frame and/or front fork and/or front wheel tire) to lean against to help prevent any wheel bending. The apparatus may or may not adapt the parts adjacent to the wheel-well structure 340 to better fit it compared to the depiction of slot structure 1. Such a support arm may be straight and/or fixed at the orientation shown, such that both a middle rear portion of a vehicle front wheel and a front portion of a vehicle frame may be supported. This may provide more support than just a slot structure portion extending along only a lower portion of the front wheel.

Figure 38A:
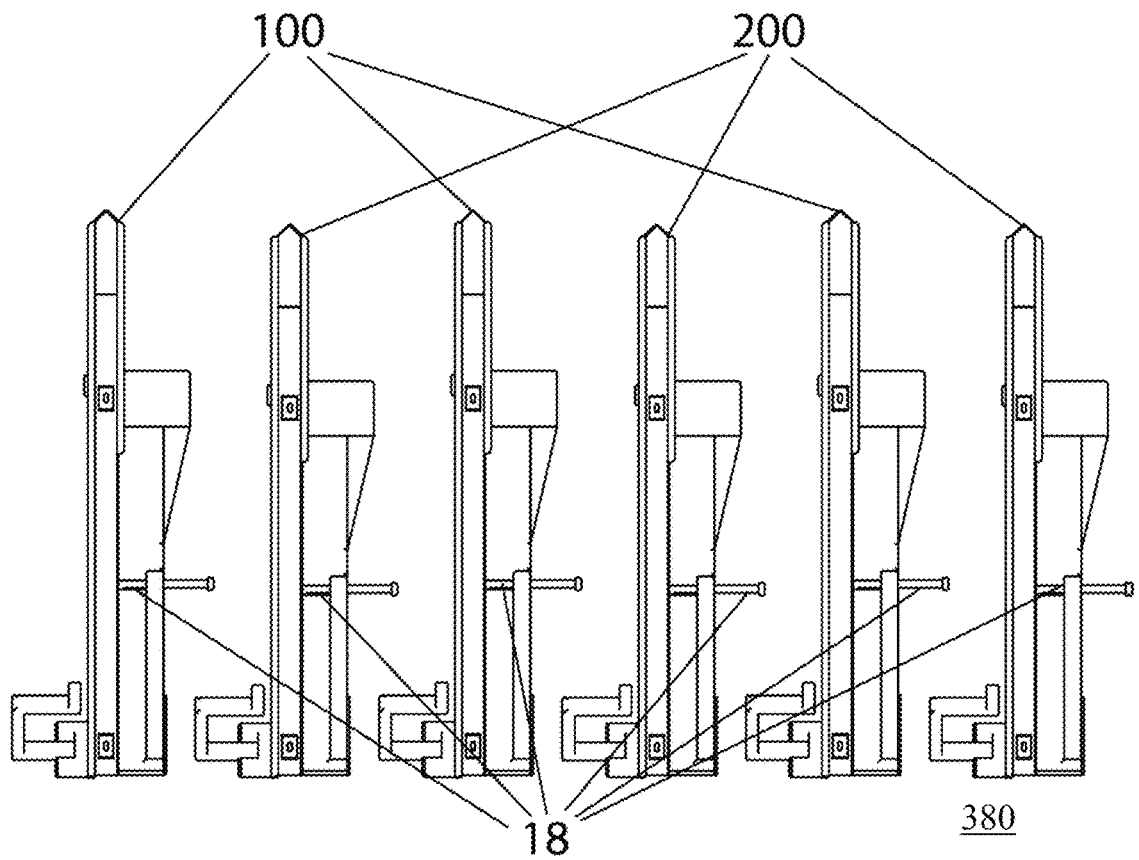
FIGS. 38A and 38B are top views of layouts of a plurality (e.g., 6) parking slots with exemplary locking apparatus placed side by side, according to some embodiments of the disclosure.
Figure 38B:
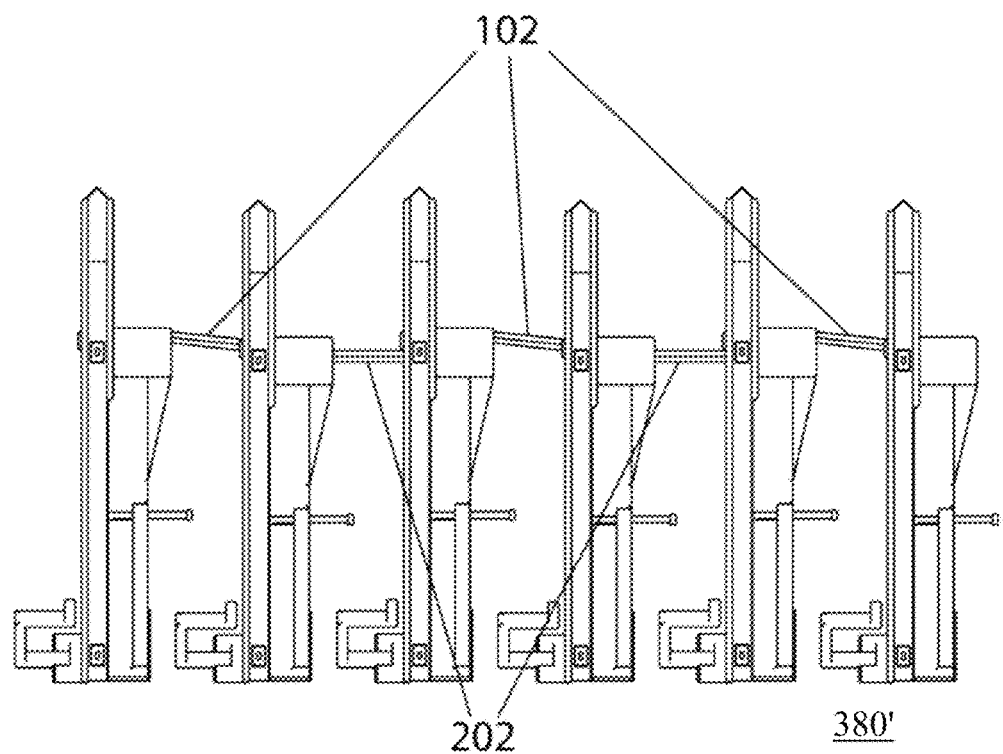

FIG. 38A shows a top view of a system 380 with a locking apparatus with alternating slot structures 100 and 200, such as with the first embodiment of the locking mechanisms and containers in alternating layouts, and with more room on the main container for rear locking bar 18 to slide back inward to the slot while resting between use. The shorter parking spots of structures 200 (e.g., as compared to longer parking spots of structures 100) may be ones that are raised toward the front. The parking spots can be configured to link to a common system kiosk (not shown) in another alternative embodiment. FIG. 38B shows the same layout but of a system 380' that may include power connectors with covers 102 and 202. The ones from the right side of the units may be placed flat along the mounted surface to raised units may be power connectors 102, and the ones from the right side of raised units to the regular units may be power connectors 202.

Figure 39:
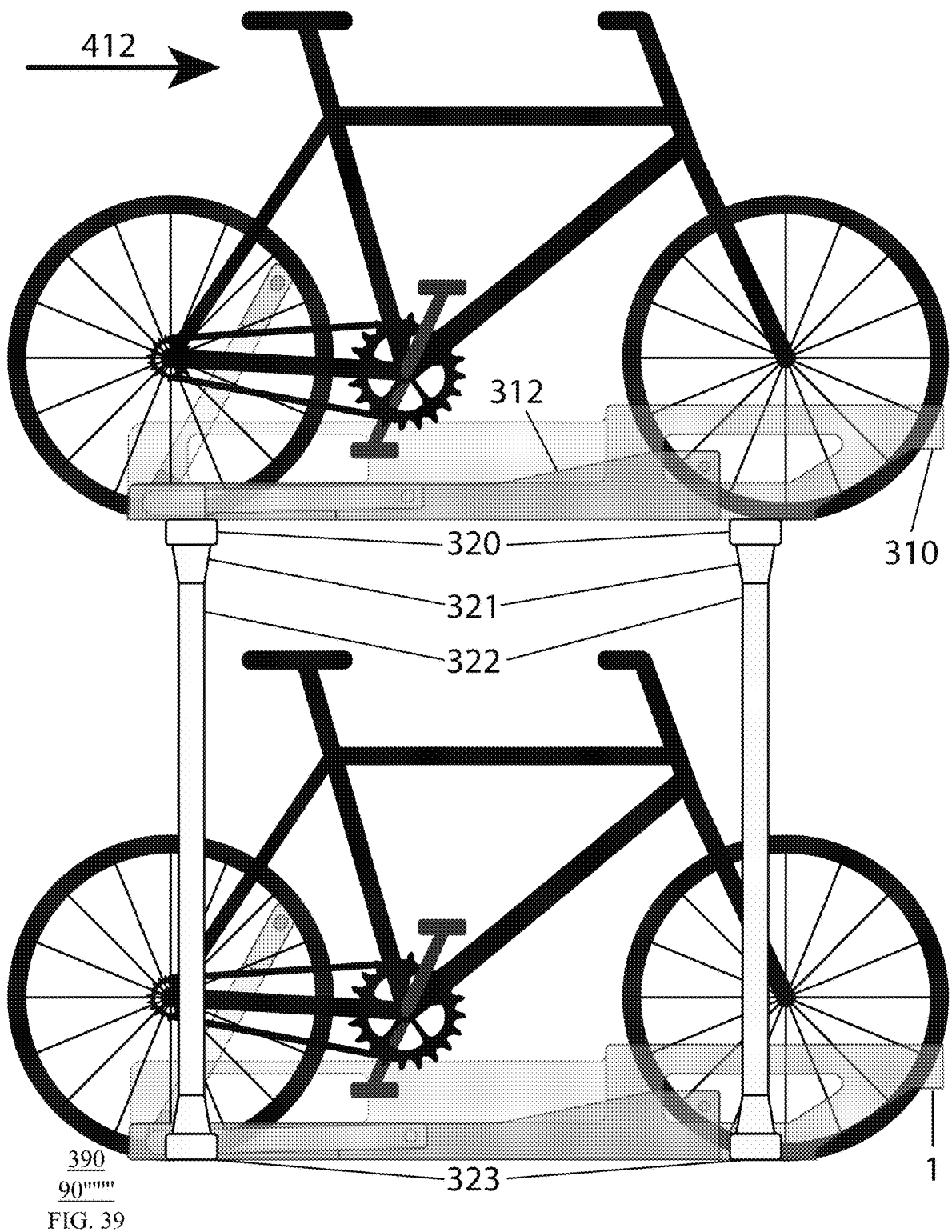
FIG. 39 is a side view of a layout of a plurality (e.g., 2) 2-tiered parking slots with similar exemplary locking apparatuses placed one above another, according to some embodiments of the disclosure.

FIG. 39 depicts a system 390 with two apparatuses (e.g., with at least an upper one being an apparatus 90''''') in a possible two-tiered structure embodiment. Additional slots can be added in a similar configuration to the embodiment shown in FIG. 40 to be space-saving. This is a two-tier parking structure type for bicycles, which may be referred to herein as a non-lift assist type. An upper slot structure 310 may be supported by two beams 320, which may be held up by triangular supports 321 and structural columns 322 that may be mounted to structural bases 323. A user may lift and insert their bicycle onto upper slot structure 310 following the direction of arrow 412 (e.g., similarly to the insertion of a bicycle into lower slot structure 1). The upper tier may include a modified container 312 with one or more modified arms and rotational positions compared to the lower tier to be better suited for securing bicycles on the upper tier.

Figure 40:
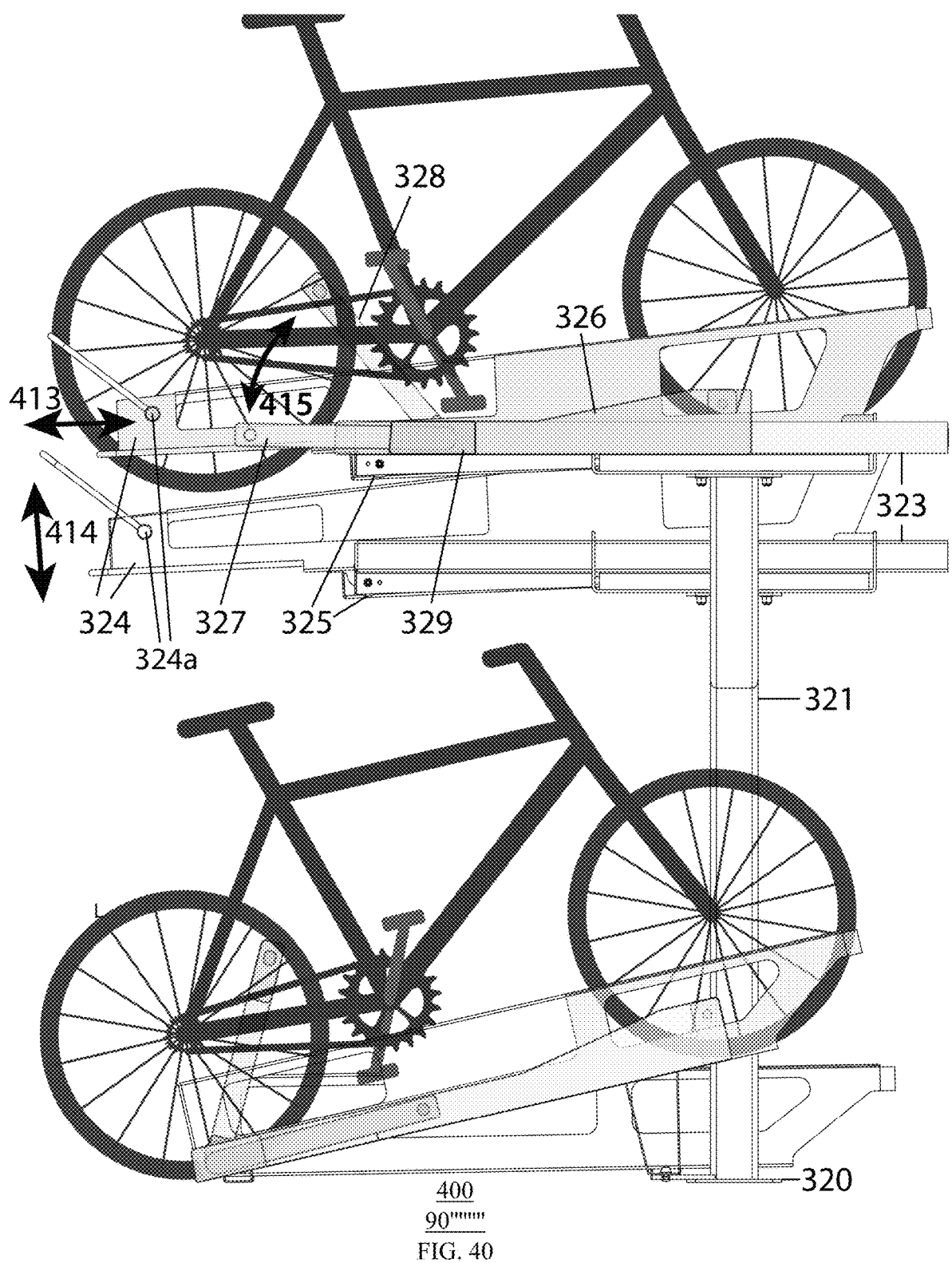
FIG. 40 is a side view of a layout of a plurality (e.g., 4) 2-tiered parking slots with similar exemplary locking apparatuses placed one above another, according to some embodiments of the disclosure.

FIG. 40 shows a side view of a system 400 with two apparatuses (e.g., with at least an upper one being an apparatus 90'''''') in a possible two-tiered structure embodiment. In some embodiments, slots and structure 320-325 may be modified versions of a Dero Decker. Some or all slots can have an apparatus of this disclosure installed thereon. This is a two-tier parking structure type for bicycles, which may be referred to herein as a lift-assist type. Similar to FIG. 39, the lift-assist rack may have on a second tier a different design and/or configuration of a container 326 (e.g., with electronics inside) to better fit the design of that rack type. To insert their bicycle onto the upper slot, the user would pull slot structure 324 out by a handle 324a out toward the user in the direction of arrow 413 them and then down in the direction of arrow 414 (or vice versa). They would load their bicycle onto the slot structure and then use handle 324a to lift the rear end of the slot up in the direction of arrow 414 before pushing back away from the user in the direction of arrow 413 such that the slot structure may be back in its default position. Wheels 325 or any other suitable features may be provided to allow for smooth pulling and pushing of the slot structure in the directions of arrow 413. The lift-assistant mechanism may keep the upward and downward motion from being too quick and/or from requiring as much strength as lifting an entire bicycle onto the upper tier (e.g., as with the embodiment of FIG. 39). Upper slot structure 324 may include one or more fixed guiding rails 323 for where they are stored. The second tier may be held up by one or more support beams 321 that may be mounted to the ground 320 or any other suitable surface. Arms 327 and 328 may be facing backwards and can be rotatable along the direction of arrow 415 from rest or one arm (e.g., the left arm) may be more limited with respect to rotation (e.g., as described with respect to apparatus 90). Arm 327 may also include an arm guard 329 of a different design to help keep it secure in its intended path of travel. Unlike the lower tier in this configuration, bicycles in the upper tier may be aligned to the rear of the slot, while arm rotational arc 415 may be as advantageous as the rotational arcs 402 and 403 of FIG. 2 in the embodiments where they may face forward instead of backward.

FIGS. 41-52 may show illustrative user interfaces 410-520 that may be presented to a user (e.g., by a graphical output component of a user's user device (e.g., by an application (e.g., mobile application 502 or web application 503 of FIG. 18)) or a graphical output component of a locking apparatus or associated kiosk of a locking apparatus system or the like) during different stages of use of the system (e.g., mobile application screens following a typical first-time use starting from post-registration and finding a nearby spot to park). For example, a touch screen I/O component or any other suitable output component may include a display output component that may be used to display a visual or graphic user interface ("GUI"), which may allow a user to interact with a user device or locking apparatus interface device. The GUI may include various layers, windows, screens, templates, elements, menus, and/or other components of a currently running application that may be displayed in all or some of the areas of the display output component. For each presentation, screens may be displayed on a display output component and may include various user interface elements. Additionally, or alternatively, for each presentation, various other types of non-visual information may be provided to a user via various other output components of the device. For example, in some embodiments, the device may not include a user interface component operative to provide a GUI but may instead provide an audio output component (e.g., speaker 47) and mechanical or other suitable user input components for selecting and interacting with an application of the device.

Figure 41:
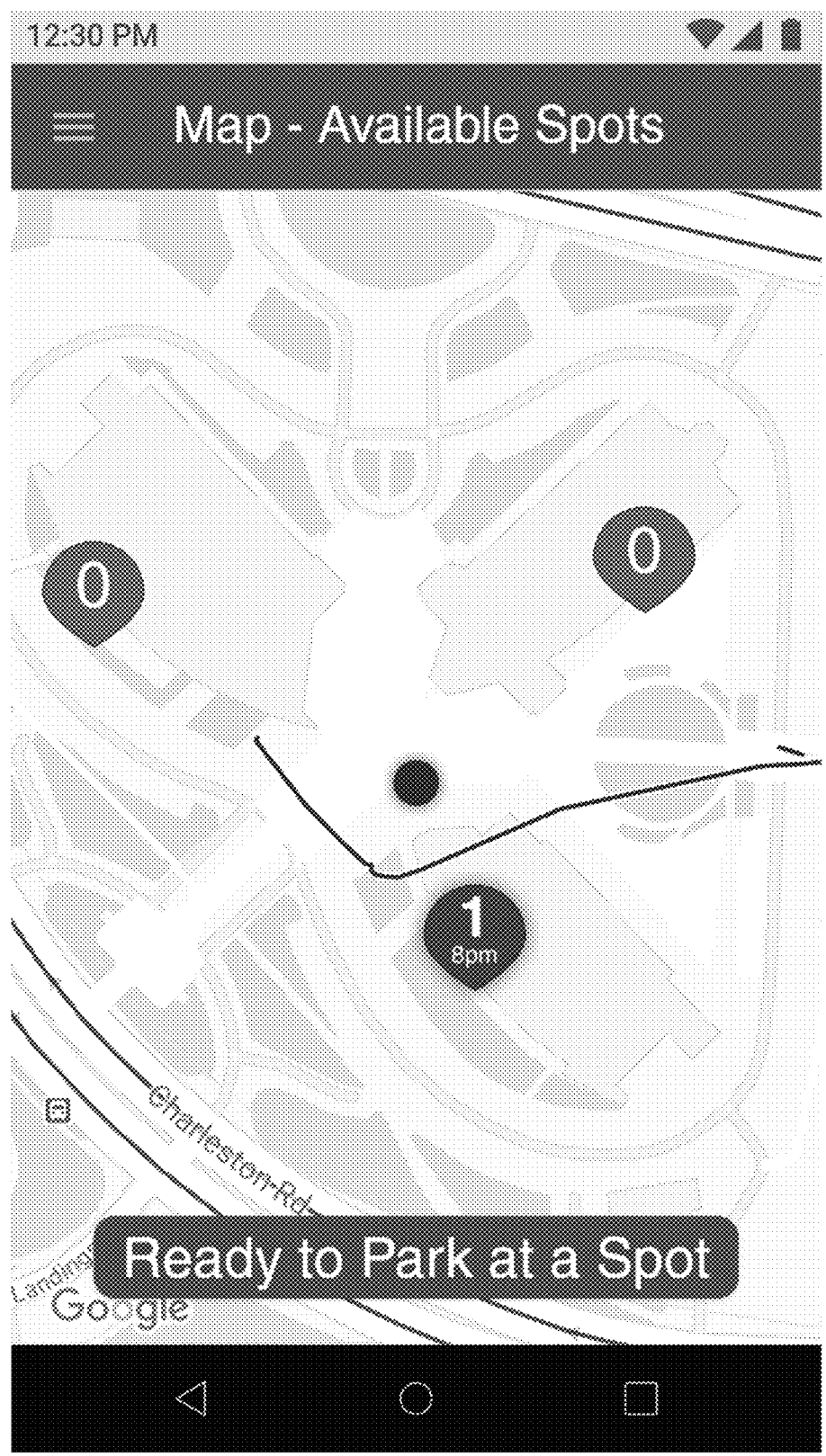
FIGS. 41-52 are exemplary user interfaces for an exemplary first-time use starting from post-registration and finding a nearby spot to park, according to some embodiments of the disclosure.

FIG. 41 depicts an embodiment of a mobile application default available spots to park screen 410 with information it may receive from server(s) 505 (see, e.g., FIG. 18).

Figure 42:
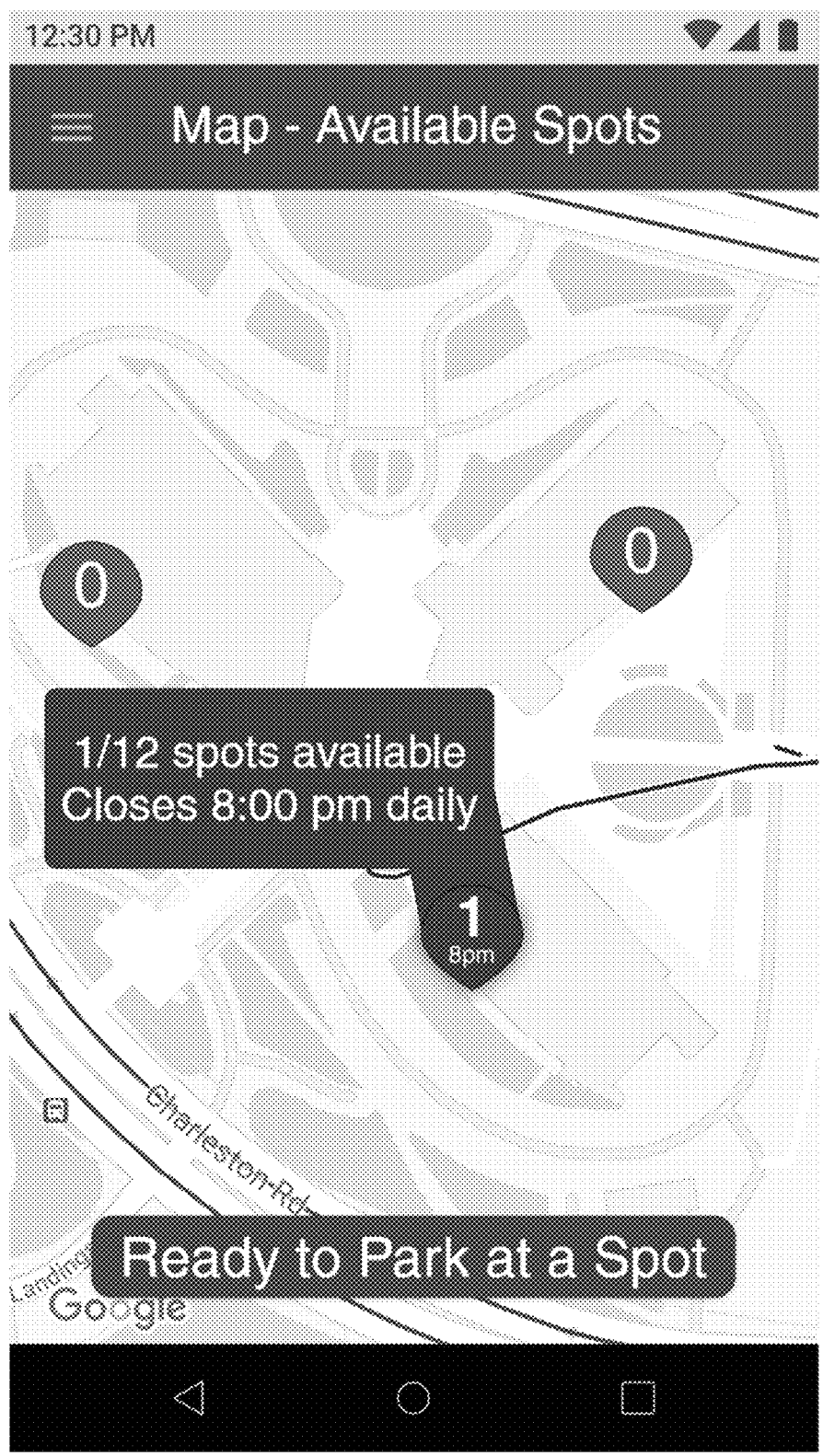

FIG. 42 depicts an embodiment of a mobile application screen 420 showing details of a group of available spots after tapping on an icon with information it receives from server(s) 505 (see, e.g., FIG. 18).

Figure 43:
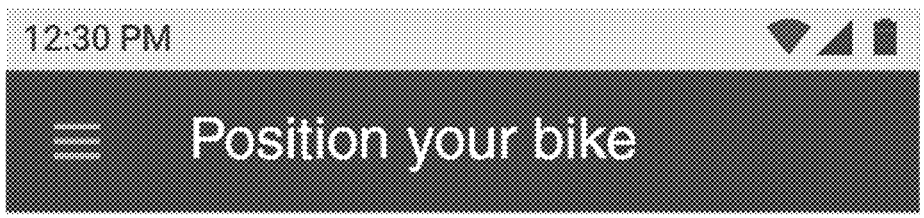
Figure 43:
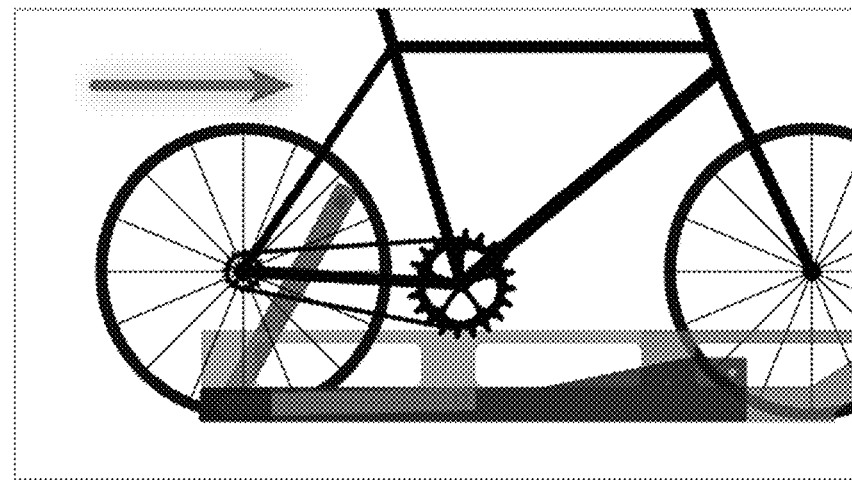
Figure 43:
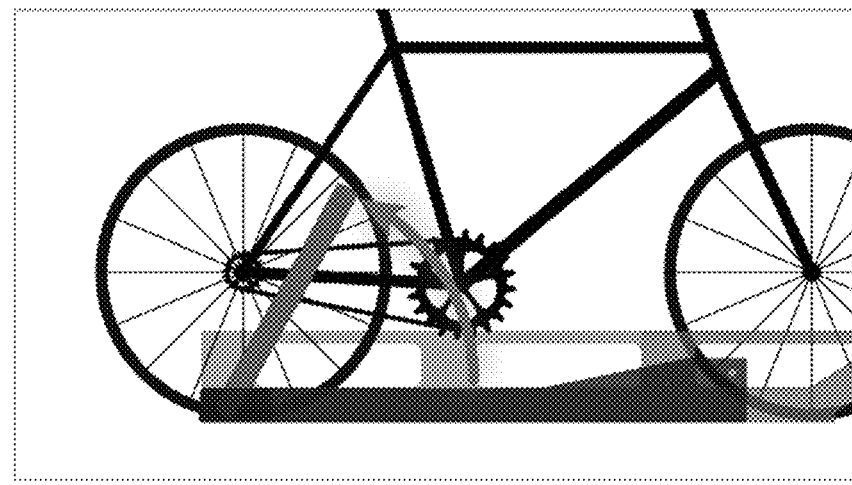
Figure 43:
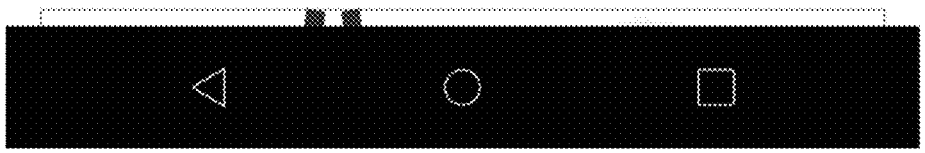

FIG. 43 depicts an embodiment of a mobile application screen 430 showing the user how they may position their bicycle in a slot structure and move an arm (e.g., a right arm).

Figure 44:
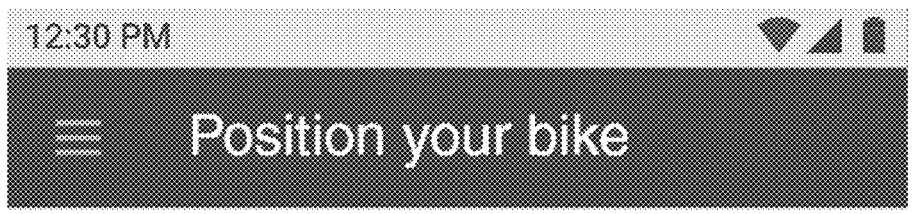
Figure 44:
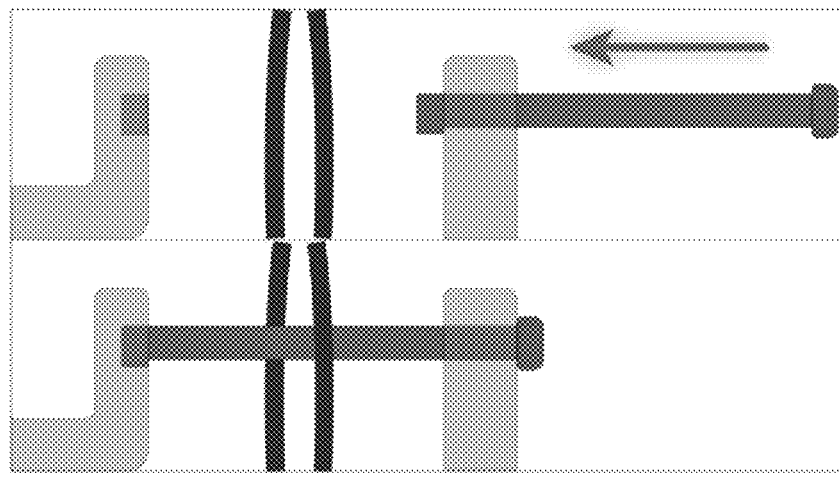
Figure 44:
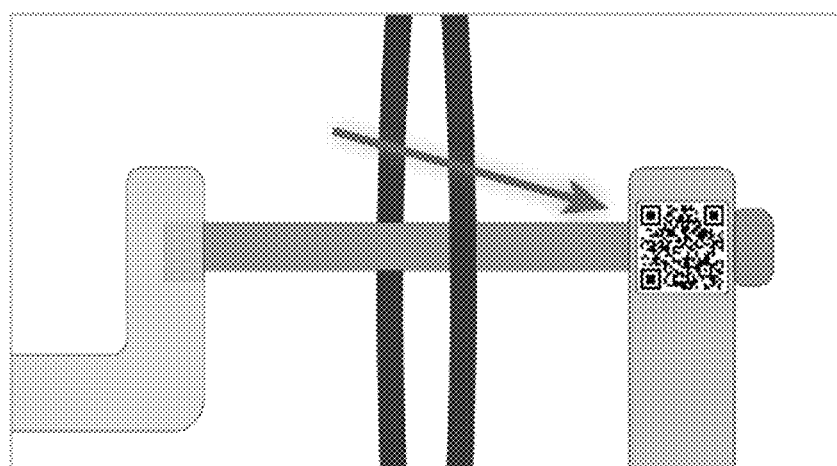
Figure 44:
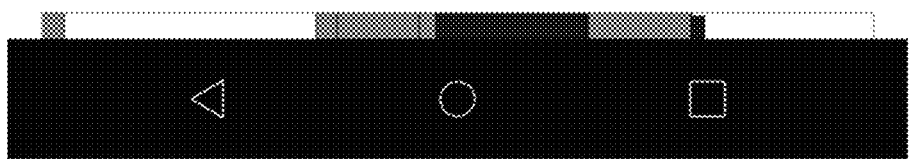

FIG. 44 depicts an embodiment of a mobile application screen 440 showing the user how they may move a rear locking bar and/or locate a QR code.

Figure 45:
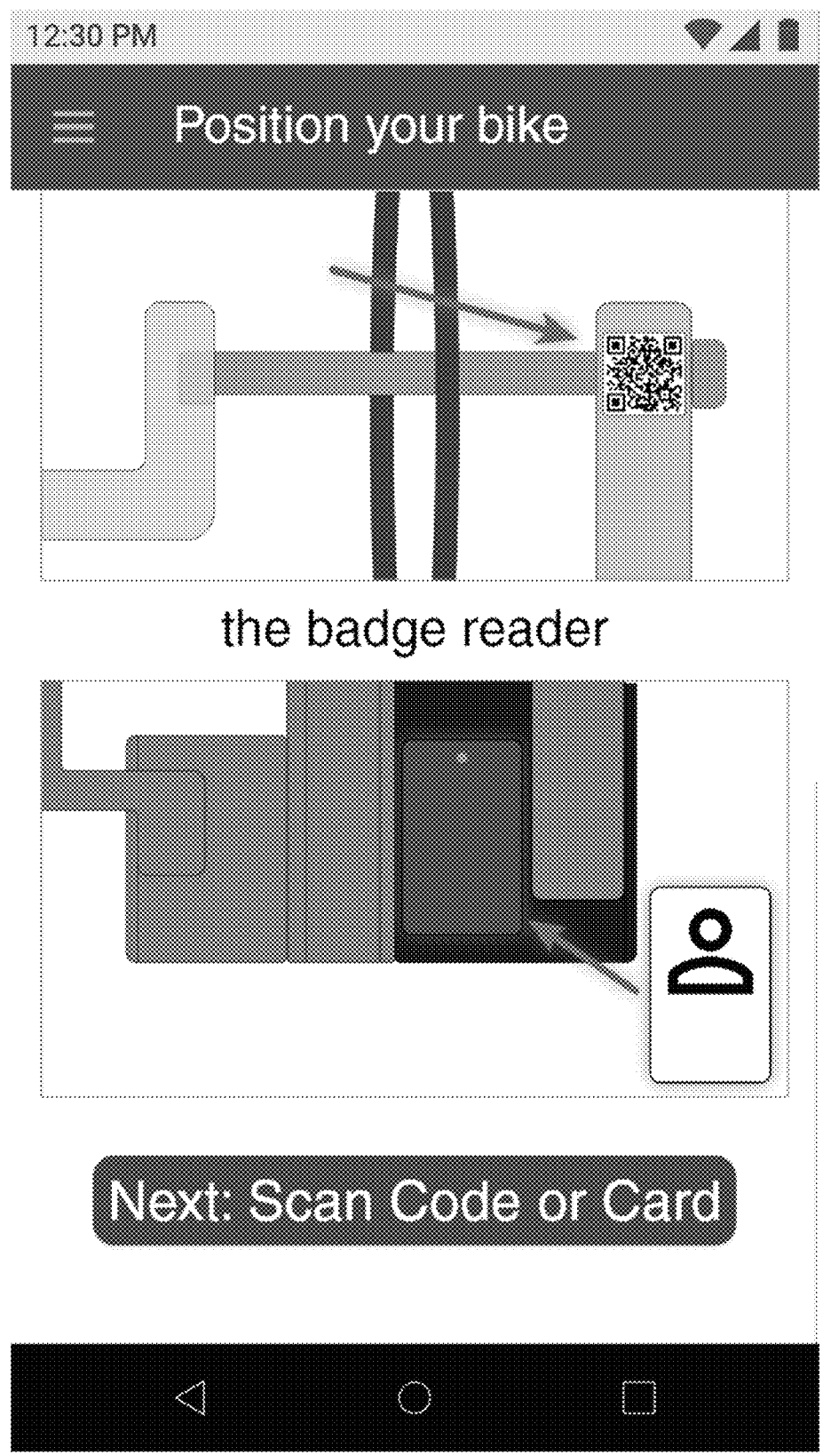

FIG. 45 depicts an embodiment of a mobile application screen 450 showing the user any suitable access options they may have (e.g., scanning a code with their user device or using a badge (or card) reader).

Figure 46:
Figure 46:
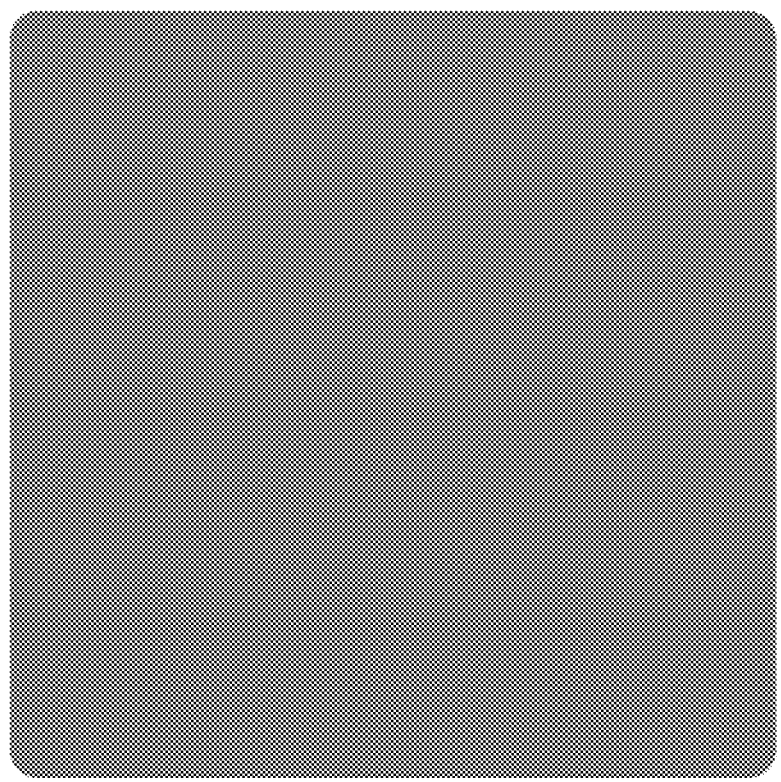
Figure 46:
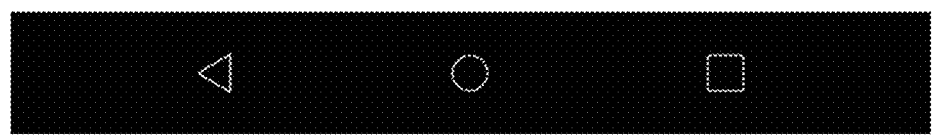

FIG. 46 depicts an embodiment of a mobile application screen 460 indicating to the user to scan one of two ways to lock their bicycle. The rounded square may be where a current image captured by a user camera may be. By scanning a QR code or otherwise, the device may be enabled to send information to server(s) 505 and make a request to start parking (e.g., at operation 504 of FIG. 18). If an issue arises, the user may also report it and seek help (e.g., at operation 514 of FIG. 18) or look for other spots nearby and request updated information from server(s) 505.

Figure 47:
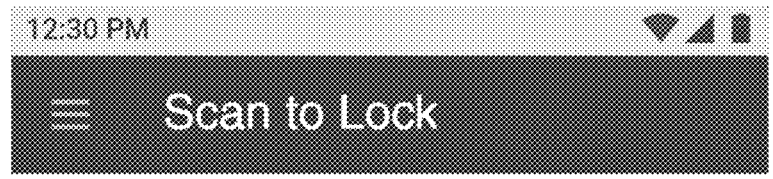
Figure 47:
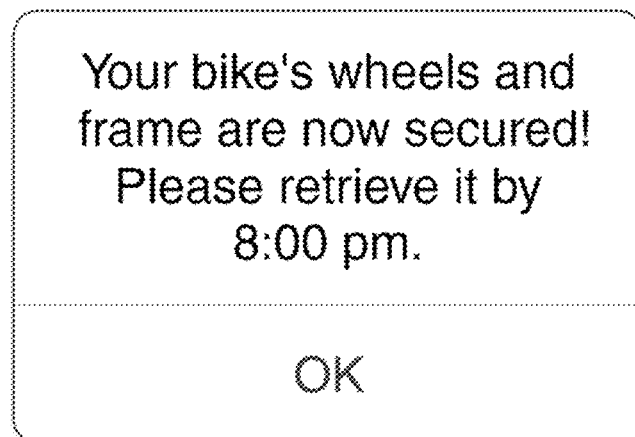
Figure 47:

FIG. 47 depicts an embodiment of a mobile application screen 470 showing the confirmation of successful locking along with any information the administrator may like them to know, such as a daily closing time. Tapping "OK" may acknowledge that it has been completed successfully and that they read the information the administrator included and send that to server(s) 505.

Figure 48:
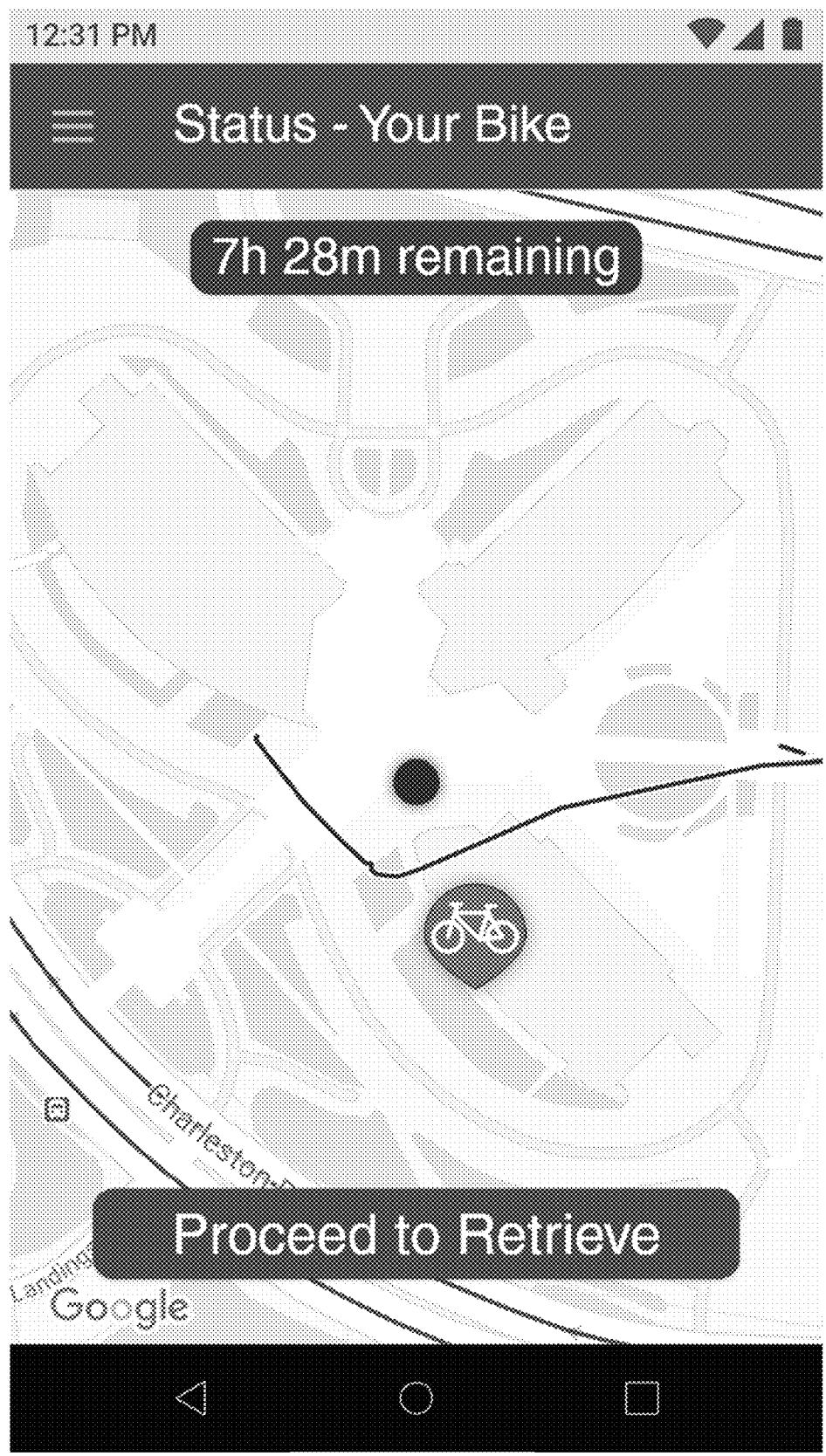

FIG. 48 depicts an embodiment of a mobile application screen 480 with a map location of where the user parked their bicycle and remaining time. It may contain any suitable information about their bicycle from server(s) 505.

Figure 49:
Figure 49:
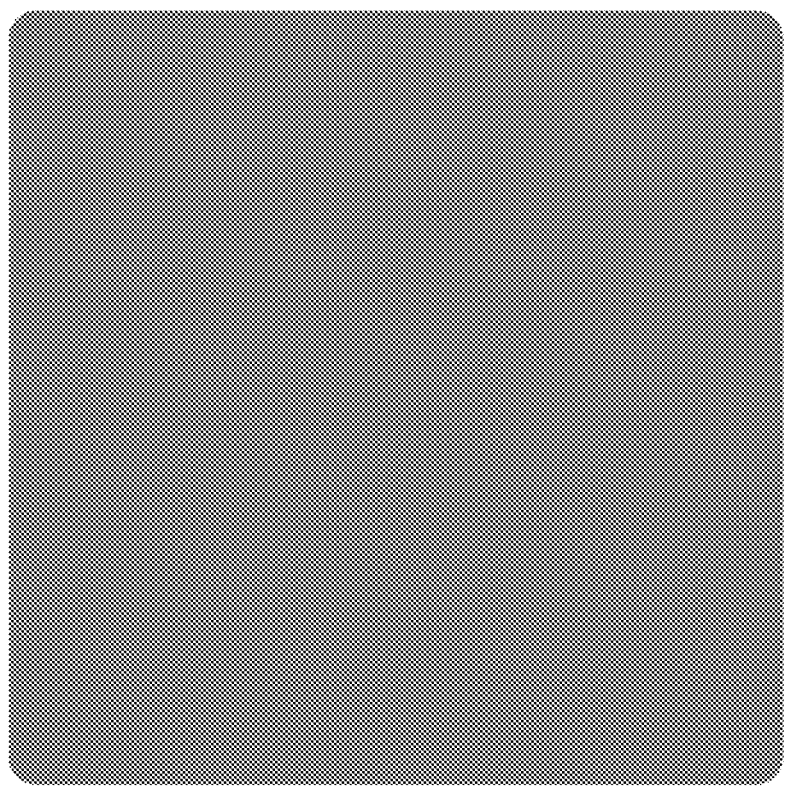
Figure 49:
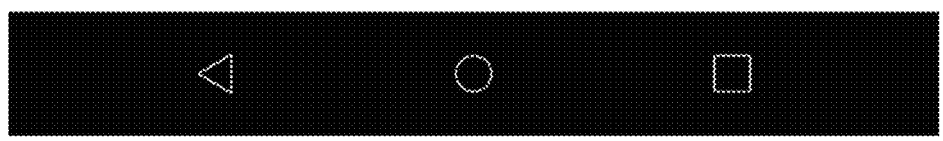

FIG. 49 depicts an embodiment of a mobile application screen 490 instructing the user to scan one of two ways to unlock their bicycle. The rounded square may be where the current image captured by their camera may be. By scanning a QR code, the device may send information to server(s) 505 and make a request to stop parking (e.g., operation 504 of FIG. 5). If an issue arises, the user can also report it and seek help (e.g., operation 514 of FIG. 5). If they forgot where their bike location is, they can return to the previous screen and request updated information from server(s) 505.

Figure 50:
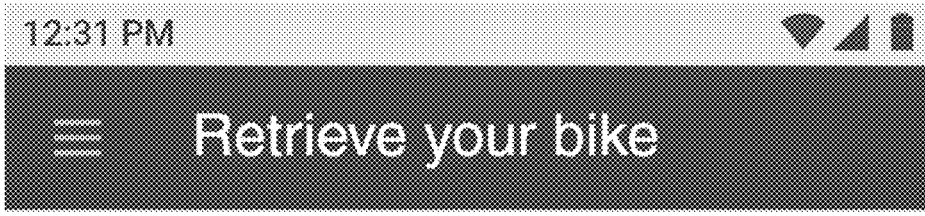
Figure 50:
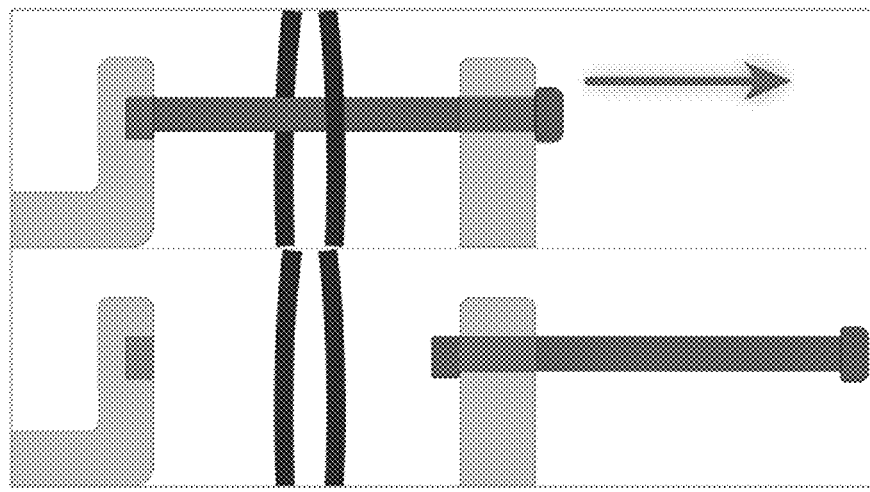
Figure 50:
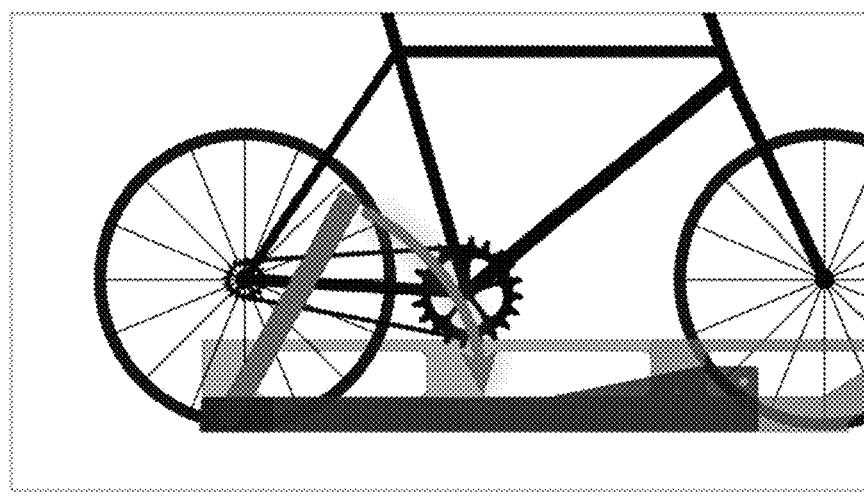
Figure 50:
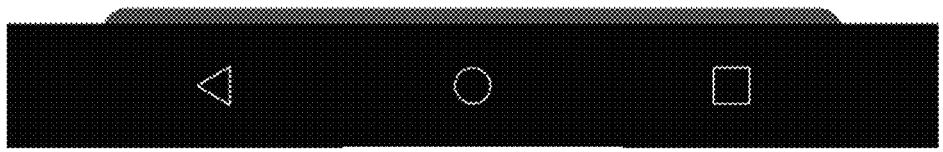

FIG. 50 depicts an embodiment of a mobile application screen 500 reminding the user how to put the rear locking bar and arms back in their original position before removing their bicycle.

Figure 51:
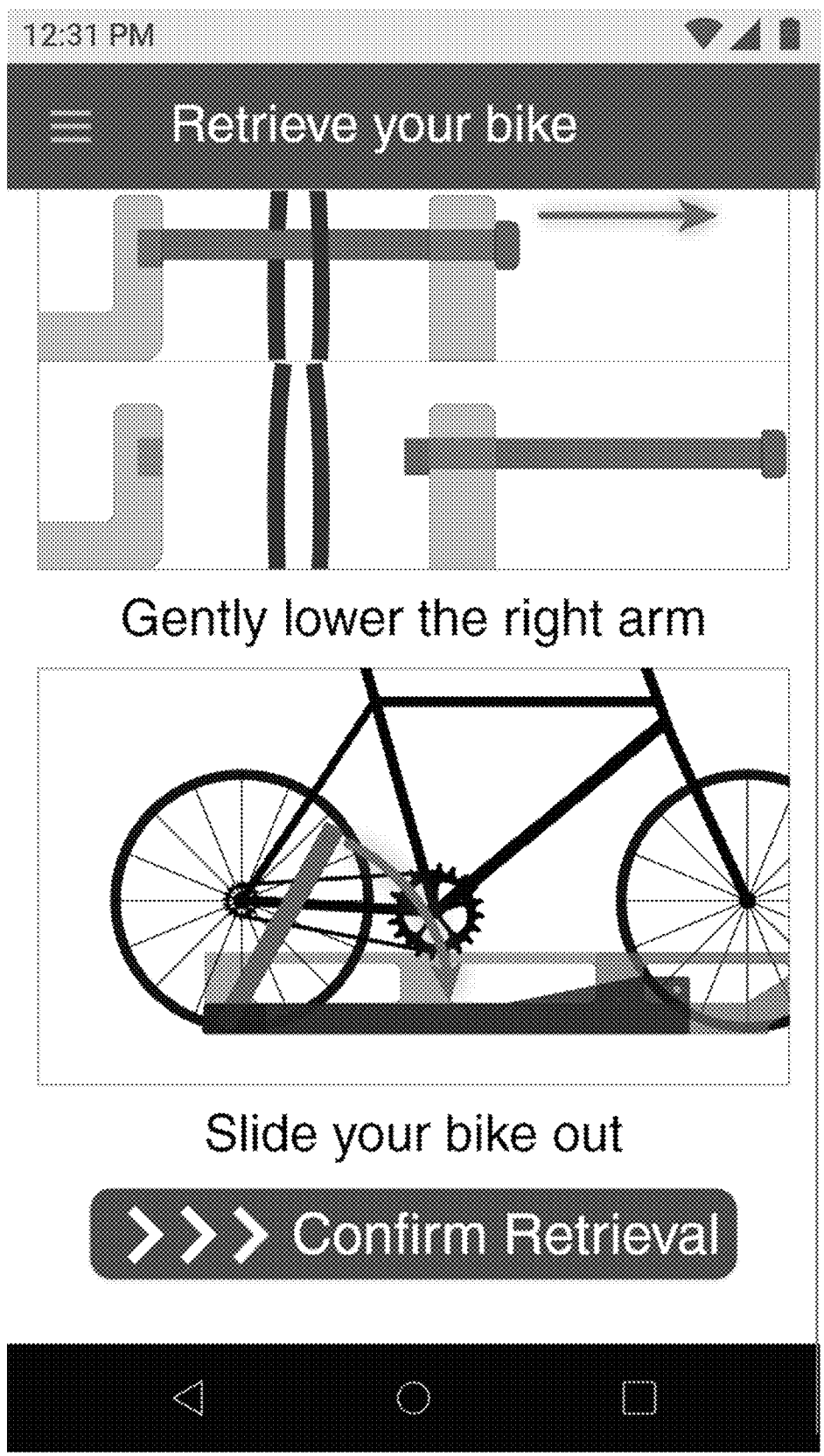

FIG. 51 depicts a screen 510 that may be the continued screen 500 in FIG. 50 that shows a confirmation of retrieval button. By confirming the retrieval, the mobile application and/or the locking apparatus may send data to server(s) 505 to acknowledge that the retrieval is complete.

Figure 52:

FIG. 52 depicts an embodiment of a mobile application screen 520 confirming and thanking the user for parking their bicycle.

Figure 53:
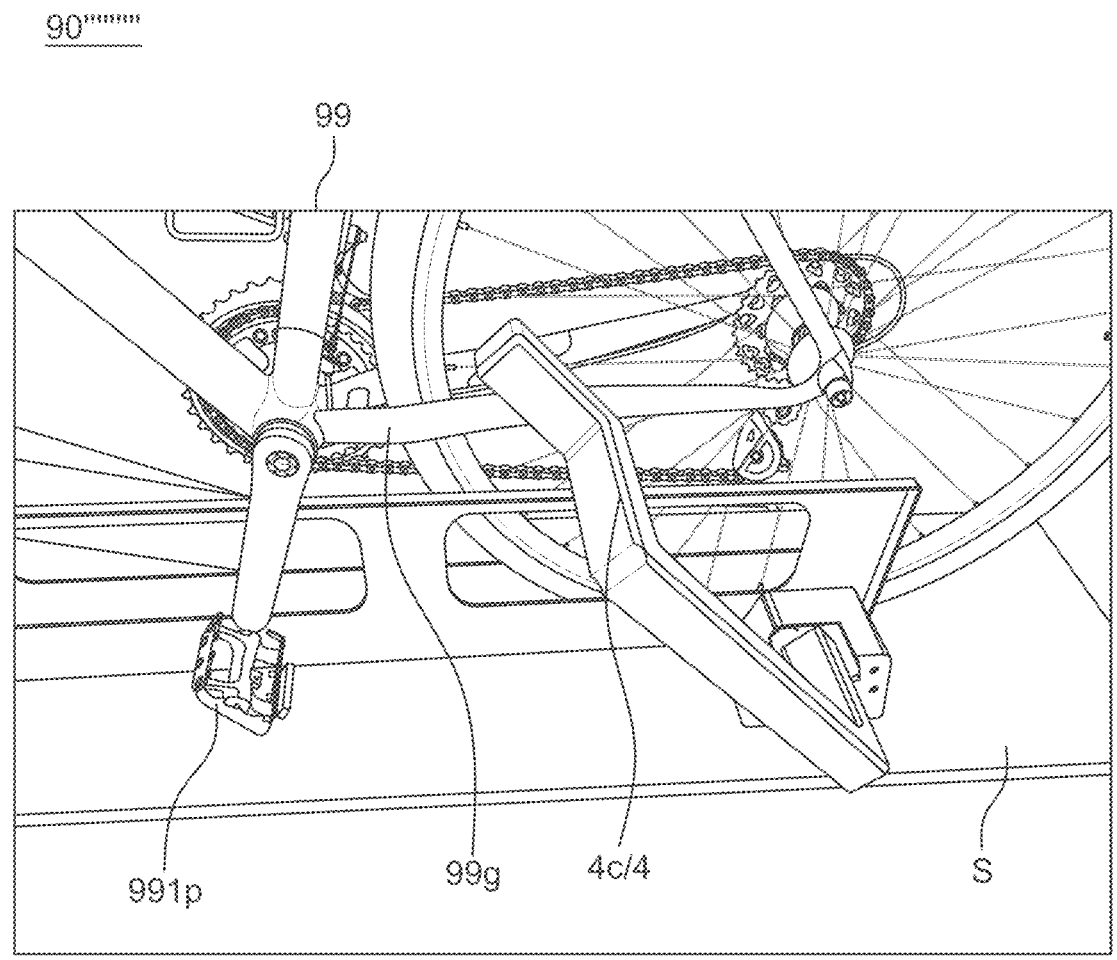
FIG. 53 is a perspective view of an exemplary bicycle inserted into a slot/rack of still yet another exemplary locking apparatus, according to some embodiments of the disclosure.

FIG. 53 is a perspective view of an exemplary bicycle 99 inserted into a slot/rack of still yet another exemplary locking apparatus 90''''''', which shows the left side of the rear frame and wheel locking area. A left pedal 99lp is in a downward position where it would be typically after a user dismounts their bicycle. If not in such a downward position and pedal 99lp were to hit the top of portion 4c of left arm 4 of apparatus 90''''''' during insertion of the bicycle into the slot of the locking apparatus, FIG. 53 makes clear that pedal 99lp of the bicycle may rotate backwards freely for bicycles without coaster brakes and not interrupt the movement forward due to its interaction with arm 4.

Figure 54:
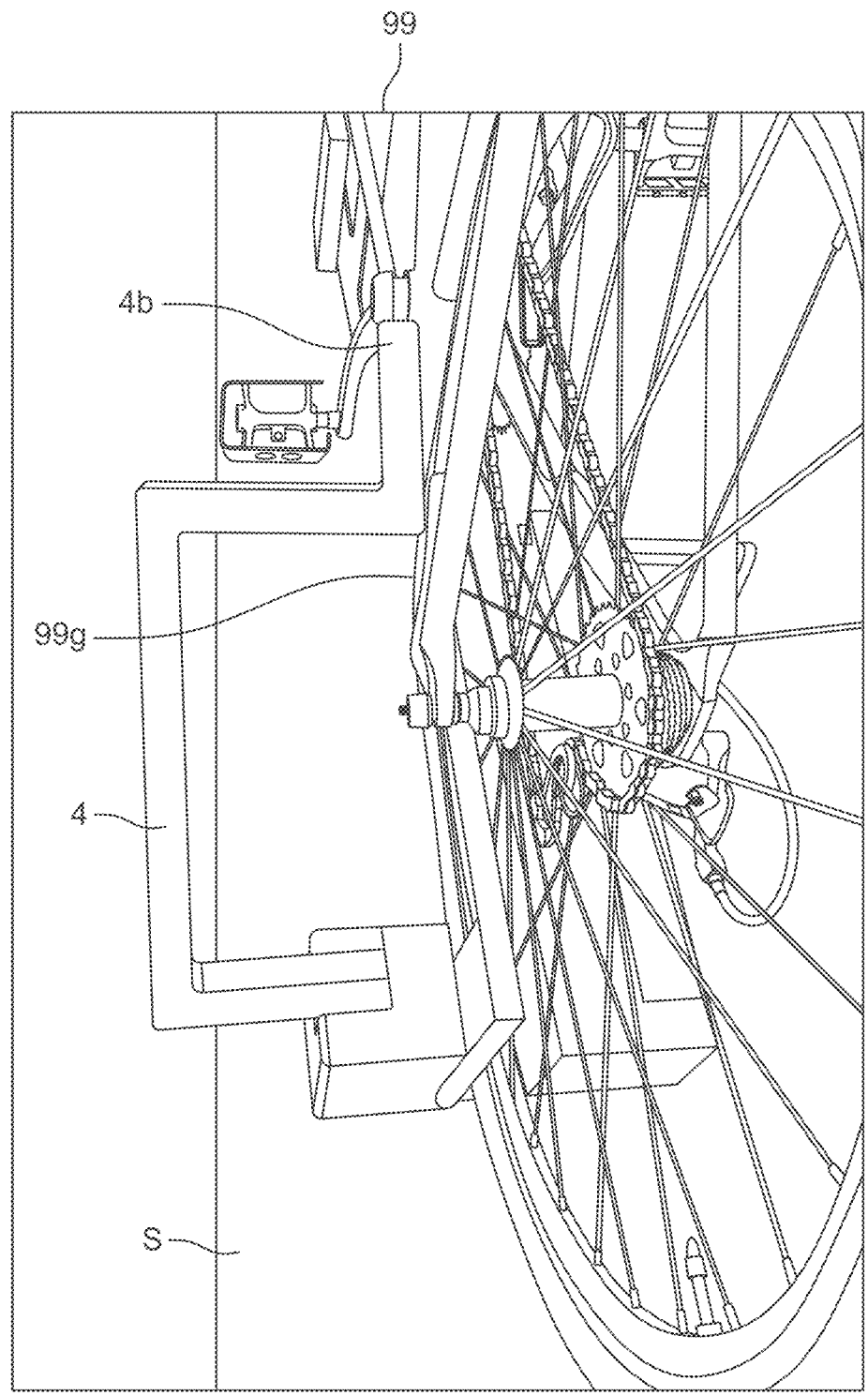
FIG. 54 is a perspective view of an exemplary bicycle inserted into a slot/rack of still yet another exemplary locking apparatus, according to some embodiments of the disclosure.

FIG. 54 is a perspective view of an exemplary bicycle 99 inserted into a slot/rack of still yet another exemplary locking apparatus 90''''''', which shows more clearly the proximity of a top segment 4b of a left arm 4 to a chain stay 99g of an adult bicycle 99.

Figure 55:
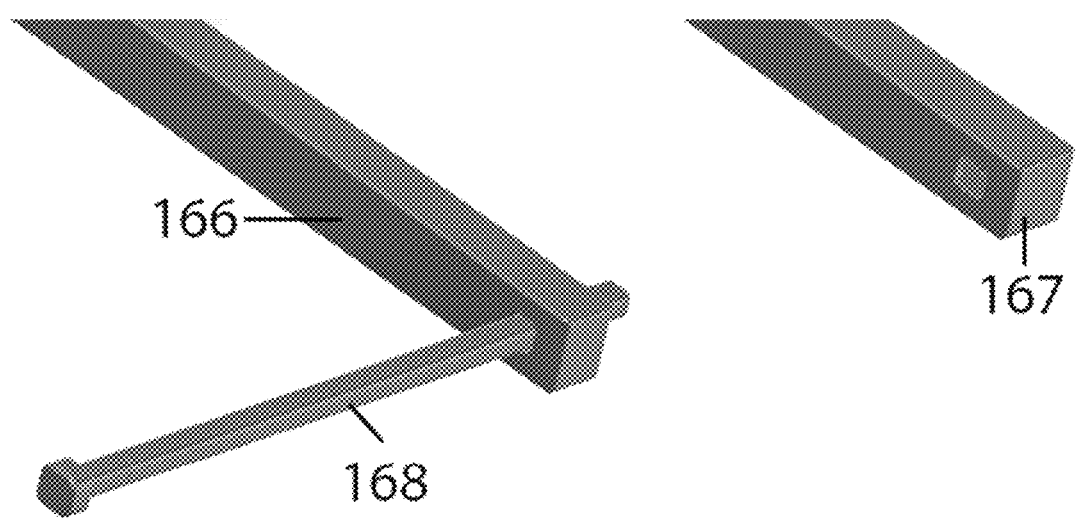
FIG. 55 is a perspective view of an exemplary alternative embodiment of arms of a locking apparatus, according to some embodiments of the disclosure.

Another possible embodiment of which arm is on which side along with switching of electronics in one or more arms may be shown by apparatus 550 in FIG. 55. A "female" arm assembly 167 that may be positioned on a container's assembly side or right side of a slot structure may have a receptacle that may have an increased minimum depth and a linear servo/actuator inside of it instead of the "male" arm. The "male" arm 166 may be on the opposite side (e.g., of a space for a vehicle) from arm 167 with a locking bar assembly 168 and without a linear servo/actuator inside of it. Locking bar assembly 168 may have a "hook" end similar to widened end 18b (see, e.g., FIGS. 7A and 7B) to which the linear servo/actuator (e.g., inside the "female" arm 167) may clasp and prevent from being pulled out in a locked state.

Figure 57A:
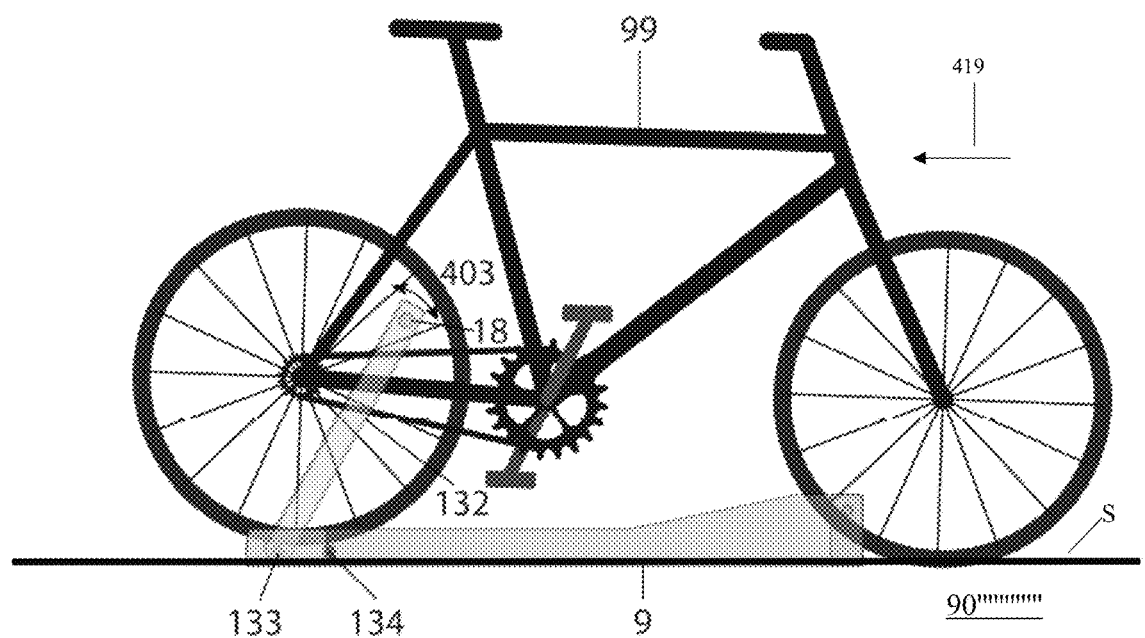
FIG. 57A is a right side view of a bicycle interfacing with still yet another exemplary locking apparatus, according to some embodiments of the disclosure.
Figure 57B:
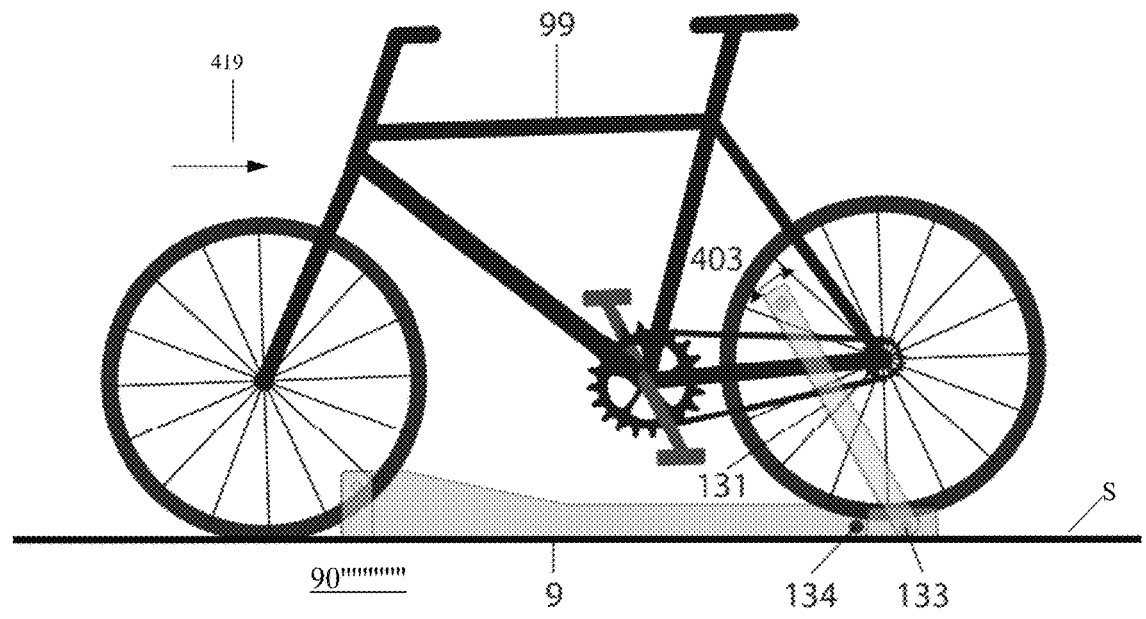
FIG. 57B is a left side view of the bicycle and locking apparatus of FIG. 57A, according to some embodiments of the disclosure.

FIGS. 57A and 57B are right and left side views, respectively, of an exemplary bicycle 99 interfacing with still yet another exemplary locking apparatus 90''''''''. As shown, a base 9 may provide a rotatable coupling (e.g., along a rotation arrow 403) for a right arm 132 (e.g., on a right side of a slot that may be at least partially defined by base 9 or some other suitable slot structure) and a rotatable coupling (e.g., along rotation arrow 403) for a left arm 131 (e.g., on a left side of a slot that may be at least partially defined by base 9 or some other suitable slot structure). Any suitable locking bar assembly 18 may be slidably coupled to one or both of the arms such that locking bar assembly 18 may be locked by the apparatus in a locked position when the bar assembly extends between the two arms or unlocked such that the base assembly may be slide away from one of the arms. A front of the apparatus (e.g., a front of base 9 or any slot that may be defined by any slot structure) may be configured to be open such that vehicle 99 may be loaded in the direction of arrow 419 into the position of FIGS. 57A and 57B (e.g., such that the pedals of the shown vehicle may never pass by the arms when positioned as shown). One or each arm may be straight (e.g., without any outward bend (e.g., C-shaped segment)) and/or may have a limited range of rotation along arrow 403 (e.g., such that a free end of each arm may remain oriented substantially as shown and face towards the front of the vehicle (e.g., opposite the direction of arrow 419 (e.g., along an arc of arrow 403 that may be similar to the arc of a front of the rear wheel of the vehicle))). An arm base 133 may extend between the first arm and the second arm (e.g., along a shared axis of rotation for the two arms), where arm base 133 may extend across a portion of a slot of a slot structure of the apparatus. A vehicle stabilizing rod 134 may be provided that extends parallel to arm base 133 (e.g., across a slot), such that a vehicle wheel (e.g., a portion of the rear wheel of bicycle 99) may be operative to rest in an opening between arm base 133 and rod 134 (e.g., to help a user identify a proper position for the vehicle as it is being loaded in the direction of arrow 419). Once the vehicle is loaded and the arms rotated to align with each other and with a particular vehicle area (e.g., an area common to both the rear wheel (e.g., between rear wheel spokes) and the rear triangle of the frame), locking bar assembly 18 may be moved to extend between the two arms and then locked in such a position to secure the vehicle.

Figure 58:
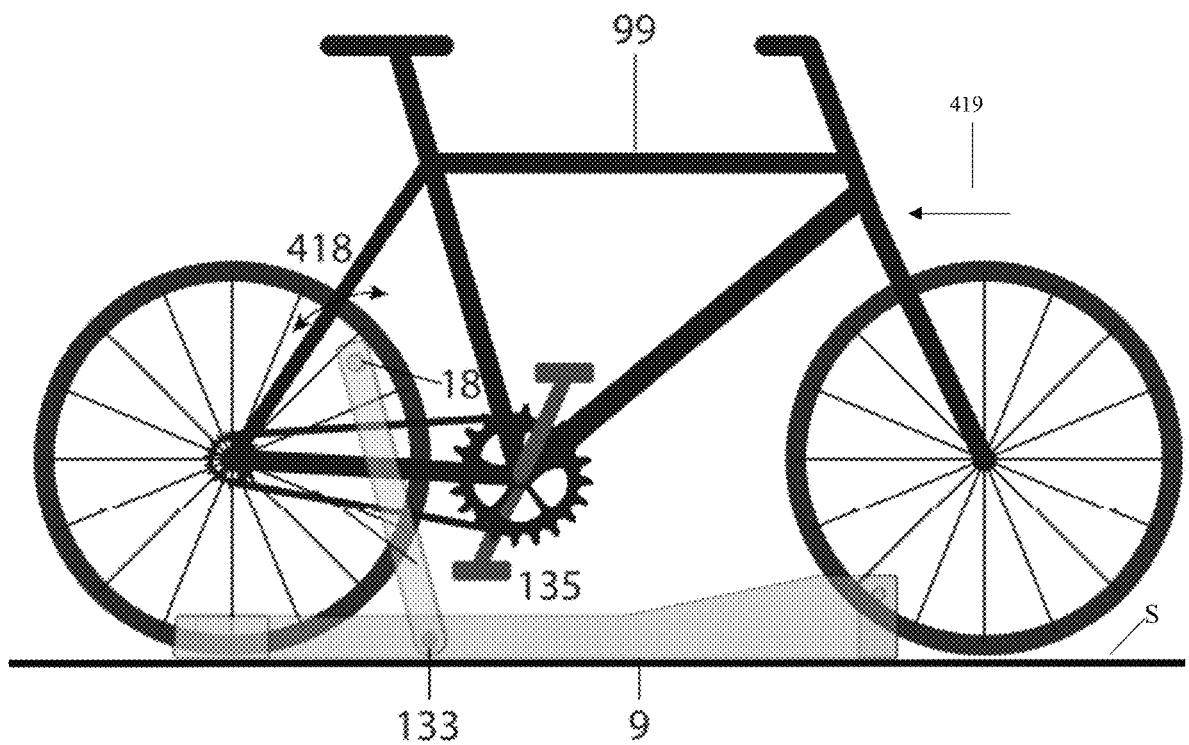
FIG. 58 is a side view of a bicycle interfacing with still yet another exemplary locking apparatus, according to some embodiments of the disclosure.

FIG. 58 is a right side view of an exemplary bicycle 99 interfacing with still yet another exemplary locking apparatus 90'''''''', which may be similar to locking apparatus 90''''''' of FIGS. 57A and 57B, except that the arms may rotate about arrow 418 (e.g., such that a free end of each arm may remain oriented substantially as shown and face away from the front of the vehicle (e.g., in the direction of arrow 419 (e.g., along an arc of arrow 418 that may be similar to the arc of a rear of the rear wheel of the vehicle))).

Various embodiments may include variations in the shape, parts, material, construction method, and size of the slot and the locking device to support different kinds and sizes of bicycles and/or other vehicle types and meet the preferences of clients in power delivery and security features (e.g., an apparatus may be adjusted for use with a tricycle by having the front slot for the front tricycle wheel offset from a rear slot for one of the rear tricycle wheels).

The slot may be of different shape to serve which wheeled transportation device and of what size range. The slot may also be of a second tier (see, e.g., FIGS. 39 and 40) above the ground or floor-level embodiments shown or other level tier reachable by a person with another embodiment to support that. The arms for higher tier(s) may adjust their arm rotational axis and direction of rest of position to support it well. It may be easier for users to adjust the arms and bicycle pedals after pulling the slots out and angled downward. For the higher tier(s), the front locking mechanism may become more manual in operation with something like the arms to adjust the position of bar 30 to exit the wheel locking mechanism shell while also being linked to the position of the receptacle or receptacles on the other side on the vertical block(s).

Stud 6 (see, e.g., FIGS. 5A, 5B, 7A, and 7B) may or may not be partially threaded or even flipped on whether the arm hole it goes into or the container/base hold it goes into may be threaded. It should still allow for rotation of the arms while helping hold them to their respective bases.

Like in FIG. 53, configuration of which arm (the one with the receptacle (e.g., and more limited range of rotation, though not necessary) and the one with hole for the bar and hollowed interior for a motor) can be changed—the arm with the receptacle can be changed to have the hollowed interior for a motor or linear servo and placed on the side of the bicycle slot with the rest of the electronics while the other arm can be reconfigured to just have the hole for the bar and be on the side of the bicycle slot that doesn't have electronics.

Which side the containers assembly is on can also be swapped with the vertical block 2 and arm base area.

As mentioned, an arm (e.g., an arm with more limited range of rotation) also may or may not have bended area outwards (e.g., for pedal clearance, as described herein).

Rubber feet or padding may be added to the arms to prevent damage if any person tries to pull them up or slam them down hard.

The arm guards may have different shapes and thicknesses. However, they ought to be sturdy enough to keep the arms in proper locking position.

Similar embodiments may be used to lock tricycles, recumbent bicycles, cargo bicycles, and scooters.

One or some drawings may show a possible embodiment with almost all the parts. The missing parts may include any adhesives, tape, welding, dust-resisting and/or water-resisting sealants and/or covers, cables, and wires connecting electronic boards and batteries together, optional parts, ground mounting bolts, and/or the like. Any suitable electronics or otherwise of the apparatus may be contained within one or both arms, within a locking bar, within a base or block, within a slot structure, and/or the like.

In some embodiments, an apparatus for locking a vehicle to a surface is provided, where the apparatus may include a base assembly configured to be coupled to the surface (e.g., surface S), a first arm (e.g., arm 4 or arm 131), a second arm (e.g., arm 17 or arm 132), and a locking bar assembly (e.g., bar assembly 18). The base assembly may include a first base (e.g., base 3) and a second base (e.g., base 9). The first arm may extend between a first arm first end (e.g., end 4a) and a first arm second end (e.g., end 4b), wherein the first arm may be rotatably coupled to the first base proximate the first arm first end for rotation about a first rotation axis (e.g., axis AL). The second arm may extend between a second arm first end (e.g., end 17a) and a second arm second end (e.g., end 17b), wherein the second arm is rotatably coupled to the second base proximate the second arm first end for rotation about a second rotation axis (e.g., axis AR). The lock bar assembly may extend between a first lock bar assembly end (e.g., end 18e) and a second lock bar assembly end (e.g., end 19). The lock bar assembly may be slidably coupled to the second arm via a second arm bar portion (e.g., passageway 17p) proximate the second arm second end. When the first and second arms are rotated such that a first arm bar portion of the first arm proximate the first arm second end (e.g., receptacle 4d of arm 4) is aligned with the second arm bar portion of the second arm proximate the second arm second end (e.g., passageway 17p of arm 17), the lock bar assembly may be slidable along a path from a first lock bar position (see, e.g., FIG. 2) where the first lock bar assembly end (e.g., end 18e of bar 18) is remote from the first arm to a second lock bar position (see, e.g., FIGS. 3A and 3B) where the first lock bar assembly end (e.g., end 18e of bar 18) interfaces with the first arm bar portion of the first arm (e.g., receptacle 4d of arm 4). The apparatus may define a slot (e.g., slot 1a) operative to receive a portion of the vehicle (e.g., vehicle 99) such that the path passes through a vehicle area defined by both a wheel of the vehicle and a frame of the vehicle (e.g., area 59 of FIG. 19). The apparatus may include an electronic assembly configured to lock the lock bar assembly in the second lock bar position (e.g., any suitable motor or servo or actuator described herein or otherwise). In some embodiments, the electronic assembly may be configured to lock the lock bar assembly in the second lock bar position by extending a mechanical tip (e.g., tip 24) into an indent (e.g., receptacle 18a) within the locking bar assembly, where the mechanical tip may be positioned within the first arm or within the second arm. In some embodiments, the electronic assembly may be further configured to lock the lock bar assembly in the second lock bar position by extending another mechanical tip into another indent within the locking bar assembly, where the mechanical tip may be positioned within the first arm and the other mechanical tip is positioned within the second arm. The first arm bar portion of the first arm may be a receptacle in the first arm (e.g., receptacle 4d), and the second arm bar portion of the second arm may be a passageway (e.g., passageway 17p) through the second arm. A range of rotation of the first arm with respect to the first base (e.g., arrow 403) may be different than a range of rotation of the second arm with respect to the second base (e.g., arrow 402). A portion of the first arm may be operative to telescopically alter the distance between the first arm first end and the first arm second end. The first rotation axis may be the same as the second rotation axis. An arm base (e.g., arm base 133) may extend between the first arm proximate the first arm first end and the second arm proximate the second arm first end, while a vehicle stabilizing rod (e.g., rod 134) may extend between the first base and the second base, wherein the vehicle stabilizing rod may be parallel to the arm base (see, e.g., FIGS. 57A and 57B). The apparatus may include slot structure (e.g., structure 1) that extends away from the base assembly in a direction perpendicular to the first rotation axis (e.g., along arrow 416 of FIG. 20), wherein a portion of the slot structure at least partially defines a slot configured to receive and guide a wheel of the vehicle (e.g., slot 1a for a rear wheel and/or a front wheel of bicycle 99), wherein the base assembly, when coupled to the surface, may be configured to be movable with respect to the slot along an axis that is perpendicular to the first rotation axis and parallel to the surface (e.g., along arrow 416 of FIG. 20), and/or wherein the base assembly, when coupled to the surface, is configured to be movable with respect to the slot along an axis that is perpendicular to the first rotation axis and perpendicular to the surface (e.g., along arrow 417 of FIG. 20). The first arm may include an arm segment (e.g., arm portion 4c) between the first arm first end and the first arm second end that extends away from the second arm. A distance between the first base and second base and/or a width of a slot may be variable to enable use with vehicles of different widths (e.g., bicycles with tires of different widths).

In some embodiments, a locking apparatus for use with a surface (e.g., surface S) may include a first base (e.g., base 3) operative to be attached to the surface, a second base (e.g., base 9) operative to be attached to the surface, a first arm (e.g., arm 4) rotatably coupled to the first base, a second arm (e.g., arm 17) rotatably coupled to the second base, and a lock bar (e.g., bar 18) extending between a first lock bar end (e.g., end 18e) and a second lock bar end (e.g., end 19), wherein the lock bar extends through a lock bar passageway (e.g., passageway 17p) in the second arm, and wherein, when a lock bar receptacle in the first arm (e.g., receptacle 4d) is aligned with the lock bar passageway in the second arm (e.g., passageway 17p), the lock bar is operative to slide within the lock bar passageway such that an end of the lock bar (e.g., end 18e) enters the lock bar receptacle (e.g., receptacle 4d).

In some embodiments, an apparatus may be for locking with respect to a surface (e.g., surface S) a vehicle (e.g., vehicle 99) that includes a vehicle wheel coupled to a vehicle chassis, the apparatus may include a base assembly (e.g., base 9) operative to be attached to the surface, a first arm (e.g., arm 4 or 131) movably coupled to the base assembly, a second arm (e.g., arm 17 or 132) movably coupled to the base assembly, a lock bar (e.g., bar 18) extending through a lock bar passageway in the second arm (e.g., passageway 17p) and between a first lock bar end (e.g., end 18e) and a second lock bar end (e.g., end 19), and a slot structure (e.g., structure 1) coupled to the base assembly and defining a slot (e.g., slot 1a) that is operative to receive a portion of the vehicle (e.g., a bottom of a vehicle wheel), wherein, when a lock bar receptacle in the first arm (e.g., receptacle 4d) is aligned with the lock bar passageway in the second arm (e.g., passageway 17p) while the portion of the vehicle is received by the slot, the lock bar is operative to slide within the lock bar passageway along a lock bar path such that an end of the lock bar enters the lock bar receptacle and such that the lock bar path passes through a vehicle area defined by both the vehicle wheel and the vehicle chassis (e.g., area 59 of FIGS. 19 and 20).

One, some, or all of the processes described with respect to FIGS. 1-58 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory of a local microprocessor of FIG. 18 of locking apparatus and/or of a user device and/or of a server and/or administrator). In other embodiments, the computer-readable medium may be a transitory computer-readable medium. In such embodiments, the transitory computer-readable medium can be distributed over network-coupled computer systems so that the computer-readable code may be stored and executed in a distributed fashion. For example, such a transitory computer-readable medium may be communicated from a central network controller device to a router device or from a data device to any network device. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Any, each, or at least one module or component or subsystem of the disclosure may be provided as a software construct, firmware construct, one or more hardware components, or a combination thereof. For example, any, each, or at least one module or component or subsystem of the system may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. The number, configuration, functionality, and interconnection of the modules and components and subsystems of the system are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

While there have been described systems, methods, and computer-readable media for securely locking vehicles, many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms, such as "left" and "right," "up" and "down," "front" and "back," "top" and "bottom" and "side," "above" and "below," "length" and "width" and "thickness" and "diameter" and "cross-section" and "longitudinal," "X-" and "Y-" and "Z-," and/or the like, may be used herein only for convenience, and that no fixed or absolute directional or orientational limitations are intended by the use of these terms. For example, the components of the apparatus can have any desired orientation. If reoriented, different directional or orientational terms may need to be used in their description, but that will not alter their fundamental nature as within the scope and spirit of the disclosure.

Therefore, those skilled in the art will appreciate that the concepts of the disclosure can be practiced by other than the described embodiments, which are presented for purposes of illustration rather than of limitation.

What is claimed is:

1. An apparatus for locking a vehicle to a surface, the apparatus comprising:
    a base assembly configured to be coupled to the surface, the base assembly comprising:
        a first base; and
        a second base;
    a first arm extending between a first arm first end and a first arm second end, wherein the first arm is rotatably coupled to the first base proximate the first arm first end for rotation about a first rotation axis;
    a second arm extending between a second arm first end and a second arm second end, wherein the second arm is rotatably coupled to the second base proximate the second arm first end for rotation about a second rotation axis; and
    a lock bar assembly extending between a first lock bar assembly end and a second lock bar assembly end,
        wherein the lock bar assembly is slidably coupled to the second arm via a second arm bar portion proximate the second arm second end, and
        wherein, when the first and second arms are rotated such that a first arm bar portion of the first arm proximate the first arm second end is aligned with the second arm bar portion of the second arm proximate the second arm second end, the lock bar assembly is slidable along a path from a first lock bar position where the first lock bar assembly end is remote from the first arm to a second lock bar position where the first lock bar assembly end interfaces with the first arm bar portion of the first arm.

2. The apparatus of claim 1, wherein, the apparatus defines a slot operative to receive a portion of the vehicle such that the path passes through a vehicle area defined by both a wheel of the vehicle and a frame of the vehicle.

3. The apparatus of claim 1, further comprising an electronic assembly configured to lock the lock bar assembly in the second lock bar position.

4. The apparatus of claim 3, wherein the electronic assembly is configured to lock the lock bar assembly in the second lock bar position by extending a mechanical tip into an indent within the locking bar assembly.

5. The apparatus of claim 4, wherein the mechanical tip is positioned within the first arm.

6. The apparatus of claim 4, wherein the mechanical tip is positioned within the second arm.

7. The apparatus of claim 4, wherein:
    the electronic assembly is further configured to lock the lock bar assembly in the second lock bar position by extending another mechanical tip into another indent within the locking bar assembly;
    the mechanical tip is positioned within the first arm; and
    the other mechanical tip is positioned within the second arm.

8. The apparatus of claim 1, wherein:
    the first arm bar portion of the first arm comprises a receptacle in the first arm; and
    the second arm bar portion of the second arm comprises a passageway through the second arm.

9. The apparatus of claim 1, wherein a range of rotation of the first arm with respect to the first base is different than a range of rotation of the second arm with respect to the second base.

10. The apparatus of claim 1, wherein a portion of the first arm is operative to telescopically alter the distance between the first arm first end and the first arm second end.

11. The apparatus of claim 1, wherein the first rotation axis is the same as the second rotation axis.

12. The apparatus of claim 1, further comprising an arm base that extends between the first arm proximate the first arm first end and the second arm proximate the second arm first end.

13. The apparatus of claim 12, further comprising a vehicle stabilizing rod extending between the first base and the second base, wherein the vehicle stabilizing rod is parallel to the arm base.

14. The apparatus of claim 1, further comprising a slot structure that extends away from the base assembly in a direction perpendicular to the first rotation axis.

15. The apparatus of claim 14, wherein a portion of the slot structure at least partially defines a slot configured to receive and guide a wheel of the vehicle.

16. The apparatus of claim 15, wherein the base assembly, when coupled to the surface, is configured to be movable with respect to the slot along an axis that is perpendicular to the first rotation axis and parallel to the surface.

17. The apparatus of claim 15, wherein the base assembly, when coupled to the surface, is configured to be movable with respect to the slot along an axis that is perpendicular to the first rotation axis and perpendicular to the surface.

18. The apparatus of claim 1, wherein the first arm comprises an arm segment between the first arm first end and the first arm second end that extends away from the second arm.

19. A locking apparatus for use with a surface, comprising:
    a first base operative to be attached to the surface;
    a second base operative to be attached to the surface;
    a first arm rotatably coupled to the first base;
    a second arm rotatably coupled to the second base; and
    a lock bar extending between a first lock bar end and a second lock bar end, wherein the lock bar extends through a lock bar passageway in the second arm, and wherein, when a lock bar receptacle in the first arm is aligned with the lock bar passageway in the second arm, the lock bar is operative to slide within the lock bar passageway such that an end of the lock bar enters the lock bar receptacle.

20. An apparatus for locking with respect to a surface a vehicle comprising a vehicle wheel coupled to a vehicle chassis, the apparatus comprising:
    a base assembly operative to be attached to the surface;
    a first arm movably coupled to the base assembly;
    a second arm movably coupled to the base assembly;
    a lock bar extending through a lock bar passageway in the second arm and between a first lock bar end and a second lock bar end; and a slot structure coupled to the base assembly and defining a slot that is operative to receive a portion of the vehicle, wherein, when a lock bar receptacle in the first arm is aligned with the lock bar passageway in the second arm while the portion of the vehicle is received by the slot, the lock bar is operative to slide within the lock bar passageway along a lock bar path such that an end of the lock bar enters the lock bar receptacle and such that the lock bar path passes through a vehicle area defined by both the vehicle wheel and the vehicle chassis.

\* \* \* \* \*